United States Patent
Kanamori

(10) Patent No.: US 8,654,246 B2
(45) Date of Patent: Feb. 18, 2014

(54) HIGH RESOLUTION IMAGES USING POLARIZED LIGHT SOURCE AND POLARIZATION CAMERA

(75) Inventor: Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 13/102,308

(22) Filed: May 6, 2011

(65) Prior Publication Data
US 2011/0267483 A1 Nov. 3, 2011

Related U.S. Application Data

(63) Continuation of application No. PCT/JP2010/006346, filed on Oct. 27, 2010.

(30) Foreign Application Priority Data

Dec. 8, 2009 (JP) ................................. 2009-278557

(51) Int. Cl.
- *H04N 5/222* (2006.01)
- *H04N 5/225* (2006.01)
- *H04N 5/235* (2006.01)
- *G01J 4/00* (2006.01)

(52) U.S. Cl.
USPC ......... 348/370; 348/360; 348/222.1; 356/364

(58) Field of Classification Search
USPC ............... 356/364–370; 348/370, 360, 222.1
See application file for complete search history.

(56) References Cited

U.S. PATENT DOCUMENTS

| | | | |
|---|---|---|---|
| 7,582,857 B2 * | 9/2009 | Gruev et al. | 250/225 |
| 7,760,256 B2 * | 7/2010 | Kanamori et al. | 348/280 |
| 8,184,194 B2 * | 5/2012 | Sato et al. | 348/335 |

(Continued)

FOREIGN PATENT DOCUMENTS

| | | |
|---|---|---|
| JP | 06-275804 A | 9/1994 |
| JP | 11-313242 A | 11/1999 |

(Continued)

OTHER PUBLICATIONS

International Search Report for International Application No. PCT/JP2010/006346 mailed Nov. 22, 2010.

(Continued)

*Primary Examiner* — Nhan T Tran
*Assistant Examiner* — Chan Nguyen
(74) *Attorney, Agent, or Firm* — Renner, Otto, Boisselle & Sklar, LLP

(57) ABSTRACT

An image processor (101) according to a preferred embodiment of the present invention includes a polarized light source (102) and a polarization camera (103). In shooting an object (104), the object is irradiated with polarized light (105) that rotates its polarization plane. The polarized light is reflected from the object's surface and the polarized reflected light (106) reaches the polarization camera (103), thereby recording an image there. The polarization camera (103) includes a polarization image sensor (201), an intensity and polarization information processing section (202), a polarization plane control section (204), and an image capturing control section (205). By capturing an image every time the polarization plane control section (204) changes the polarization state of the polarized light, an intensity image Y and a polarization phase image P are obtained in association with each polarization state. Using these images, a resolution increasing processing section (203) generates a high-resolution normal image (208) and a high resolution intensity image (209).

15 Claims, 47 Drawing Sheets

(56) References Cited

U.S. PATENT DOCUMENTS

| | | | |
|---|---|---|---|
| 2007/0222781 A1 | 9/2007 | Kondo et al. | |
| 2009/0021598 A1* | 1/2009 | McLean et al. | 348/222.1 |
| 2009/0279807 A1* | 11/2009 | Kanamorl et al. | 382/274 |
| 2009/0290039 A1* | 11/2009 | Kanamori et al. | 348/222.1 |
| 2009/0304299 A1 | 12/2009 | Motomura et al. | |
| 2010/0118398 A1* | 5/2010 | Grau | 359/465 |

FOREIGN PATENT DOCUMENTS

| | | |
|---|---|---|
| JP | 2007-086720 A | 4/2007 |
| JP | 2007-316161 A | 12/2007 |
| JP | 2008-016918 A | 1/2008 |
| WO | 2008/026518 A1 | 3/2008 |

OTHER PUBLICATIONS

Form PCT/ISA/237 for International Application No. PCT/JP2010/006346 mailed Nov. 22, 2010.

Tan et al., "Resolution-Enhanced Photometric Stereo", European Conference on Computer Vision, 3:pp. 58-71, 2006.

Manjunath et al., "Simultaneous Estimation of Super-Resolved Depth Map and Intensity Field Using Photometric Cue", Computer Vision and Image Understanding 101 (2006), pp. 31-44.

Lawrence B. Wolff, "Polarization Vision: A New Sensory Approach to Image Understanding", Image Vision and Computer 15 (1997), pp. 81-93.

Shibata et al; "Creating photorealistic Virtual Model with Polarization-based Vision System"; Proceedings of SPIE—International Society for Optical Engineering. S P I E—International Society for Optical Engineering, US, vol. 5888, No. 1. Jan. 1, 2005, pp. 588804-1—11.

Atkinson et al; "Recovery of surface orientation from diffuse polarization". IEEE Transactions on Image Processing, IEEE Service Center, Piscataway. NJ, US. vol. 15, No. 6, Jun. 1, 2006, pp. 1653-1664.

Miyazaki et al; "Polarization-based inverse rendering from a single view"; Proceedings of the Eight IEEE International Conference on Computer Vision. (ICCV). Nice, France, Oct. 13-16, 2003; [International Conference on Computer Vision], Los Alamitos, CA: IEEE Comp. Soc, US, Oct. 13, 2003, pp. 982-987, vol. 2.

Supplementary European Search Report for corresponding European Application No. 10835639.5 dated Oct. 18, 2013.

* cited by examiner

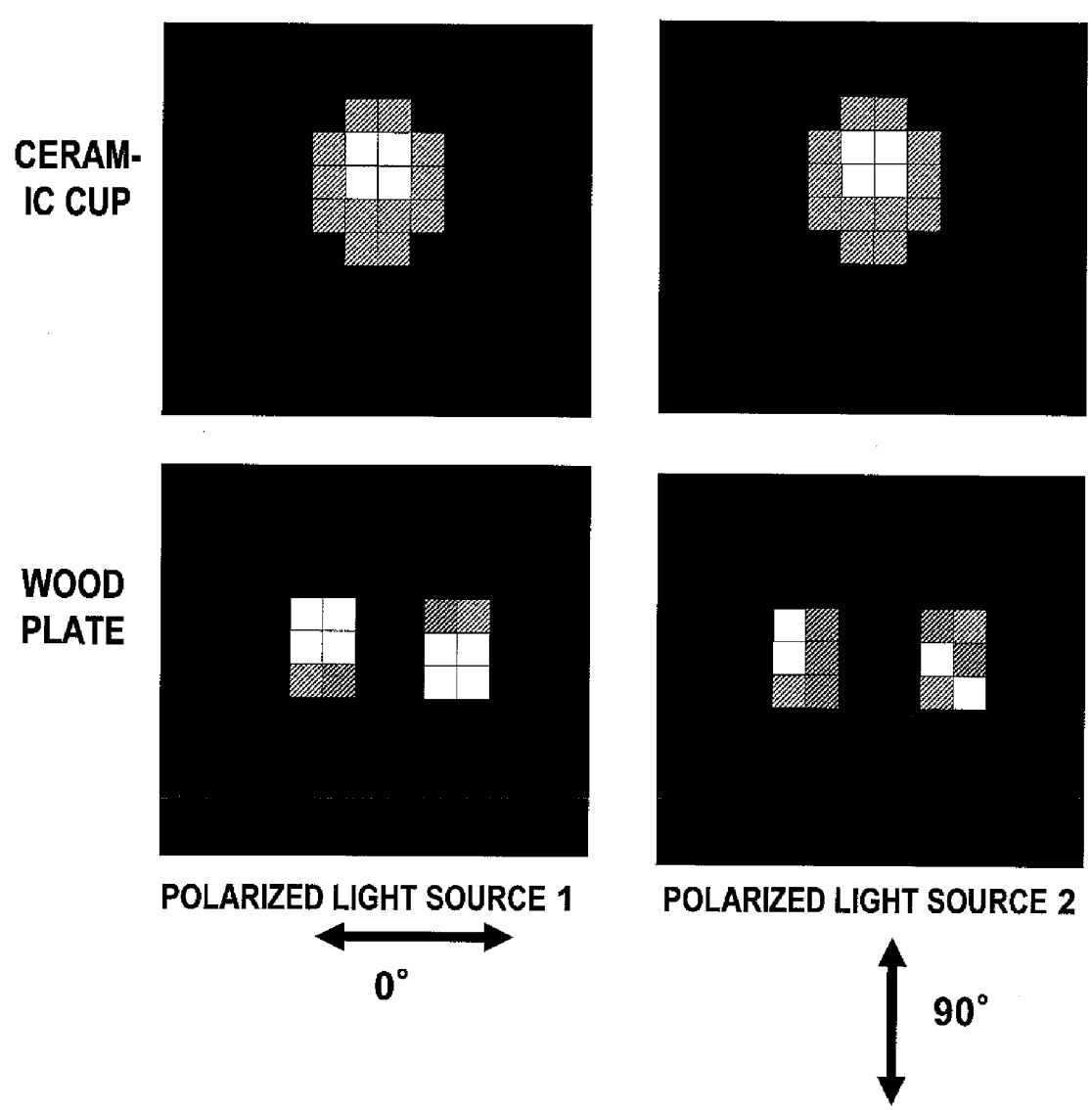

(a)             (b)

$$0 < \psi_{Imax} \leq 45°$$

2301

$$45° < \psi_{Imax} \leq 90°$$

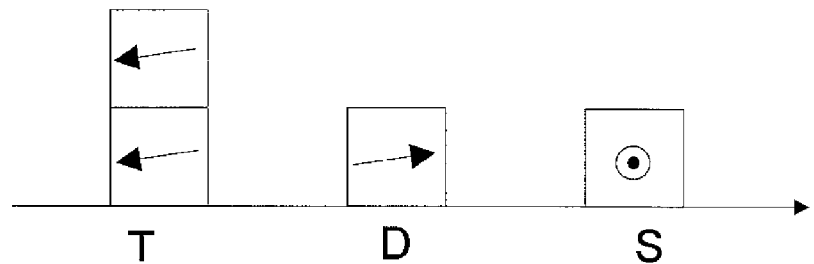
FIG.25 (a)
$$90° < \psi_{Imax} \leq 135°$$
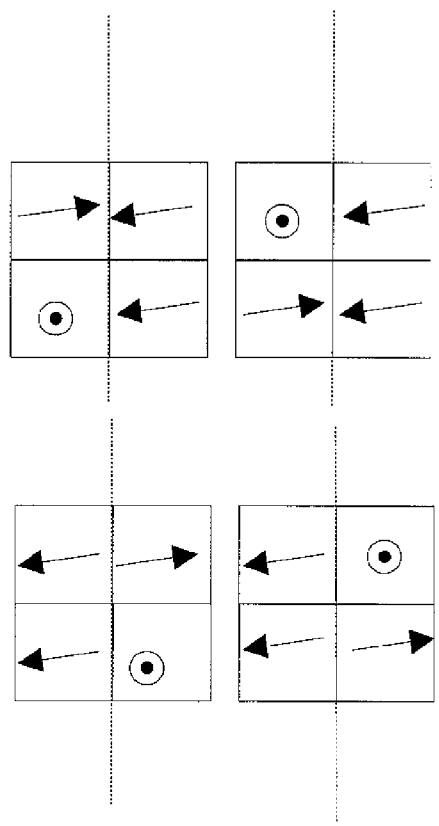
FIG.25 (b)
FIG.25 (c)

$$135° < \psi_{Imax} \leq 180°$$

T  D  S

FIG.28 (a)
FIG.28 (b)
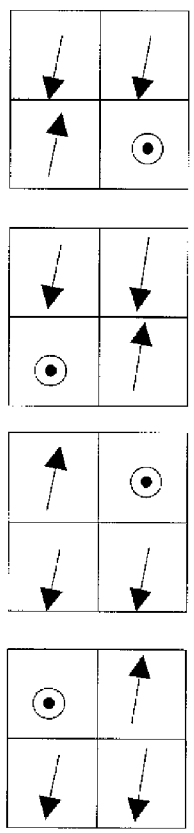
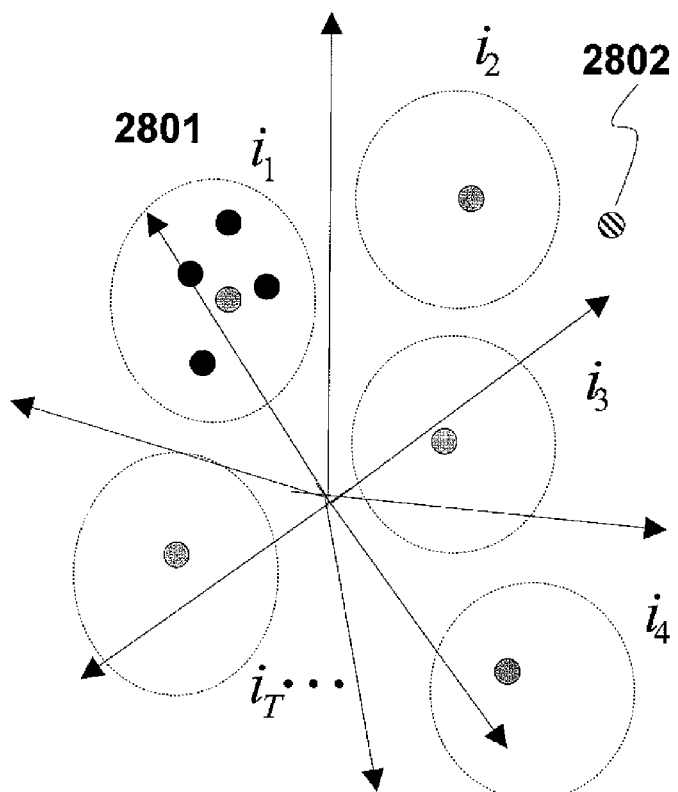

Yave

HIGH-
RESOLUTION
NORMAL
IMAGE

208

HIGH-
RESOLUTION
INTENSITY
IMAGE

209

$$\frac{(IP_T + IS_T)}{2}$$

$I_S$ $I_S$

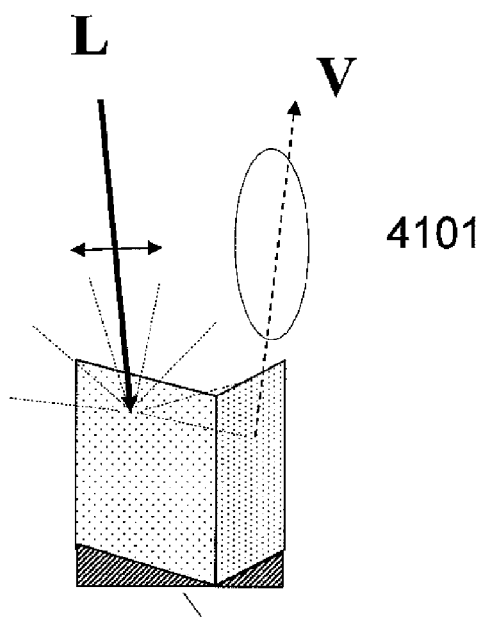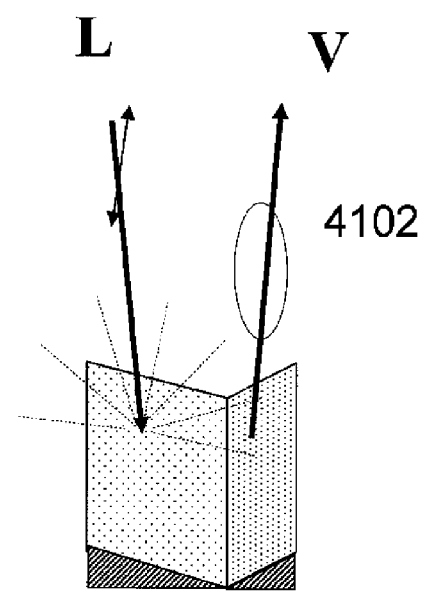
FIG.41 (a)　　　　　　　　　FIG.41 (b)
1401

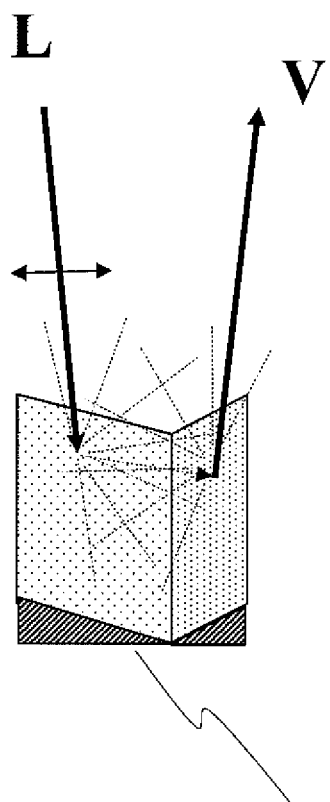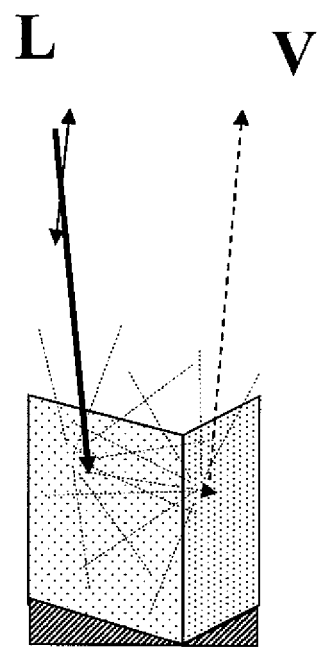
FIG.42 (a)   1401            FIG.42 (b)

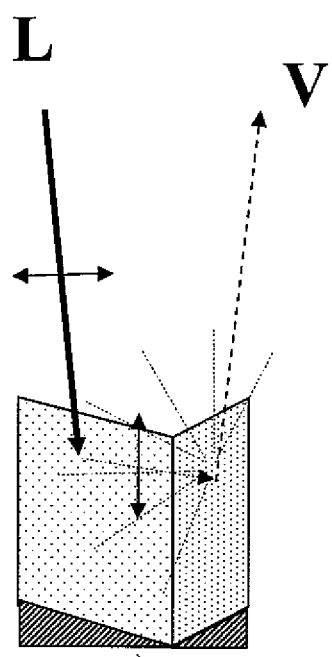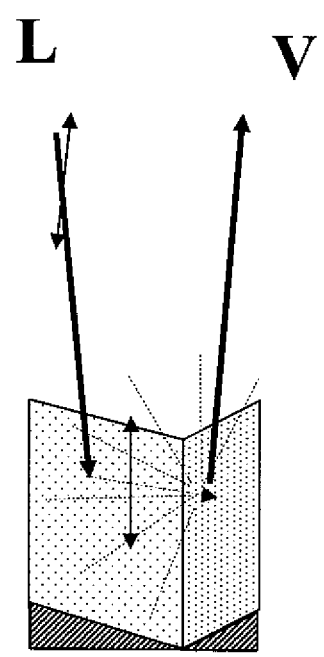
FIG.43 (a)    1401          FIG.43 (b)

HIGH RESOLUTION IMAGES USING POLARIZED LIGHT SOURCE AND POLARIZATION CAMERA

This is a continuation of International Application No. PCT/JP2010/006346, with an international filing date of Oct. 27, 2010, which claims priority of Japanese Patent Application No. 2009-278557, filed on Dec. 8, 2009, the contents of which are hereby incorporated by reference.

BACKGROUND OF THE INVENTION

1. Field of the Invention

The present invention relates to an image processor that has a flexible zoom function for generating an image, of which the resolution is higher than that of a single pixel of the original image that can be captured with an image sensor.

2. Description of the Related Art

With remarkable development of digital video equipment, the image sensors of most consumer digital still cameras now have a resolution of 1 megapixels. As a result, as far as still pictures are concerned, a resolution that is high enough to print them as beautiful photos has already been achieved. In the following applications, however, the resolution should be further increased beyond their image capturing limit:

(i) when a region of interest, which is a portion of a product that is offered for sale in the field of online shopping, for example, needs to be zoomed in on to an arbitrary zoom power;
  (ii) when a diseased part of a patient needs to be inspected closely by medical imaging;
  (iii) when the clothes of a culprit need to be identified in detail with a surveillance camera; and
  (iv) when a face, iris or fingerprint image needs to be analyzed in the field of biometrics.

Attempts to meet these demands by increasing the resolution of image sensors have recently almost reached a limit, because an optical limit prevents the resolution from being increased anymore even if the size of a pixel is decreased. To go over that limit, there is no choice but to increase the size of a single pixel for a lens or an image sensor. As a result, it has become more and more difficult these days to realize a camera of an even smaller size for use as a digital camera, a digital movie camera, a small surveillance camera, or a medical endoscope.

There is an attempt to generate a high-resolution image by dividing a single pixel with a conventional intensity even finely while using a small camera. Such an attempt is generally called a "super-resolution technology" for increasing the resolution of an image. According to this technology, a number of images, which have been obtained by shooting either a number of still pictures of a subject sequentially or a moving picture of the subject, are used as an input. Then, the correspondence between an associated group of pixels, which represents the same portion of the object, is defined between those images, thereby estimating the pattern on a high-resolution image based on such an associated group of pixels. However, normally only one still picture is used as a photo representing a product that is offered for sale in online shopping or as a medical image. Also, although video captured by a surveillance camera is a moving picture, discrete still pictures are often used to form the moving picture. That is why the conventional "motion-based" resolution increasing technique is not applicable to these situations.

Also, according to the conventional technique, the magnitude of motion between corresponding portions of an object that are included in a number of image frames at different times is detected by an intensity-based association technique. For that reason, as for an area where a lot of specular reflection is produced at the surface (e.g., on a glossy surface), it is difficult to detect the magnitude of motion.

A technique for dividing a single pixel finely even on such a glossy surface on the supposition that a still picture is used is disclosed in Ping Tan et. al, "Resolution-Enhanced Photometric Stereo", European Conference on Computer Vision, 3: pp. 58-71, 2006 (Hereinafter, Non-Patent Document No. 1). According to that technique, an object (such as a metallic coin or a stone engraving), of which the specular reflector meets a microfacet physical reflection model, is selected. A lot of object images are shot using a fixed camera with the direction of the light source changed in various patterns. Then, by applying those images to a microfacet model, the spatial distribution of microscopic normals within a single pixel is estimated based on those many images and it is calculated how high the intensity would be when the microscopic shape within a single pixel is illuminated with the light. In the first half of this resolution increasing technique, a histogram of normals to microscopic regions that are distributed within a single pixel is formed by making a lot of shots with the light source moved. In the latter half, on the other hand, the combination of the spatial arrangements of microscopic region normals that form such a histogram is solved as an energy minimizing problem that is mainly based on the integrability of normals. As used herein, the "integrability of normals" means that with a closed path given to the surface of an object, when surface height information, which is a linearly integrated value of the normals on that path, makes a round of the path and returns to the original position, that surface height becomes the same as the original height at that position.

A technique for increasing the resolution of an image by capturing a number of images with the light source moved is disclosed in Manjunath et. al, "Simultaneous Estimation of Super-Resolved Depth Map and Intensity Field Using Photometric Cue", Computer Vision and Image Understanding 101(2006), pp. 31-44 (Hereinafter, Non-Patent Document No. 2). According to this technique, objects that can be total diffuse reflection models (such as a stuffed doll or a pair of sneakers) are selected, and 8 to 16 images are shot, thereby increasing the resolution of 2×2 images. This technique uses normal images, albedo image resolution decreased models, normal integrability constraints, and Markov random field probability models, thereby increasing the resolution of the object normals and the albedo reflectance at the same time.

Japanese Patent Application Laid-Open Publication No. 2007-86720 (Hereinafter, Patent Document No. 1) discloses a patterned polarizer. On the other hand, Japanese Patent Application Laid-Open Publication No. 11-313242 (Hereinafter, Patent Document No. 2) and Lawrence B. Wolff, "Polarization Vision: a New Sensory Approach to Image Understanding", Image and Computing 15 (1997) (Hereinafter, Non-Patent Document No. 3), pp. 81-93 disclose a device, of which the polarization plane can be rotated. The elements disclosed in those documents can be used in preferred embodiments of the present invention to be described later.

SUMMARY OF THE INVENTION

These conventional technologies have the following drawbacks.

Specifically, to make the light incident from various angles, the light source should be moved a relatively long distance. That is why a dedicated lighting system should be assembled and put in a laboratory. In other words, such an image cannot be captured just by attaching a small portable light source such as a flash to a small camera.

It is therefore an object of the present invention to provide an image processor that can estimate a normal to a microscopic region within a single pixel by capturing an image without moving the light source such a long distance.

An image processor according to the present invention includes: a polarized light source for irradiating the surface of an object with polarized light that is linearly polarized light, of which the polarization plane changes sequentially; a camera that has an image capturing plane, on which a number of photosensitive cells, each having a size corresponding to one pixel, are arranged, and that captures an intensity image of the object's surface based on the light that has been reflected from the object's surface; and a resolution increasing processing section for estimating normals to subpixel regions, each of which is smaller than a single pixel, at the object's surface by detecting how much the intensity of the intensity image has varied as the polarization plane changes, and for increasing the resolution of the intensity image using the normals estimated. When the camera captures the intensity image of the object's surface, the polarization plane of the linearly polarized light changes with the arrangement of the polarized light source and the camera fixed.

In one preferred embodiment, an angle of 10 degrees or less is formed between the respective optical axes of the polarized light source and the camera.

In another preferred embodiment, the camera is a polarization camera with a polarization filter for transmitting linearly polarized light that is polarized in a particular direction.

In this particular preferred embodiment, the polarization filter includes a number of patterned polarizers that are arranged to face the photosensitive cells.

In still another preferred embodiment, the camera is used to capture either a monochrome intensity image or a color intensity image.

In yet another preferred embodiment, when shooting a still picture, the polarized light source irradiates the object with polarized light while changing the polarization planes. But when shooting a moving picture, the polarized light source irradiates the object with non-polarized light, of which the polarization planes are random, thereby increasing the resolutions of the still picture and the moving picture.

In yet another preferred embodiment, the polarized light source includes: a number of divided light sources, which are able to emit light independently of each other; and a number of patterned polarizers, which are arranged to face those divided light sources. The direction of the polarization plane of the linearly polarized light is defined by the direction of the polarization transmission axis of a patterned polarizer, through which light that has been emitted from some of the divided light sources is transmitted.

In yet another preferred embodiment, the resolution increasing processing section uses the magnitude of intensity variation, which has been caused by the change of the polarization plane, on a color component basis, thereby separating a component that has been specular reflected both of first and second times around and a component that has been diffuse reflected at least once from components that have been inter-reflected from the object's surface.

In yet another preferred embodiment, the resolution increasing processing section divides each pixel of the intensity image into multiple regions, and estimates the intensity, normal and area ratio of each said region, according to the reflection state at the object's surface, thereby determining a normal histogram within that pixel.

In this particular preferred embodiment, the multiple regions form at least one groove that runs in one direction within each said pixel.

In yet another preferred embodiment, the resolution increasing processing section estimates a normal histogram within a single pixel of the intensity image by using an inter-reflection phenomenon of light to be produced on the object's surface by irradiating the object's surface with the polarized light that has come from substantially vertical direction to the object.

In yet another preferred embodiment, the resolution increasing processing section estimates a normal histogram within a single pixel of the intensity image by using an inter-reflection phenomenon of light to be produced on the object's surface.

In yet another preferred embodiment, the resolution increasing processing section determines the arrangement of the subpixel regions within the single pixel based on the normal histogram estimated within the single pixel, thereby generating a high-resolution normal image.

In yet another preferred embodiment, the multiple regions include: an S region that reflects the polarized light only once, thereby making the reflected light reach the camera; a T region that inter-reflects the polarized light twice, thereby making the reflected light reach the camera; and a D region that does not make the reflected light reach the camera.

An image processing method according to the present invention includes the steps of: irradiating the surface of an object with polarized light that is linearly polarized light, of which the polarization plane changes sequentially; capturing an intensity image of the object's surface based on the light that has been reflected from the object's surface; and estimating normals to subpixel regions, each of which is smaller than a single pixel, at the object's surface by detecting how much the intensity of the intensity image has varied as the polarization plane changes, and increasing the resolution of the intensity image using the normals estimated. When the camera captures the intensity image of the object's surface, the polarization plane of the linearly polarized light changes with the arrangement of the polarized light source and the camera fixed.

A program according to the present invention is executed by an apparatus that includes: a polarized light source for irradiating the surface of an object with polarized light that is linearly polarized light, of which the polarization plane changes sequentially; and a camera that has an image capturing plane, on which a number of photosensitive cells, each having a size corresponding to one pixel, are arranged, and that captures an intensity image of the object's surface based on the light that has been reflected from the object's surface. The program is defined to make the apparatus perform the steps of: irradiating the object's surface with the polarized light that is linearly polarized light, of which the polarization plane changes sequentially; capturing the intensity image of the object's surface based on the light that has been reflected from the object's surface, and estimating normals to subpixel regions, each of which is smaller than a single pixel, at the object's surface by detecting how much the intensity of the intensity image has varied as the polarization plane changes, and increasing the resolution of the intensity image using the normals estimated.

The image processor of the present invention obtains information about the uneven structure of microscopic regions within each single pixel on an object's surface by irradiating the object's surface with polarized light with mutually different polarization states, and estimates the distribution of normals on the uneven structure within the single pixel. As a result, according to the present invention, there is no need to move the light source a long distance anymore.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7B is schematic representations illustrating how intensity pattern images change as the polarization plane of a polarized light source rotates.

FIGS. 25($a$), 25($b$) and 25($c$) show how normals may be allocated (part 3).

FIGS. 28($a$) and 28($b$) show an eight-dimensional arrangement space.

FIGS. 41($a$) and 41($b$) illustrate type 1) of interreflection.

FIGS. 42($a$) and 42($b$) illustrate type 2) of interreflection.

FIGS. 43($a$) and 43($b$) illustrate type 3) of interreflection.

DETAILED DESCRIPTION OF PREFERRED EMBODIMENTS

An image processor according to the present invention includes a polarized light source for irradiating the surface of an object with polarized light that is linearly polarized light, of which the polarization plane changes sequentially, and a camera as an image capture device. The camera has a number of photosensitive cells, each having a size corresponding to one pixel, and captures an intensity image of the object's surface based on the light that has been reflected from the object's surface. The image processor of the present invention further includes a resolution increasing processing section for increasing the resolution of the intensity image. The resolution increasing processing section estimates normals to sub-pixel regions, each of which is smaller than a single pixel, at the object's surface by detecting how much the intensity of the intensity image has varied as the polarization plane changes, and increases the resolution of the intensity image using the normals estimated. According to the present invention, when the camera captures the intensity image of the object's surface, the polarization plane of the linearly polarized light changes with the arrangement of the polarized light source and the camera fixed. By using the polarization state of the light, the distribution of normals (i.e., a normal histogram) within a single pixel can be obtained even without moving the light source a long distance.

Figure 1A:
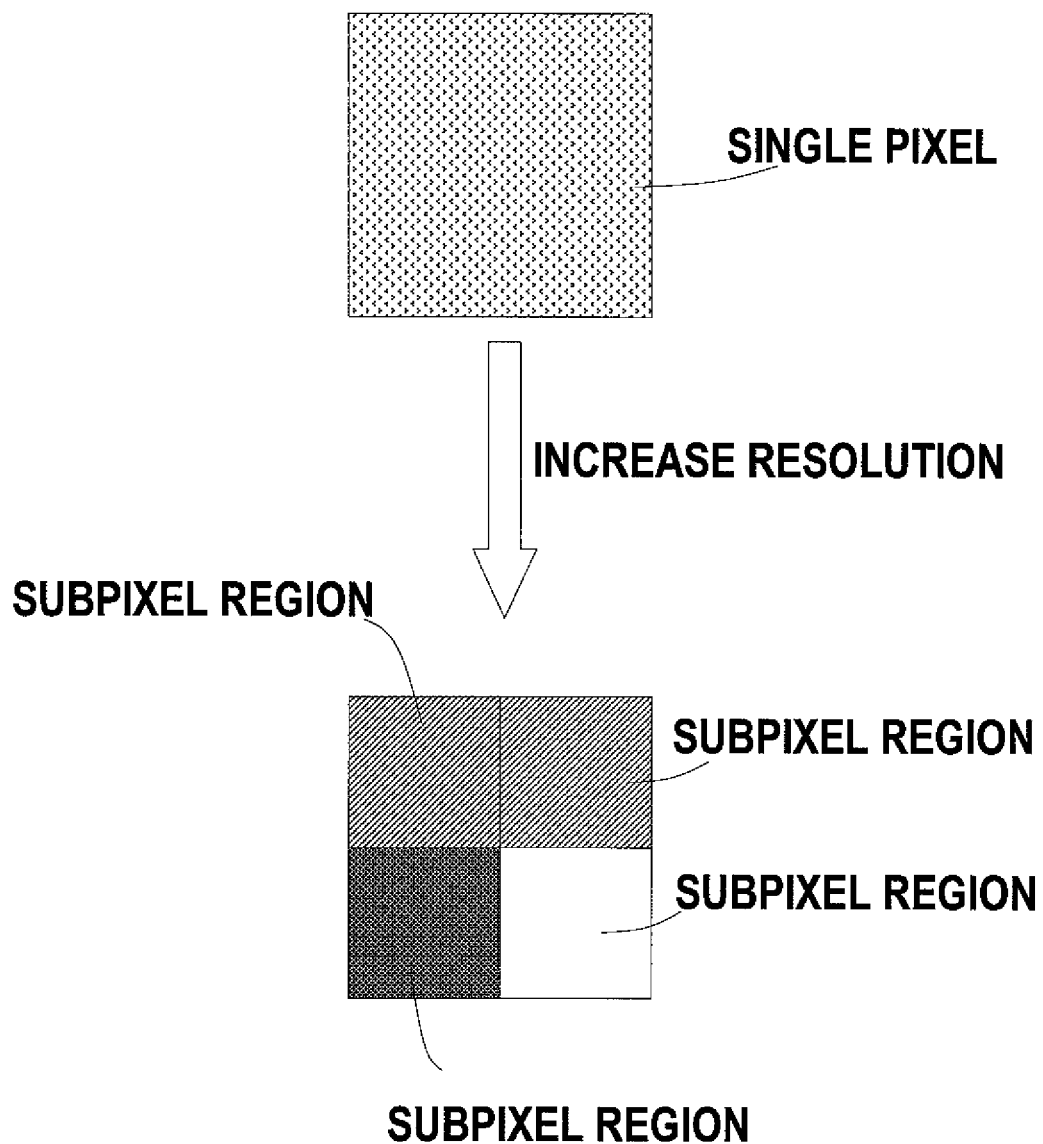
FIG. 1A illustrates how to increase the resolution.

As used herein, to "increase the resolution" basically means estimating the respective intensities of multiple subpixel regions, which are included in a single pixel with an averaged intensity, thereby increasing the resolution of an intensity image as shown in FIG. 1A. The respective intensities of those multiple subpixel regions that are included in a single pixel can be determined by defining normals to those subpixel regions. The resolution increasing processing section may be implemented not only as a dedicated piece of hardware but also as a combination of software and hardware. The resolution increasing processing section of the present invention can be formed by installing software (i.e., a program) that performs the processing of the present invention into a piece of hardware (i.e., a processor) with a known configuration, for example. Such a program is preferably introduced into the image processor after having been recorded on a storage medium but may also be installed into the image processor either over a telecommunications line or wirelessly.

As will be described in detail later, first of all, a normal histogram within a single pixel is obtained according to the present invention by taking advantage of the interreflection at the object's surface that is irradiated with polarized light. After that, the arrangement of subpixel regions that are associated with the respective normals that form that normal histogram is determined.

It should be noted that the size of "each pixel" corresponds to that of an associated one of the photosensitive cells (photodiodes) that are arranged on the image capturing plane of an image sensor. Normally, one photosensitive cell corresponds to one pixel. But in some cases, the center of four adjacent photosensitive cells may function as one pixel. Even so, the size of a single pixel also corresponds to that of a photosensitive cell.

Hereinafter, preferred embodiments of an image processor according to the present invention will be described with reference to the accompanying drawings.

(Embodiment 1)

Figure 1B:
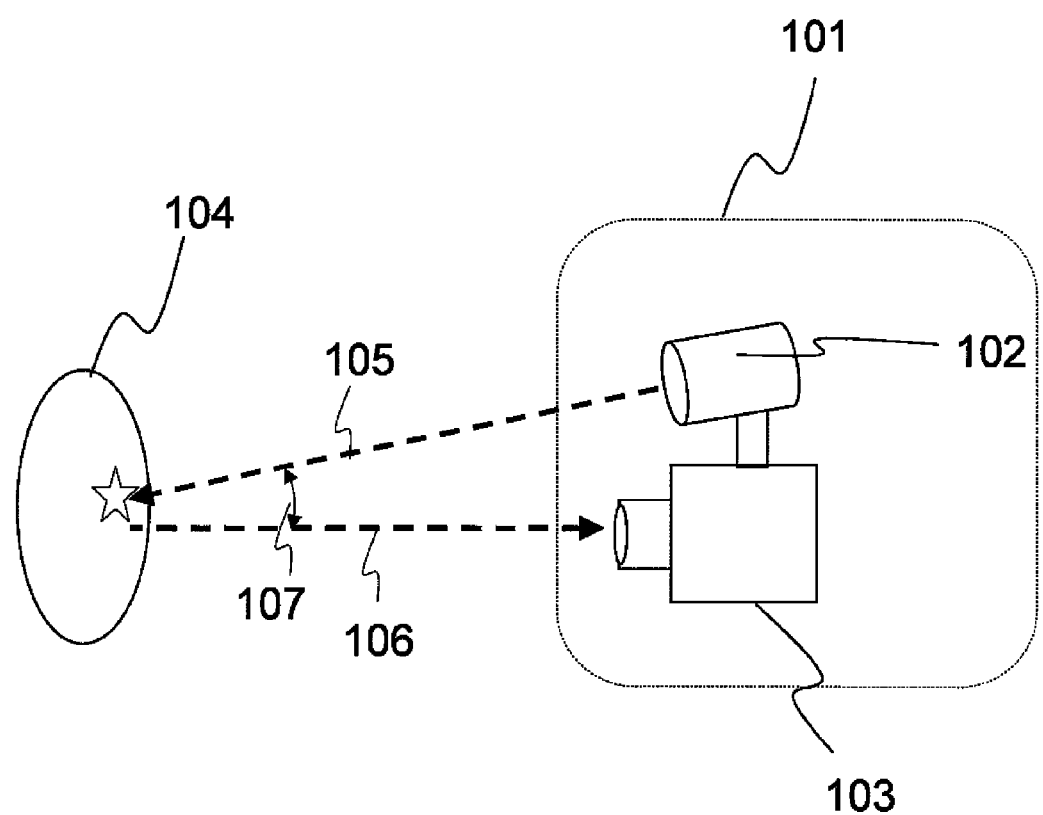
FIG. 1B illustrates a first preferred embodiment of the present invention.

FIG. 1b Schematically Illustrates an Overall arrangement for an image processor as a first specific preferred embodiment of the present invention.

The image processor 101 of this preferred embodiment with a flexible zoom function includes a polarized light source 102 and a polarization camera 103. The object 104 being shot is irradiated with polarized light 105 by the polarized light source 102. The polarized light 105 is reflected from the surface of the object 104 (to be polarized reflected light 106) to reach the polarization camera 103, thereby recording polarization information in the polarization camera 103. As will be described later, the polarization camera 103 can obtain both an intensity image and polarization information of the object 104.

In this case, the angle LV 107 defined between the polarized light 105 and the polarized reflected light 106 is preferably 10 degrees or less. By setting the angle LV 107 to be such a small value, information about the microscopic uneven structure on the object 104 can be obtained by using the interreflection that has been produced by that microscopic uneven structure. On top of that, by decreasing the angle LV 107 to such a value, the influence of the shadow at the surface of the object 104 can be reduced. According to the Fresnel reflection theory, it can be seen that if the angle LV 107 is set to be 10 degrees or less, the P and S polarized light rays of the light will behave in substantially the same way on a natural object with a refractive index of 1.4 to 2.0. This will be described in detail later.

Figure 2:
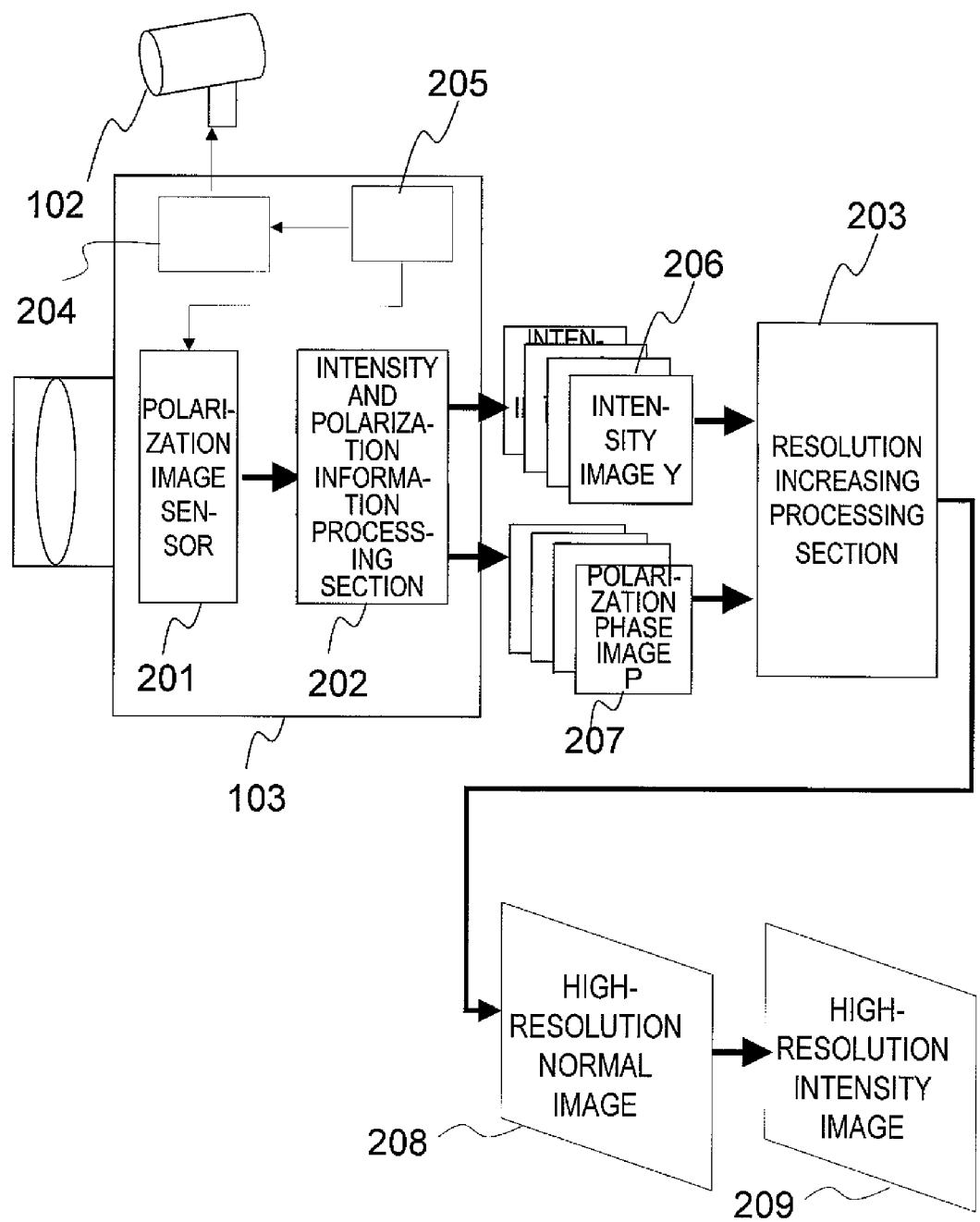
FIG. 2 illustrates a configuration for an image processor according to the first preferred embodiment of the present invention.

FIG. 2 illustrates an exemplary configuration for a polarization camera 103 according to this preferred embodiment.

This polarization camera 103 includes a polarization image sensor 201, an intensity and polarization information processing section 202, a polarization plane control section 204 and an image capturing control section 205.

Every time the polarization plane control section 204 changes the polarization plane of the polarized light, an image is captured. As a result, a number of intensity images Y (206) and a number of polarization phase images P (207) that are associated with multiple different polarization states of those polarization planes are obtained. Then, a resolution increasing processing section 203 generates a high-resolution normal image 208 and a high-resolution intensity image 209.

The polarization camera 103 of this preferred embodiment can obtain a monochrome image and a polarized image in real time at the same time. Then, the polarization camera 103 outputs three different kinds of image data as an intensity image Y, a degree-of-polarization image D and a polarization phase image P, respectively.

The polarization image sensor 201 that is built in the polarization camera 103 captures an intensity image and an object's partial polarization image at the same time. For that purpose, in the polarization image sensor 201, an array of fine patterned polarizers with multiple different polarization main axes is arranged on the array of image sensors such as CCD sensors or MOS sensors. To make the fine patterned polarizers, photonic crystals, form-birefringent micro retarders or wire grids may be used, for example. Such a configuration is disclosed in Patent Document No. 1.

Figure 3:
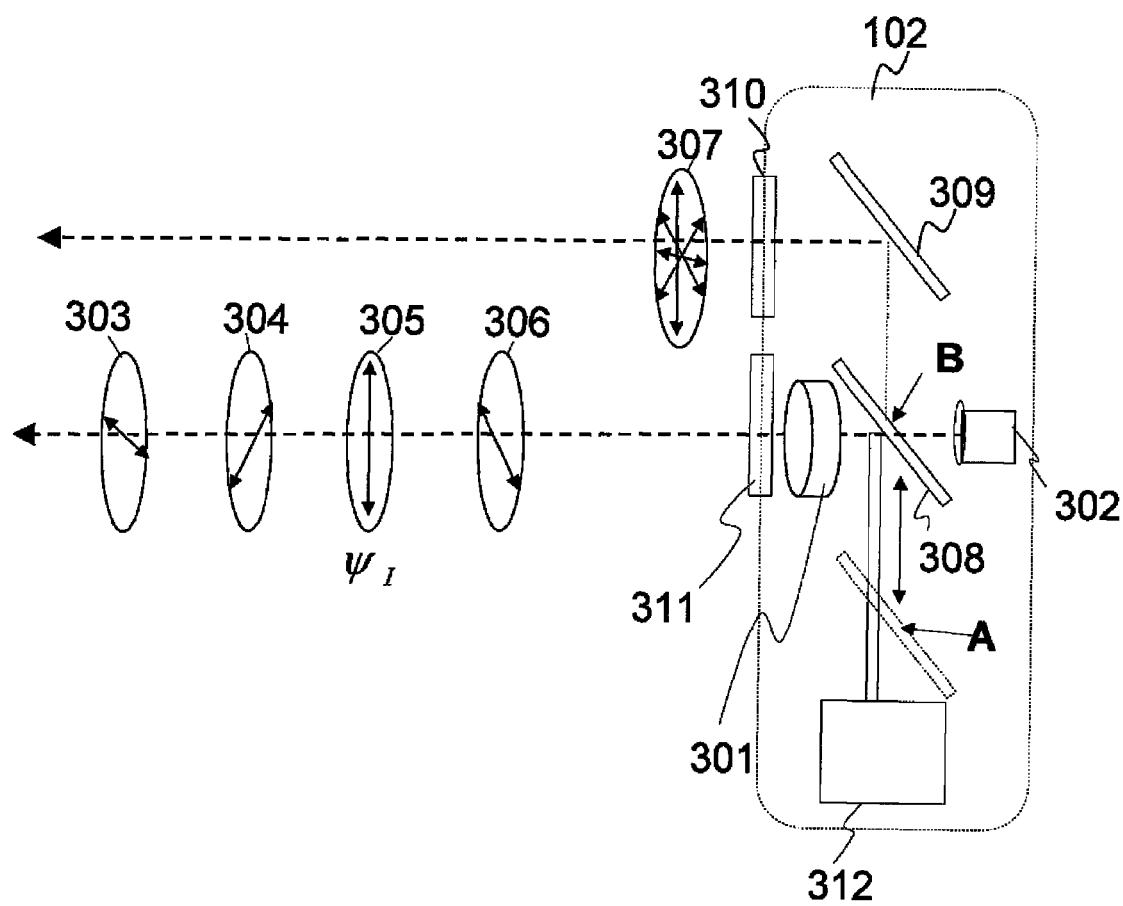
FIG. 3 illustrates an arrangement for a polarized light source.

FIG. 3 illustrates an exemplary arrangement for the polarized light source 102, which includes a polarization filter section 301, a light source 302 that produces non-polarized light, a movable mirror 308, a mirror 309, a movable mirror control section 312, and shutters 310 and 311.

The polarization filter section 301 may be implemented as a voltage-controlled liquid crystal device including a twisted nematic liquid crystal cell and a polarization film in combination. The polarization filter section 301 transforms the non-polarized light that has been produced by the light source 302 into a linearly polarized light ray, of which the polarization plane is defined by an arbitrary polarization angle. Examples of devices that can rotate its polarization plane are disclosed in Patent Document No. 2 and Japanese Patent Application Laid-Open Publication No. 2007-316161 (Hereinafter, Patent Document No. 3) and Non-Patent Document No. 3, for instance.

The movable mirror 308 is movable between the positions A and B shown in FIG. 3. When the movable mirror 308 is located at the position A, the light emitted from the light source 302 is transmitted through the polarization filter section 301 and the shutter 311 and irradiates the object while rotating its polarization plane. At the same time, an image is captured. And this image capturing operation is performed a number of times. Specifically, a first image is captured when the polarization plane forms an angle of 0 degrees (i.e., in the state 303 shown in FIG. 3). A second image is captured when the polarization plane forms an angle of 45 degrees (i.e., in the state 304 shown in FIG. 3). A third image is captured when the polarization plane forms an angle of 90 degrees (i.e., in the state 305 shown in FIG. 3). And a fourth image is captured when the polarization plane forms an angle of 135 degrees (i.e., in the state 306 shown in FIG. 3).

According to Patent Document No. 1 cited above, it takes approximately 20 ms to rotate the polarization plane. It can be said that that amount of time is within one frame period of a moving picture. Therefore, if the object is shot with the polarization plane rotated in the four directions described above, one set of shooting sessions can get done in substantially 8 frame periods (≈approximately 0.5 sec). It is preferred that the relative movement of the object to the camera be zero in the meantime.

Optionally, the object may be irradiated with non-polarized light with the polarization filter section 301 turned OFF. In that case, the movable mirror 308 is moved to the position B shown in FIG. 3. Then, the light emitted from the light source 302 is guided to the mirror 309, transmitted through the shutter 310 and then irradiates the object. In such a situation, the polarization plane of the light faces random directions as indicated by the reference numeral 307. In this manner, when one of these two shutters 310 and 311 is opened, the other shutter is closed, thereby preventing a polarized light ray and a non-polarized light ray from irradiating the object at the same time.

Figure 4:
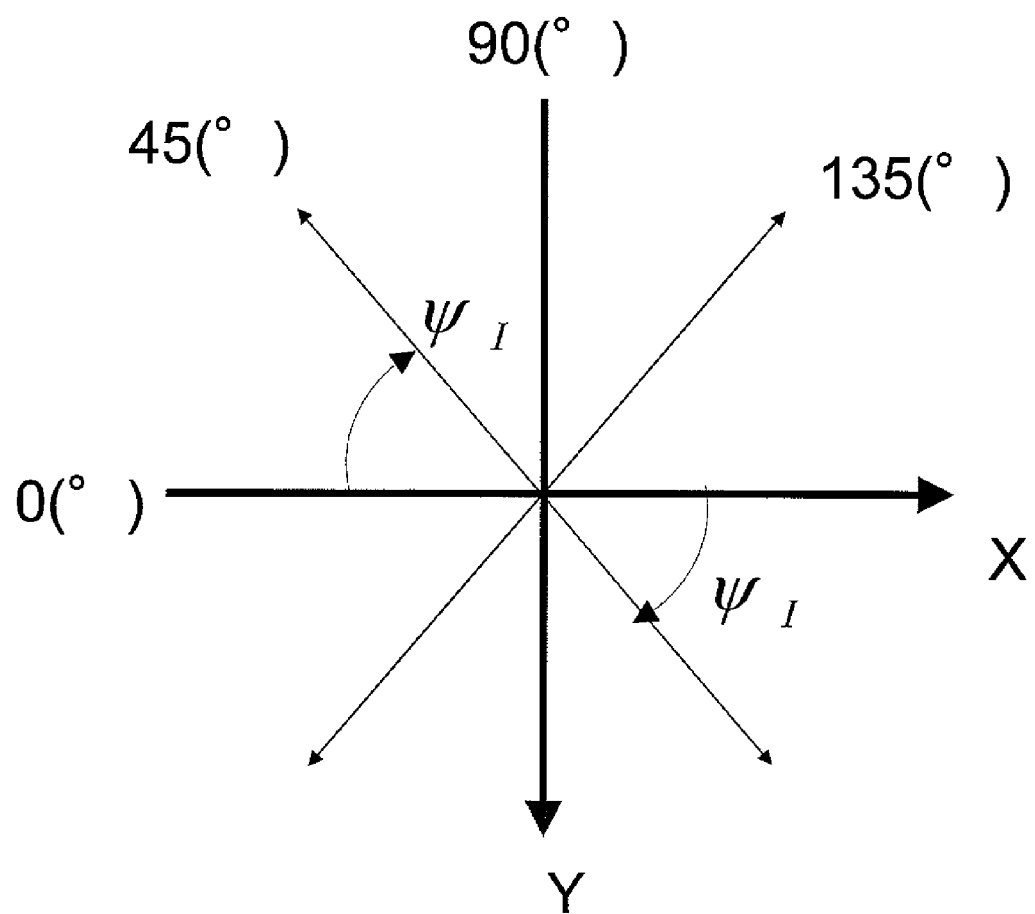
FIG. 4 illustrates how the angle of a polarization plane is defined.

FIG. 4 shows how the polarization plane $\Psi_I$ is defined herein. An X-Y coordinate system is defined so as to face the object. With zero degrees set on the negative domain of the X-axis, the angle of rotation of the polarization plane is defined clockwise with respect to the X-axis so as to start with the positive domain of the Y-axis. If the angle of incidence of the polarization plane $\psi I$ is saved when the light is reflected, then the angle of the polarization plane of the reflected light becomes the same as that of the incident light.

Figure 5:
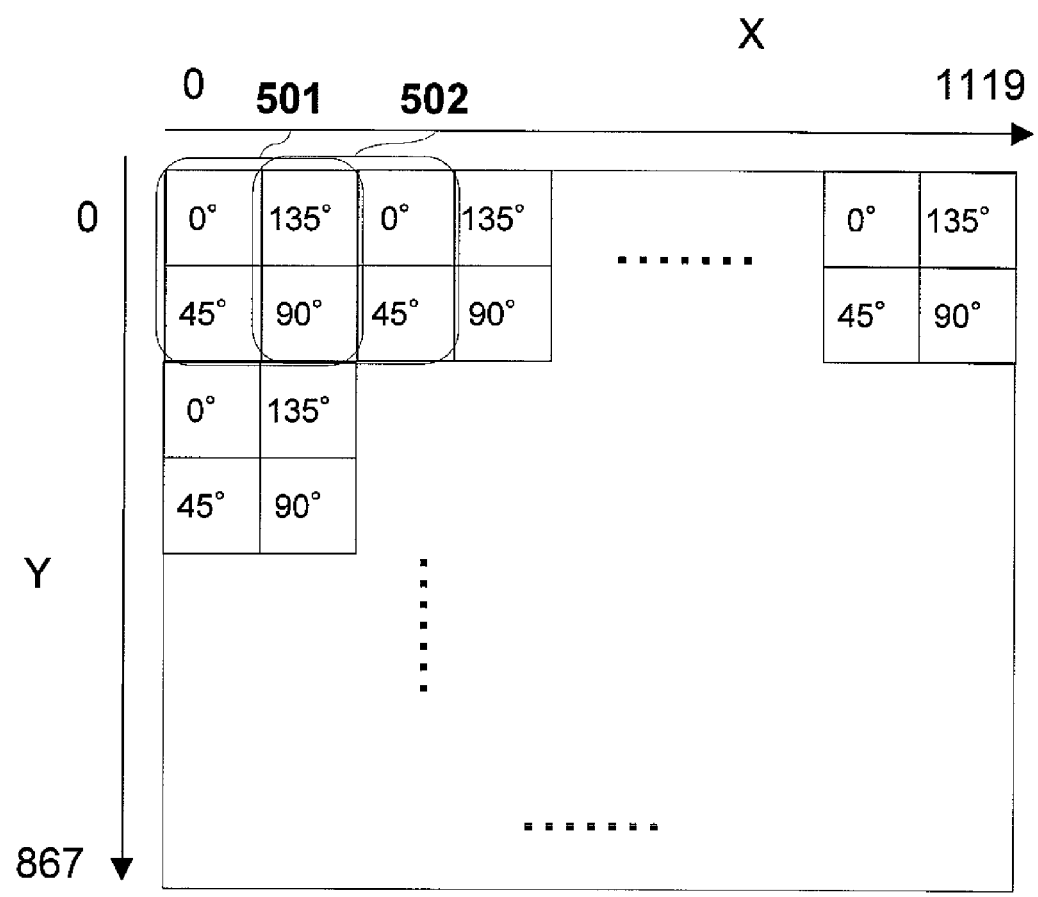
FIG. 5 illustrates how photosensitive cells may be arranged in an image sensor for a polarization camera.

FIG. 5 illustrates the image capturing plane of the polarization image sensor 201. On this image capturing plane, a number of photosensitive cells (or photodiodes) are arranged regularly in columns and rows. Each of these photosensitive cells generates, by photoelectric conversion, an electrical signal representing the quantity of the incident light that has struck the cell. In the polarization camera 103 of this preferred embodiment, the image capturing plane is covered with an array of patterned polarizers. In this case, each photosensitive cell of the polarization image sensor 201 is associated with one patterned polarizer. Four patterned polarizers that are associated with four adjacent photosensitive cells have their polarization transmission planes defined by angles of 0, 45, 90 and 135 degrees, respectively. Each of the two sets of pixels 501 and 502 shown in FIG. 5 consists of 2×2 pixels, and the center of one set of pixels 502 has shifted from that of the other set of pixels 501 by one pixel. After data has been obtained from the former set of four pixels 502, data can be obtained from the latter set of four pixels 501. By processing these 2×2 pixel windows while shifting them by one pixel in this manner, both the polarization information and the intensity information can be obtained without substantially decreasing the resolution. Specifically, if the resolution of the image sensor (which is represented by the number of pixels or photodiodes) is 1,120×868, then Y, D and P images of 1,119× 867 pixels can be obtained.

In the example illustrated in FIG. 5, based on the signals supplied from four adjacent photosensitive cells, polarization information of their center region can be obtained. For example, the center region of the set of four pixels 501, which has a size corresponding to that of one photosensitive cell, functions as "one pixel". The size of one pixel corresponds to that of one photosensitive cell. However, the center of one pixel does not always agree with that of a photosensitive cell.

According to the present invention, a normal to a very small region, which is even smaller in size than a single photosensitive cell, can be estimated and the intensity in such a very small region can be obtained.

Figure 6:
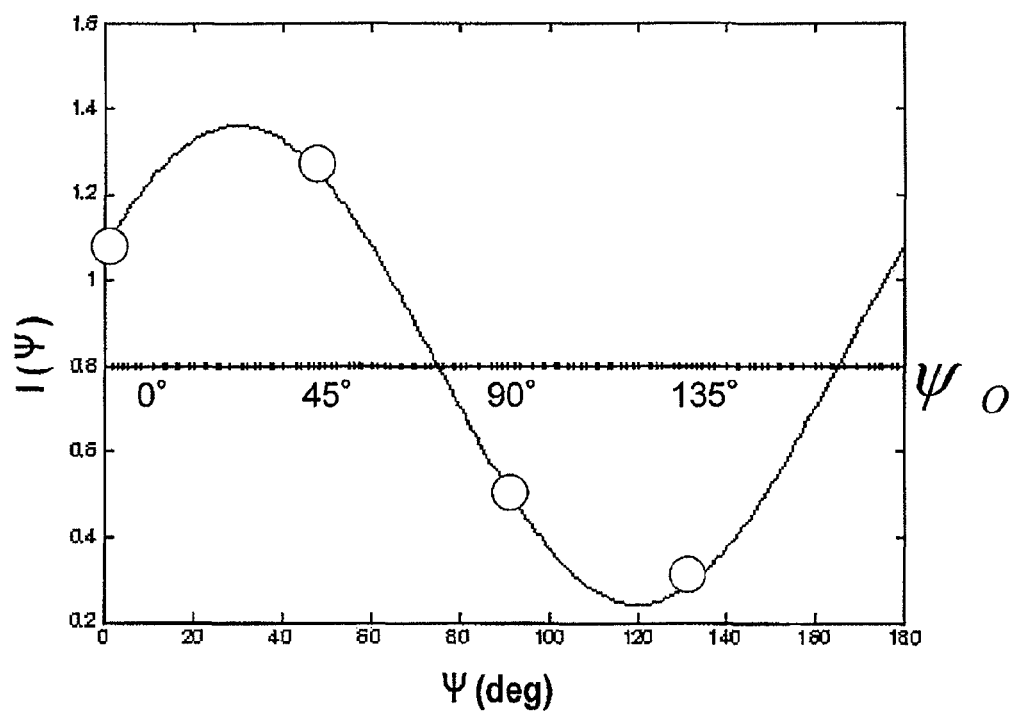
FIG. 6 shows how the intensity changes with polarization information in a polarization camera.

Next, it will be described with reference to FIG. 6 how to generate the intensity image Y and the polarization phase image P.

First of all, a sinusoidal function equation representing polarization information is supposed to be the following Equation (1):

$$f(\psi_O) = A_O \cos(2(\psi_O - \phi_O)) \tag{1}$$

where Ao represents the amplitude, ψo represents the polarization transmitting plane angle of the patterned polarizer, and φo represents the phase.

The intensity and polarization information processing section 202 shown in FIG. 2 calculates the intensity image Y based on the four intensity values of four polarization pixels, each of which has a polarization angle that is different by 45 degrees from that of its adjacent one, thereby generating the intensity image Y 206.

$$Y = \frac{1}{4}(I_0 + I_1 + I_2 + I_3) \tag{2}$$

The intensity and polarization information processing section 202 fits four intensity values sampled to a cosine function. First of all, the squared errors E of intensities at polarization angles of 0, 45 (=π/4), 90 (=π/2) and 135 (=3π/4) degrees are defined by the following Equation (3):

$$\begin{aligned}E &= (f(0) - I_0)^2 + \left(f\left(\frac{\pi}{4}\right) - I_1\right)^2 + \left(f\left(\frac{\pi}{2}\right) - I_2\right)^2 + \\&\quad \left(f\left(\frac{3\pi}{4}\right) - I_3\right)^2 \\&= (A_O \cos(2\phi_O) - I_0)^2 + (A_O \sin(2\phi_O) - I_1)^2 + \\&\quad (-A_O \cos(2\phi_O) - I_2)^2 + (-A_O \sin(2\phi_O) - I_3)^2\end{aligned} \tag{3}$$

The phase φo of a cosine function that minimizes this squared error is calculated by the following Equation (4):

$$\frac{\partial E}{\partial \phi_O} = (I_3 - I_1)\cos(2\phi_O) + (I_0 - I_2)\sin(2\phi_O) = 0 \tag{4}$$

As can be seen from this Equation (4), the solutions are given by the following Equations (5) and (6):

$$\begin{cases} \phi_O^{(+)} = \frac{1}{2}\cos^{-1}\left(\sqrt{\frac{c^2}{a^2+c^2}}\right) \\ \phi_O^{(-)} = \frac{1}{2}\cos^{-1}\left(-\sqrt{\frac{c^2}{a^2+c^2}}\right) \end{cases} \tag{5}$$

$$\begin{cases} a \equiv (I_3 - I_1) \\ c \equiv (I_0 - I_2) \end{cases} \tag{6}$$

Generally speaking, when a software program is installed, the following constraint will be imposed on a mathematical function such as an inverse trigonometric function:

$$0 \leq a\cos(x) \leq \pi \quad (7)$$

Considering this angular range, the angles at which the minimum and maximum values are obtained can be calculated by supposing the following four different situations based on the combinations of a and c values:

$$\begin{cases} \text{If } a<0 \text{ and } c>0, & \psi_{O_{min}} = \frac{\pi}{2} + \phi_O^{(+)} & \psi_{O_{max}} = \phi_O^{(+)} \\ \text{If } a<0 \text{ and } c<0, & \psi_{O_{min}} = \frac{\pi}{2} + \phi_O^{(-)} & \psi_{O_{max}} = \phi_O^{(-)} \\ \text{If } a>0 \text{ and } c<0, & \psi_{O_{min}} = \phi_O^{(+)} & \psi_{O_{max}} = \frac{\pi}{2} + \phi_O^{(+)} \\ \text{If } a>0 \text{ and } c>0, & \psi_{O_{min}} = \phi_O^{(-)} & \psi_{O_{max}} = \frac{\pi}{2} + \phi_O^{(-)} \end{cases} \quad (8)$$

And the ψ max value, at which that maximum value is obtained, may be used as the polarization phase image P 207 as it is:

$$P = \psi_{O_{max}} \quad (9)$$

Next, the maximum and minimum values of the amplitudes are obtained. First, to obtain the amplitude Ao, the squared error is minimized by the following Equations (10) and (11):

$$\frac{\partial E}{\partial A_O} = 0 \quad (10)$$

$$A_O = \frac{1}{2}[(I_0 - I_2)\cos(2\phi_O) - (I_3 - I_1)\sin(2\phi_O)] \quad (11)$$

Using the amplitude Ao thus obtained, the maximum and minimum values of the amplitude become as follows:

$$I_{O_{max}} = Y + A_O$$

$$I_{O_{min}} = Y - A_O \quad (12)$$

As can be seen, according to this preferred embodiment, when a shooting session is performed once with the lighting condition fixed, two different kinds of image information about the intensity image Y and the polarization image P can be obtained based on the polarization image captured.

As described above, a resolution that is substantially as high as the image resolution of the image sensor can be obtained, and therefore, the resolution of the intensity image Y would be almost no different from that of an intensity image to be obtained without providing any patterned polarizer for the image sensor. On the other hand, the image sensor of this preferred embodiment can obtain not only the intensity image Y but also the polarization image P as well at the same time. Consequently, according to this preferred embodiment, the polarization phase and the degree of polarization are obtained as additional pieces of polarization information. That is to say, by using such a polarization camera, more information about the object's surface reflection can be obtained than the conventional intensity image information.

On top of that, according to this preferred embodiment, a shooting session is carried out using the polarization camera with the polarization plane of the polarized light changed. As a result, an image including information about microscopic subpixel regions within a single pixel, which could not be obtained just by capturing an intensity image, can also be obtained.

Figure 7A:
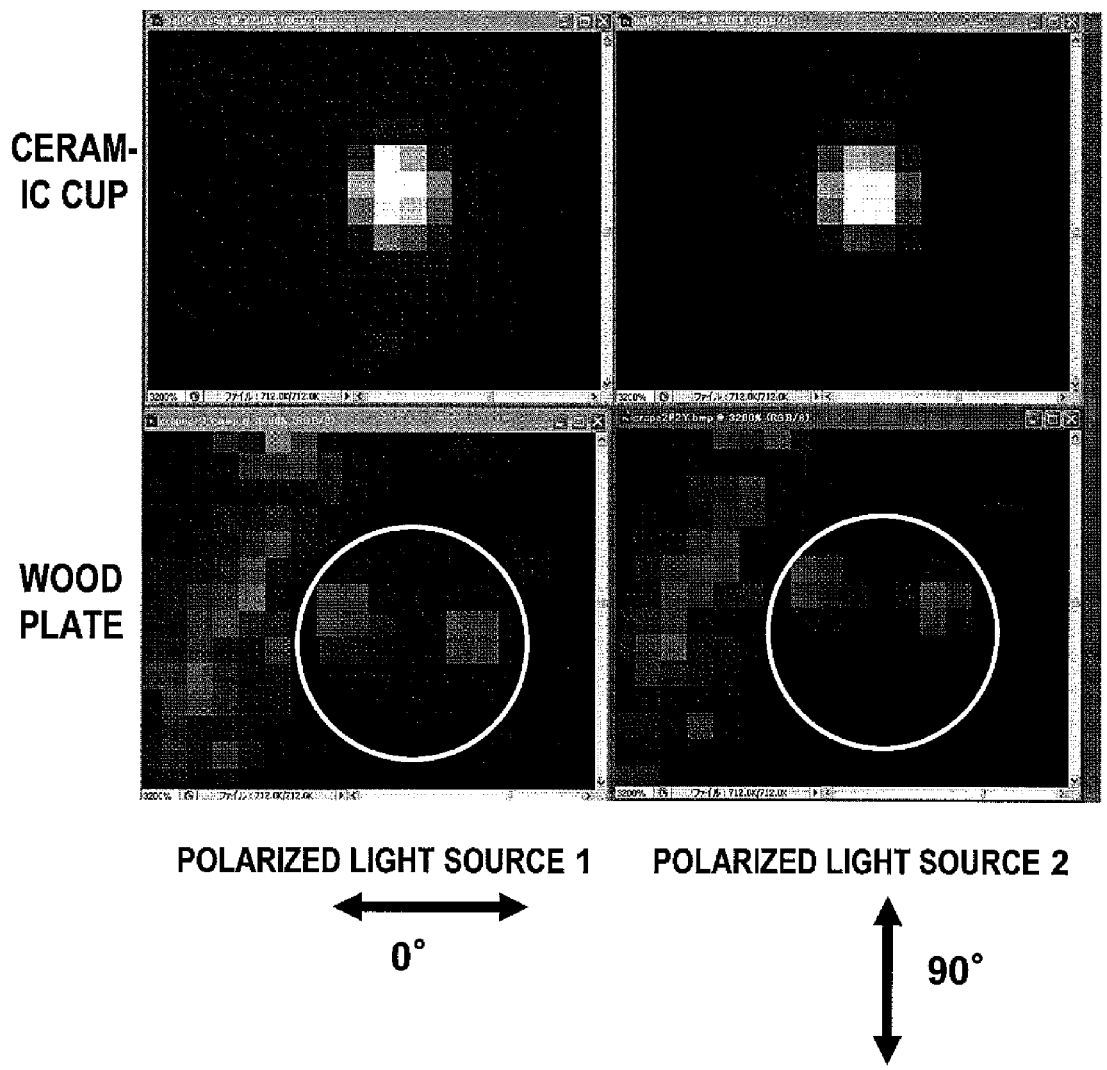
FIG. 7A illustrates how intensity pattern images change as the polarization plane of a polarized light source rotates.

FIGS. 7A and 7B illustrate polarization images of a ceramic cup with a smooth surface and a wood plate with microfacet that were captured as objects by the present inventors. Specifically, the two images on the left-hand side of FIG. 7A are polarization images that were obtained when the polarization plane of the light had an angle of 0 degrees. On the other hand, the two images on the right-hand-side of FIG. 7A are polarization images that were obtained when the polarization plane of the light had an angle of 90 degrees. Meanwhile, the four images shown in FIG. 7B are schematic representations of the four images shown in FIG. 7A. Each of the images shown in these drawings corresponds to the intensity image Y shown in FIG. 2.

As can be easily from the images shown at the top of FIGS. 7A and 7B, even if the polarization plane of the polarized light was changed, no significant variation was observed in the intensity pattern of the ceramic cup with the smooth surface. As for the wood plate with a lot of unevenness, on the other hand, it turned out that when the polarization plane of the polarized light was changed, a significant variation occurred in the intensity image observed as can be seen easily from the images shown at the bottom of FIGS. 7A and 7B.

Figure 8A:
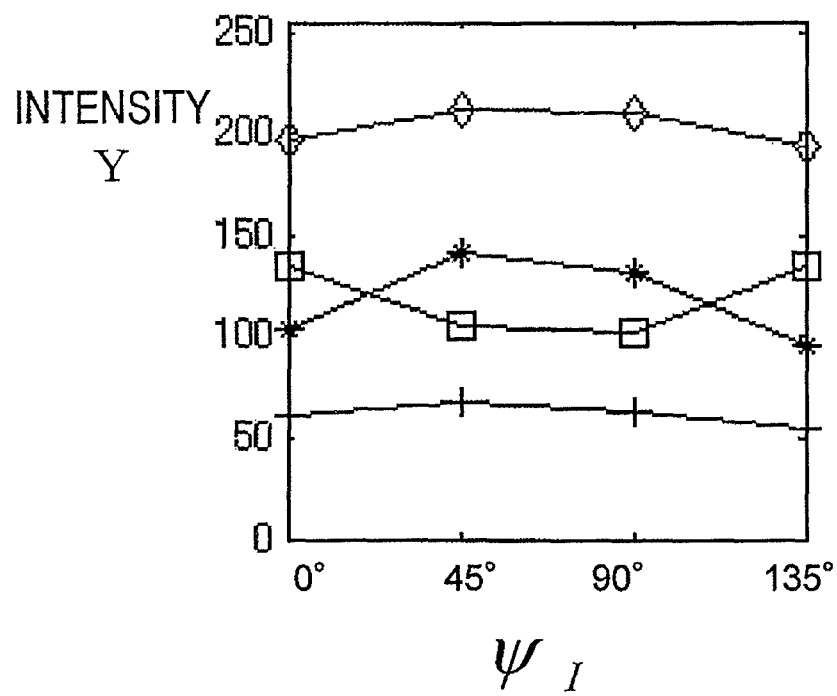
FIG. 8A is a graph showing how the intensity varies at respective pixels as the polarization plane of a polarized light source rotates.
Figure 8B:
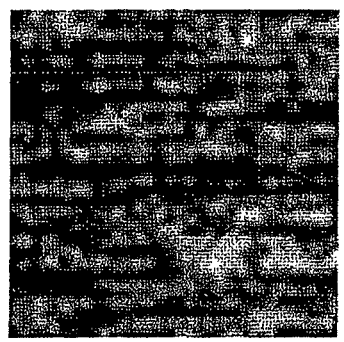
FIG. 8B is a photograph showing the surface shape of a sample that was used to collect the data shown in the graph of FIG. 8A.
Figure 8C:
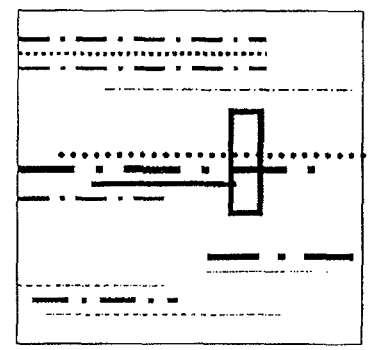
FIG. 8C schematically illustrates the surface shape shown in FIG. 8B.

FIG. 8A is a graph showing how the intensity value of the same pixel varied in a situation where an intensity image was captured with the polarization plane of the polarized light, impinging on the surface of a wood plate, changed. FIG. 8B is an intensity image of that wood plate as the object of shooting. And FIG. 8C schematically illustrates the surface unevenness of the wood plate shown in FIG. 8B.

FIG. 5A shows the intensities Y of a particular pixel of an intensity image that were obtained when the polarization plane of the polarized light had angles ψI of 0, 45, 90 and 135 degrees, respectively. As can be seen from this graph, the intensity Y varied periodically according to the angle ψI of the polarization plane of each polarized light. Such information about the dependence of the intensity Y on the angle ψI will never be obtained just by capturing a polarization image normally without changing the polarization state of the light.

Figure 9:
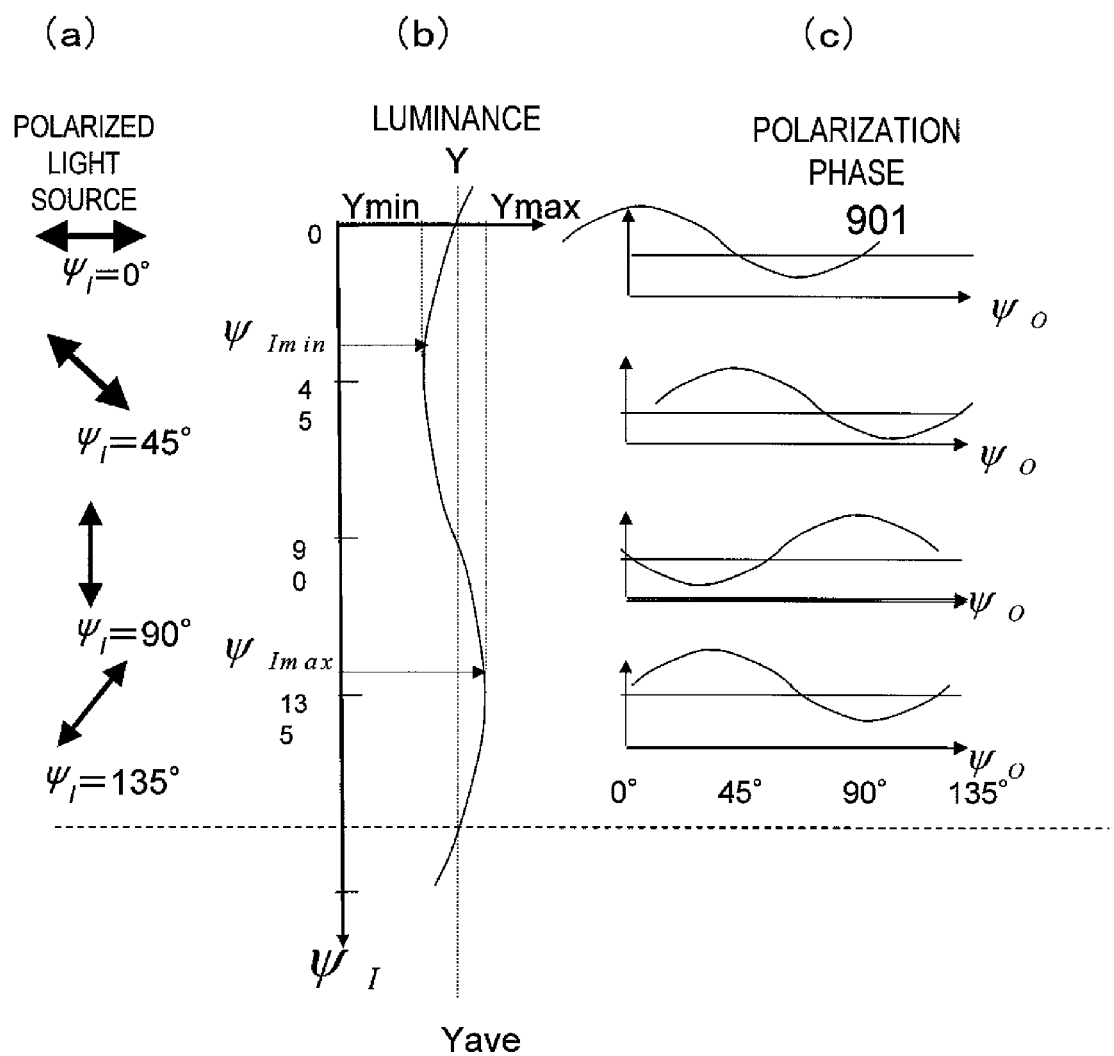
FIG. 9 shows what a variation in intensity means in a polarized light source.

Portions (a) through (c) of FIG. 9 show what information was obtained when a polarization image was produced with the angle ψI of the polarization plane of the polarized light changed from one of 0, 45, 90 and 135 degrees into another. Specifically, portion (a) of FIG. 9 shows the angle of the polarization plane of the light. The polarized light is reflected from the object and then incident on polarization pixels, which form a mosaic pattern associated with four patterned polarizers, of which the polarization transmission axes have angles ψO of 0, 45, 90 and 135 degrees, respectively. In each of the graphs shown in portion (c) of FIG. 9, the curve 901 represents the spatial variation of the intensity obtained in each polarization pixel with one of those four angles. The polarization phase of the curve 901 corresponds to a spatial variation that is obtained with respect to the angle ψO of the polarization transmission axis at four pixels' locations of the polarizer mosaic on each photosensitive cell shown in FIG. 5. It should be noted that the variation in intensity Y is a variation with time that is obtained on the axis of ψI as the polarization plane of the light changes (see portion (b) of FIG. 9).

Suppose a function representing such a variation in intensity Y needs to be approximated as a cosine function with a period of 180 degrees. In that case, the angle ψI of the polarization plane of the light is represented by the following Equation (13):

$$Y(\psi_I) = A_I \cos(2(\psi_I - \phi_I)) \quad (13)$$

This function includes three kinds of information about amplitude, phase and average. In this case, information about the maximum and minimum values Ymax and Ymin that use the amplitude and the average and information about the angles ψImax and ψImin that produce the maximum and minimum values need to be obtained. The technique for estimating those four values by fitting a cosine function based on four angular samples that have been obtained at regular intervals, which has already been described with respect to Equations (1) through (12), may also be used as it is.

A theoretical intensity of the original image may be obtained as a non-polarized normal input intensity by the following Equation (14):

$$Y_{AVE} = \frac{1}{4}(Y(0°) + Y(45°) + Y(90°) + Y(135°)) \quad (14)$$
$$\approx \frac{1}{2}(Y_{max} + Y_{min})$$

Hereinafter, a model representing the unevenness of an object's surface within a single pixel will be described.

The microscopic unevenness model adopted in this preferred embodiment is a "microfacet model", which is used extensively in the field of physics-based computer graphics.

Figure 10:
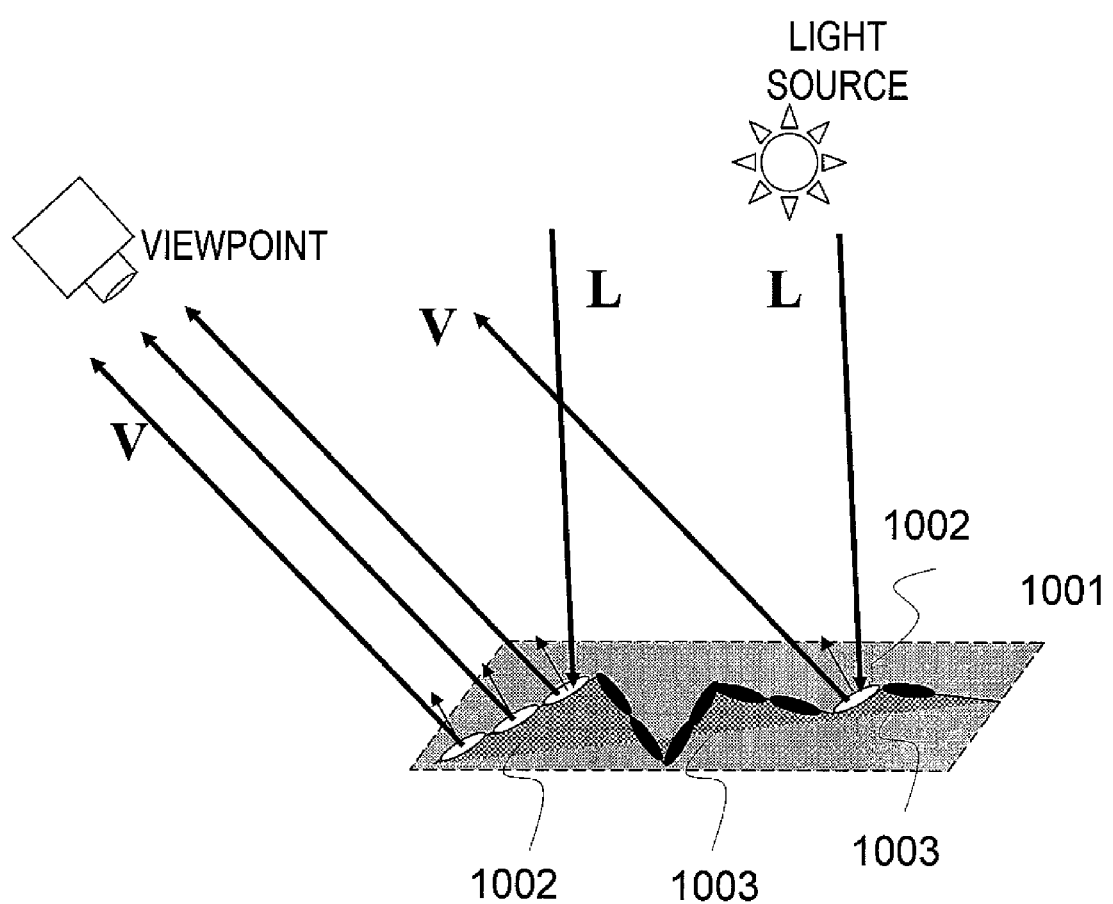
FIG. 10 illustrates a microfacet model.

FIG. 10 is a perspective view illustrating the distribution of microscopic normals within a single pixel to be obtained when a surface with unevenness is observed. A region 1001 representing a single pixel of a camera has an average intensity but its internal intensity distribution is unknown. That is to say, the internal structure of a single pixel cannot be sensed by shooting.

According to this microscopic unevenness model, the surface is supposed to be formed of a lot of virtual microfacets that produce only specular reflection and each of those microfacets can have a microscopic normal defined to itself. Since each microfacet produces only specular reflection, some group of microfacets 1002 shines but another group of microfacets 1003 does not shine depending on the angular relation between the lighting direction L and the viewing direction V. In this case, the sum of the intensities of all of those shining microfacets 1002 within a single pixel corresponds to the average intensity of that pixel. On the other hand, the intensity of non-shining microfacets is zero, which means those microfacets are solid black.

Figure 11:
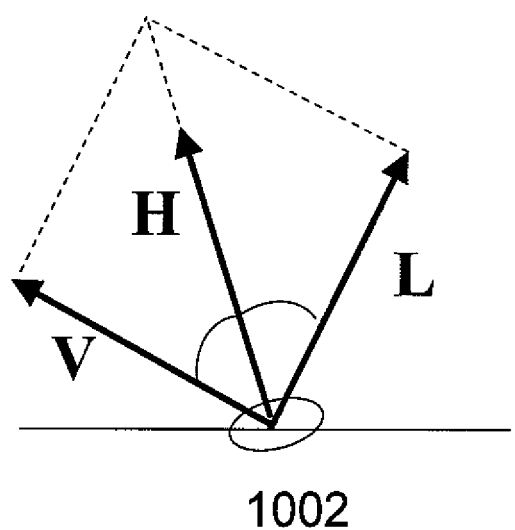
FIG. 11 shows the directions of microscopic normals that are defined with respect to a microfacet.

As shown in FIG. 11, a normal defined to the shining microfacet 1002 is equivalent to an evenly split vector H between the lighting direction vector L and the viewing direction vector V. In other words, to estimate the unevenness within a single pixel means estimating a microscopic normal with respect to the microfacet.

Next, it will be described what if polarized light has been incident on a microfacet. In this case, however, the angle defined between the lighting direction of the incident polarized light and the viewing direction of the camera that is shooting the object is supposed to be close to zero degrees just like the angle 107 shown in FIG. 1B, which is a special geometric relation.

Figure 12:
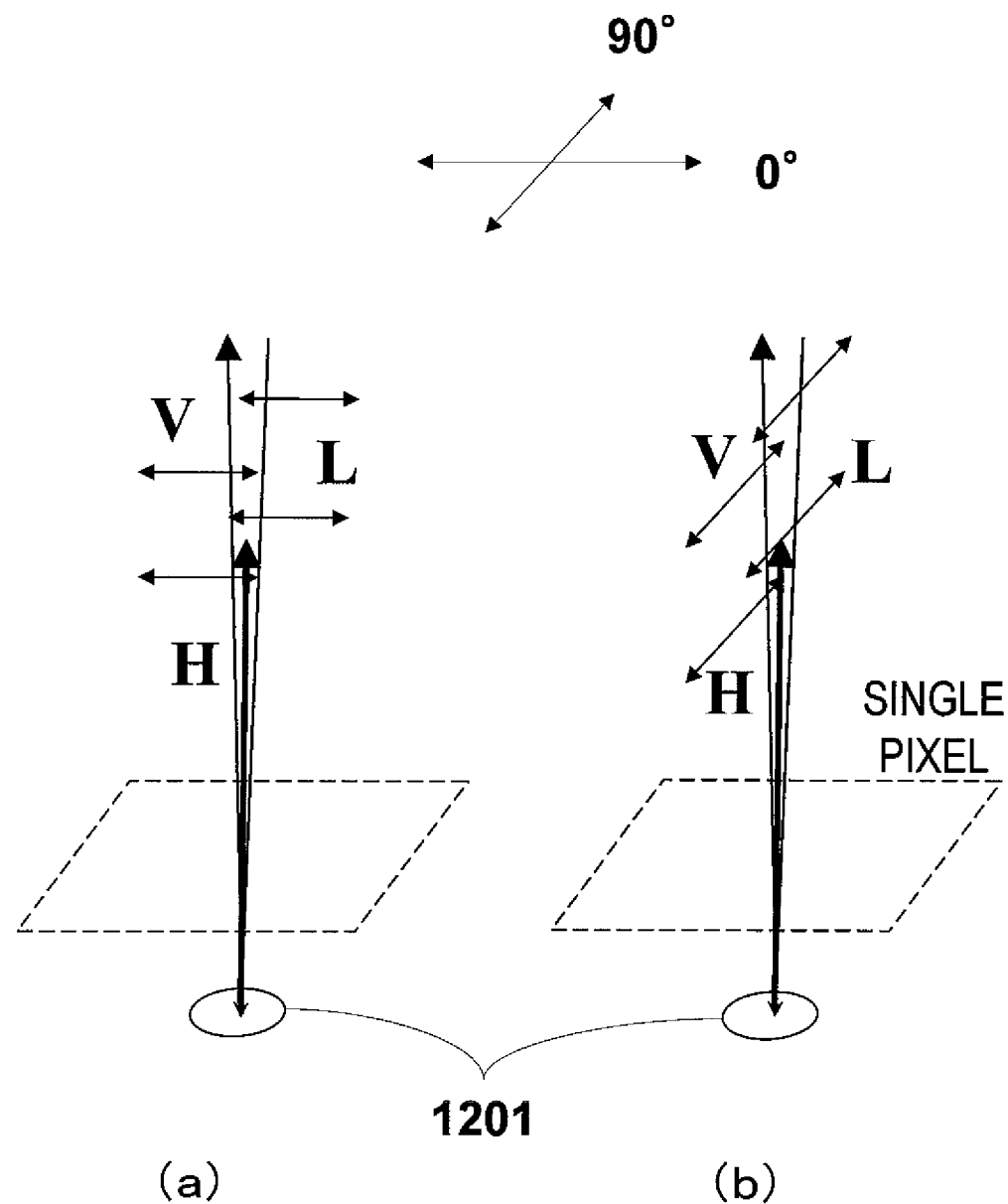
FIG. 12 illustrates how incoming light is specular reflected from a microfacet.
Figure 13:
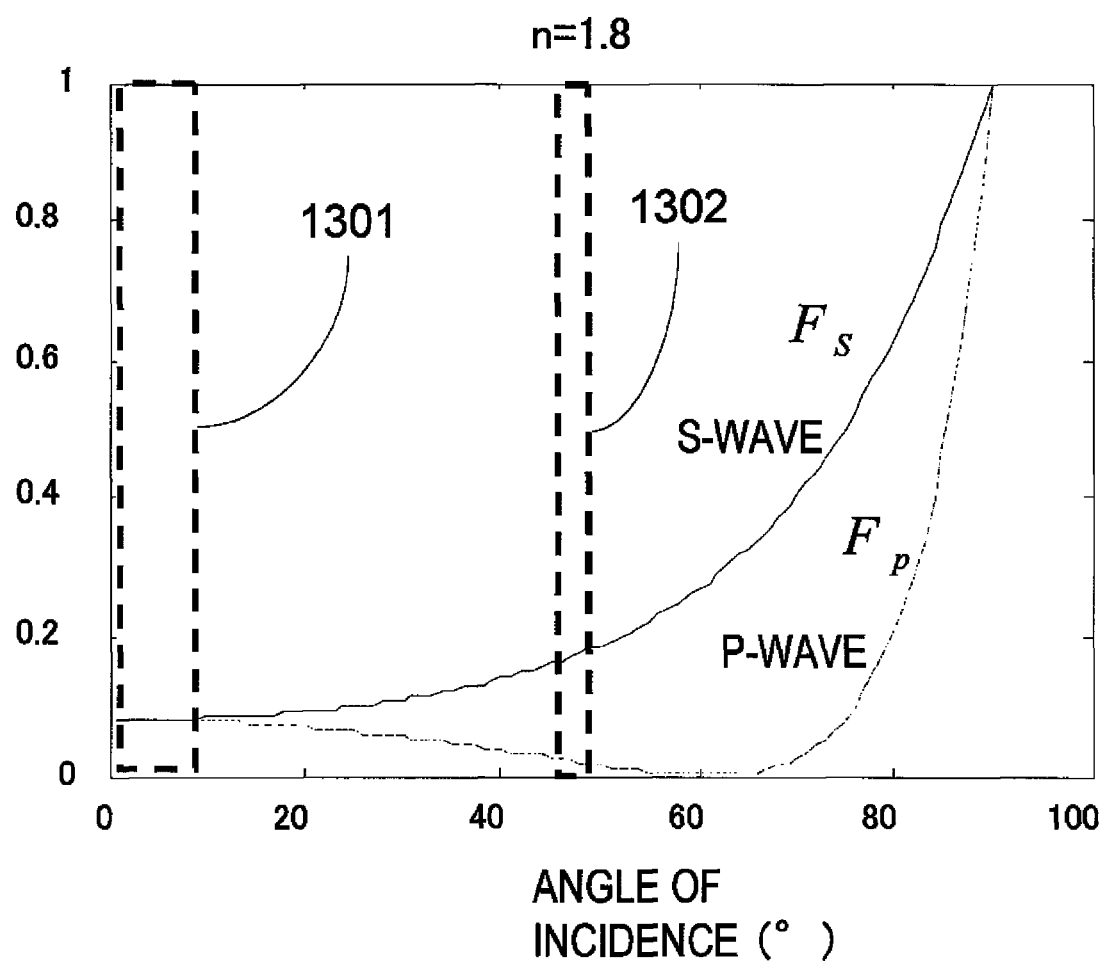
FIG. 13 is a graph showing how the Fresnel reflectances of P- and S-waves change with the angle of incidence.

FIG. 12 illustrates how polarized light is incident on the microfacet 1201 at an angle of incidence that is close to zero degrees and how the specular reflected light is observed with a camera. The respective angles defined by the polarization planes of the incident polarized light are different from each other by 90 degrees between portions (a) and (b) of FIG. 12. However, even though the reflected light travels in a different direction from the incident light, the polarization information of the reflected light is almost the same as that of the incident light for the following reasons:

FIG. 13 is a graph showing the dependence of the Fresnel reflectance on the angle of incidence. In FIG. 13, the abscissa represents the angle of incidence and the ordinate represents the Fresnel reflectance. These dependence curves are drawn on the supposition that the refractive index n is 1.8. The angles of incidence of around 0 through around 10 degrees, which can be regarded as representing substantially perpendicular incidence, fall within the range 1301. As can be seen from this graph, both P and S polarized light rays have substantially the same reflectance in this range 1301. Therefore, if the polarized light is incident substantially perpendicularly onto the surface, then it makes almost no difference for the surface, no matter whether the polarized light is actually a P-polarized light ray or an S-polarized light ray. This fact is satisfied extensively by any natural object with a refractive index n of 1.4 to 2.0.

In a situation where the angle of incidence is less than 10 degrees, the reflectance hardly changes and the energy of the reflected light does not change even if the polarized light is rotated. As a result, the intensity measured remains the same. That is to say, no intensity variations will arise even when the polarization plane of the incident light is rotated. In that case, the dependence of the intensity Y on the angle ψI should be totally different from the result of experiment shown in FIG. 8A.

Figure 14:
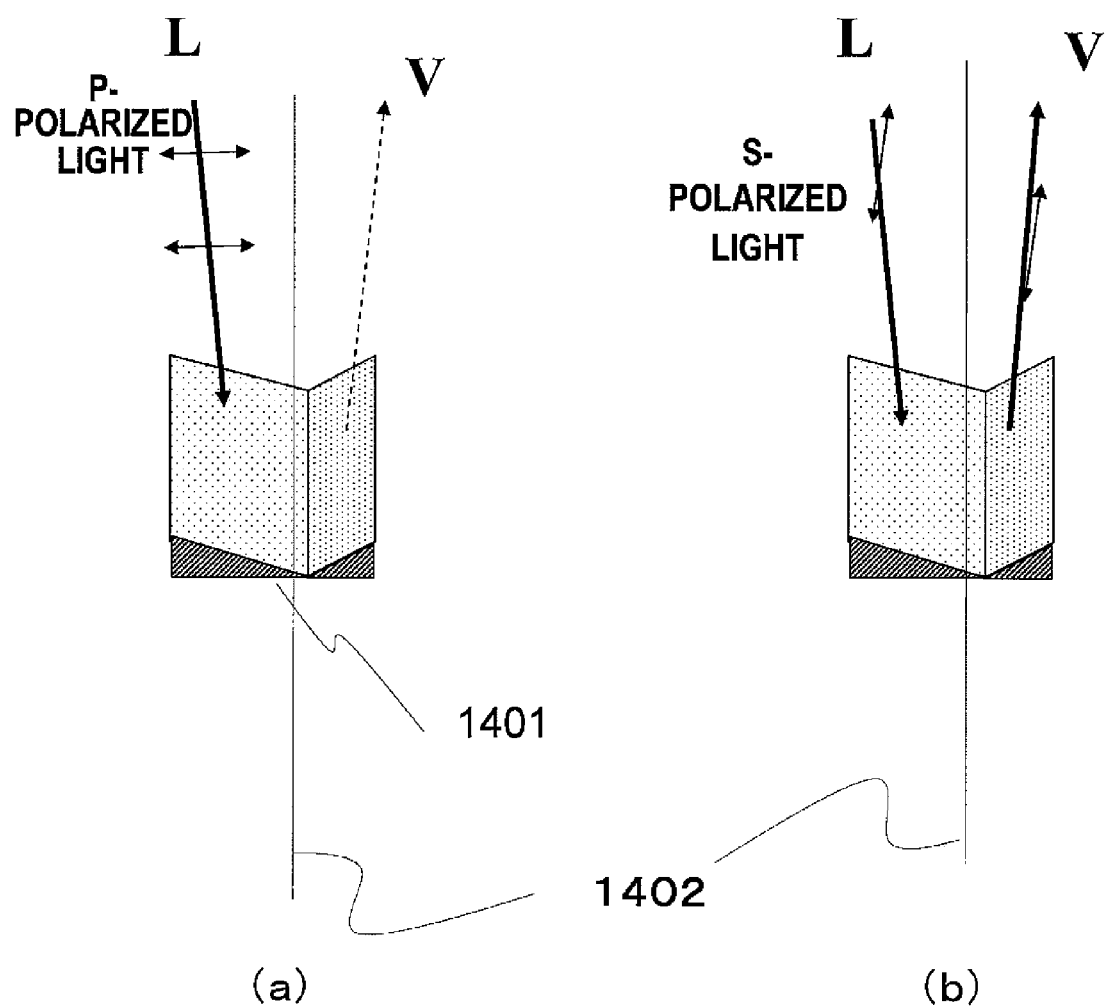
FIG. 14 illustrates how the incoming light is inter-reflected by a pair of microfacets.

Portions (a) and (b) of FIG. 14 also illustrate how polarized light is incident on the object at an angle of incidence of almost zero degrees and how the reflected light is observed with a camera. In this example, interreflection is supposed to be produced by a pair of microfacets. Specifically, those two microfacets are supposed to form a groove 1401 and the light is supposed to be reflected twice by the slopes of that groove 1401.

That kind of interreflection would be produced on an uneven surface of various natural objects including cloth, wood, human skin and leather. In this case, the properties of reflections are important the first and second times around, but the interreflection is almost negligible for the third time and on, because the intensity is small. Generally speaking, if the properties of reflection are roughly classified into specular reflection and diffuse reflection, there should arise one of the following four situations:

1) diffuse reflection the $1^{st}$ time around and specular reflection the $2^{nd}$ time around;
2) diffuse reflection both of the $1^{st}$ and $2^{nd}$ times around;
3) specular reflection the $1^{st}$ time around and diffuse reflection the $2^{nd}$ time around; and
4) specular reflection both of the $1^{st}$ and $2^{nd}$ times around.

Among these four situations, in situations 1) and 2), when the light is diffuse-reflected the first time around, the diffuse-reflected light gets non-polarized and is reflected in every direction. However, the results of experiments revealed that when the object was colored and had low intensity, the diffuse reflection component of this first time around was a minor one, which means that a relatively small quantity of light penetrated the object. Rather, the specular reflection in situations 3) and 4), which is complementary to situation 1), should prevail over the diffuse reflection according to Fresnel theory. Meanwhile, if diffuse reflection is produced the second time around as in situation 3), it can be seen easily, considering the geometric relation between the incident and reflected light rays, that situation 3) involves situation 4). In that case, no matter whether the degree of polarization or intensity is used as a reference, the major intensity component will be produced by specular reflection.

Consequently, situation 4), in which specular reflection is produced both of the first and second times around, may be regarded as the dominant phenomenon.

Figure 15:
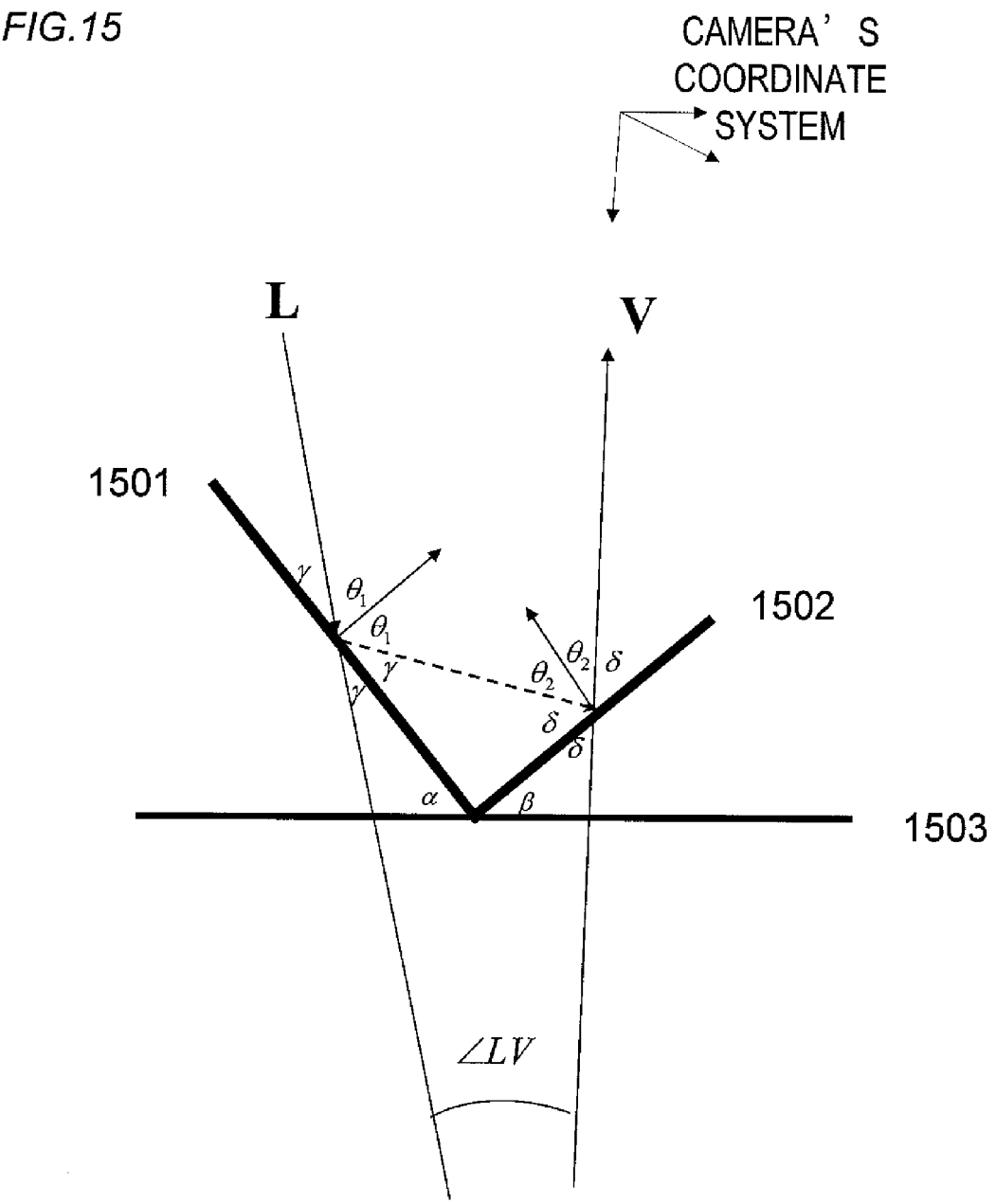
FIG. 15 illustrates where a pair of microfacets may be located.

FIG. 15 shows where a pair of microfacets may be located in a situation where specular reflection is produced both of the first and second times around. Two slopes 1501 and 1502 are supposed to form a groove and define angles α and β with respect to the macroscopic surface 1503 of the object. Also, the angles of incidence of the light rays reflected the first and second times are identified by θ1 and θ2, respectively. And the angles defined by the incident and reflected light rays with respect to the slopes of the groove are identified by γ and δ, respectively. In that case, the following Equations (15) are satisfied:

$$\begin{cases} (\alpha + \beta) = (\gamma + \delta) = 90° - \frac{1}{2} \angle LV \\ (\theta_1 + \theta_2) = 90° + \frac{1}{2} \angle LV \end{cases} \quad (15)$$

It should be noted that the angle ∠LV is defined by the angle of incidence and the angle of reflection shown in FIG. 1 and would be approximately in the range of 0 to 10 degrees. Supposing the slopes of the groove are almost symmetric to each other, α=β is satisfied. Consequently, it can be estimated that the following relation $$\theta_1 = \theta_2 \approx 45° \text{ to } 50° \quad (16)$$

is satisfied.

Now look at FIG. 13 again. In the graph representing the Fresnel reflectance in FIG. 13, shown is the range 1302 corresponding to the angular range described above. As can be seen from this graph, in this range 1302 of the angle of incidence, the reflectance of the P-polarized light ray is very low.

As shown in portion (a) of FIG. 14, the polarized light that is incident perpendicularly with respect to the principal axis direction 1402 of the groove is a P-polarized light ray. For the reasons described above, this P-polarized light ray significantly attenuates by going through reflections the first and second times around. On the other hand, the S-polarized light ray shown in portion (b) of FIG. 12 does not attenuate so much even by going through the two stages of reflection. Consequently, on the polarization plane of the incident light that is P-polarized with respect to the groove, the reflected light comes to have significantly decreased energy and intensity. On the other hand, on the polarization plane of the incident light that is S-polarized with respect to the groove, the reflected light does not lose its energy as much and maintains a relatively high intensity.

If each pair of microfacets is supposed to form such a groove as described above, it can be described how the intensity of the reflected light is varied by rotating the polarization plane of the incident light as revealed by the results of experiments. That is why in a preferred embodiment of the present invention, the following surface model that takes advantage of this fact is adopted.

Figure 16:
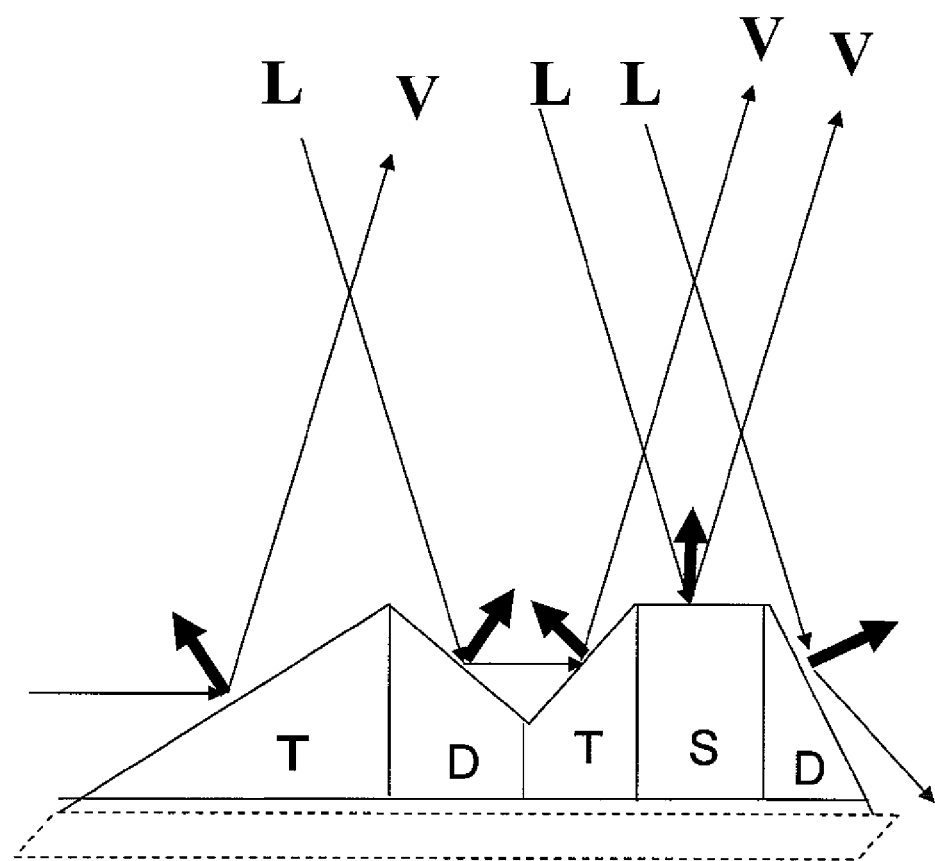
FIG. 16 illustrates a three-area model at an object's surface.

FIG. 16 illustrates a "three-area model" that is defined on the surface of the object in view of these considerations. As used herein, the "three-area model" represents a simplified definition of normals to the surface unevenness of a single pixel from the standpoints of interreflection and polarization phenomenon. According to the three-area model, the following three different kinds of two-dimensional areas are supposed to be combined together within each single pixel at a certain area ratio. Also, according to this model, each group is divided into T regions and D regions as will be described later.

1) Specular Reflection Area (S Area):

This is an area made of a microfacet, from which the incident light is specular-reflected and in which the intensity of the reflected light does not vary even if the polarization plane of the incident light rotates. In this area, a normal to that microfacet corresponds to an bisector line between the lighting direction vector and the camera's viewing direction vector.

2) Twice Reflection Area (T Area):

This is an area in which the incident light is reflected by the groove the second time around, and is made of a microfacet in which the intensity of the reflected light varies when the polarization plane of the incident light rotates.

3) Dark Area (D Area):

This is an area made of a microfacet in which the incident light is reflected in a direction that has nothing to do with the camera's viewing direction and does not contribute to increasing the intensity. This area can be further divided into two sub-areas. One of the two sub-areas is an area, which forms a groove, from which the incident light is reflected the first time to illuminate the other slope of the groove, but which does not look shining from the viewpoint of the camera. The other sub-area is an area that reflects the incident light to a totally different unknown direction. However, as it is inconvenient to use such a sub-area that reflects the incident light to such an unknown direction, this D area is supposed in a preferred embodiment of the present invention to have a microfacet normal in the same direction as its counterpart that defines the T area when the incident light is reflected the first time around. In this D area, the intensity of the reflected light does not vary, either, even if the polarization plane of the incident light rotates.

The unevenness that defines a single pixel is supposed to be formed of these three areas. By defining normals to these areas (i.e., microfacet normals) and calculating the area ratio of those microfacets within a single pixel, a normal histogram can be estimated. It should be noted that the direction of each microfacet normal has two degrees of freedom. Specifically, the direction of each normal is determined by the azimuth and the zenith angle.

Hereinafter, it will be described how to determine a normal's direction, the intensity and the area ratio.

Figure 17:
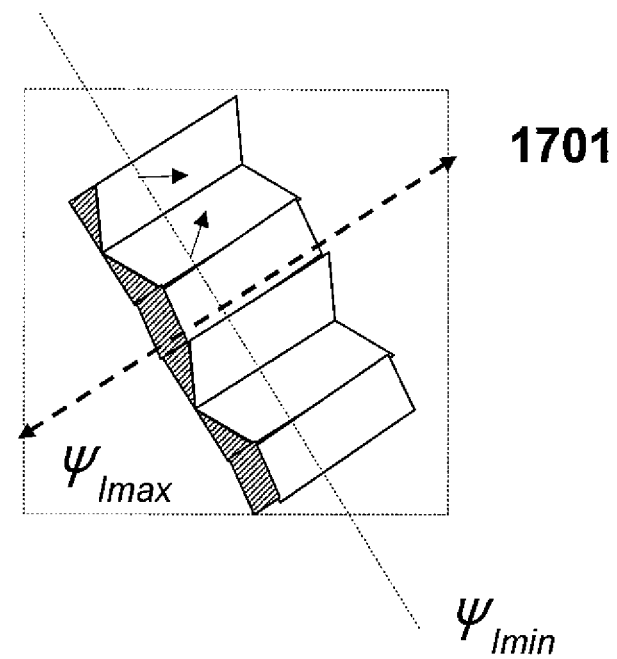
FIG. 17($a$) illustrates a situation where there is an unevenness of the three-area model within a single pixel and FIG. 17($b$) shows a relation between the polarization plane angle of a polarized light source and the principal azimuth ψ Imax of the principal axis 1701.
Figure 17:
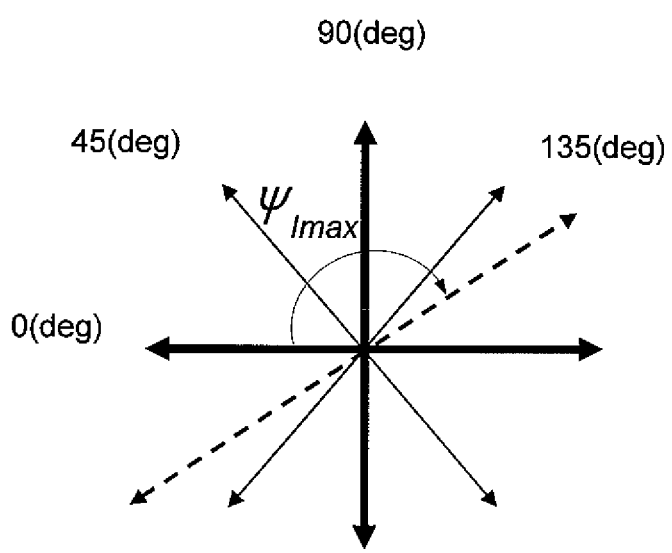

FIG. 17(a) is a perspective view schematically illustrating a situation where uneven areas of the three-area model are arranged in line in a direction defined by a certain azimuth within a single pixel on the object's surface. In this case, the principal axis 1701 of the groove corresponds to the principal azimuth ψImax. FIG. 17(b) shows a relation between the polarization plane angle of polarized light and the principal azimuth ψImax of the principal axis 1701.

As can be seen from the foregoing description with reference to FIG. 14, this principal axis 1701 agrees with the direction in which the intensity becomes maximum when the polarized light is rotated. Thus, in the rest of this description, the principal azimuth is supposed to be equal to ψImax.

The direction of a microfacet normal in each of the S, T and D areas is represented by an angle with two degrees of freedom, which shares an angle ψImin that is different by 90 degrees from the principal azimuth ψImax and which has its own zenith angle.

First of all, the zenith angle of a normal to the S area is obtained by bisecting the angle formed between the incident light and the reflected light. In the following description, each normal will be represented as a point on the camera projection plane of a camera coordinate system and is almost synonymous with a gradient space (p, q) to be described later.

FIGS. 18(a) and 18(b) illustrate a relation between the incident light L, the reflected light V and the camera coordinate system XYZ, in which the lighting direction vector is represented by:

$$\begin{pmatrix} X \\ Y \\ Z \end{pmatrix} = \begin{pmatrix} \tan\angle LV \cos\psi_I \\ \tan\angle LV \sin\psi_I \\ -1 \end{pmatrix} \quad (17)$$

Thus, a normal to the S area, which should be an bi-sector line between this vector and the viewpoint vector of the camera, is obtained by:

$$\begin{pmatrix} X \\ Y \\ Z \end{pmatrix} = \begin{pmatrix} \tan\left(\frac{\angle LV}{2}\right)\cos\psi_I \\ \tan\left(\frac{\angle LV}{2}\right)\sin\psi_I \\ -1 \end{pmatrix} \approx \begin{pmatrix} 0 \\ 0 \\ -1 \end{pmatrix} \quad (18)$$

And this is a normal that is directed substantially toward the camera's viewpoint. In Equations (17) and (18), $\Psi I$ denotes the polarization plane angle of the light.

Next, it will be described what about the T area.

Just like a normal to the S area, a normal to the T area could also be approximated geometrically. In this preferred embodiment, however, a normal to the T area is supposed to be obtained based on a polarization phase image P that has been captured by a polarization camera. If the P image is observed, it can be seen that there is a certain difference in the angle of rotation between the angle $\psi IN$ of the incident polarized light and the phase angle $\psi out$ measured. For example, if such a rotational angle difference $\Delta\psi$ is obtained when $\psi=45$ degrees, $\theta$ can be obtained according to the Fresnel theory.

Figure 19:
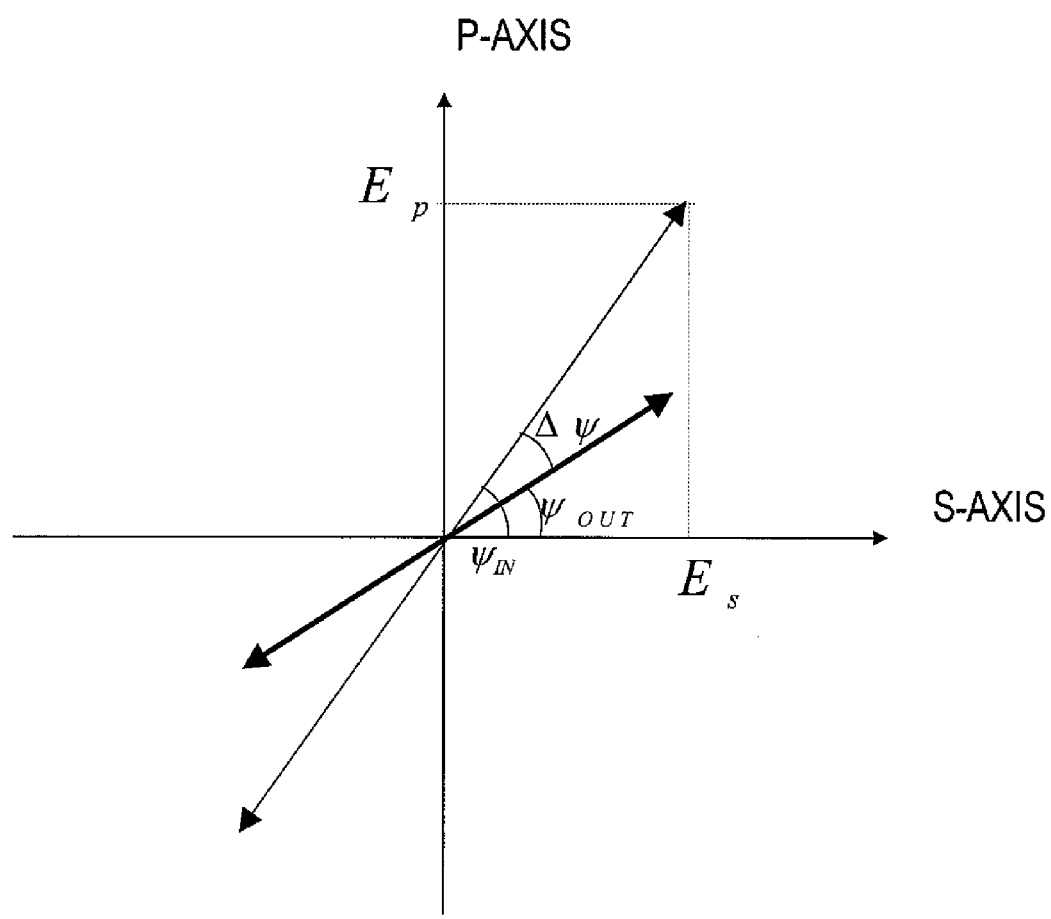
FIG. 19 shows how the polarization plane changes with respect to a groove.

FIG. 19 shows how the energies Ep and Es of P- and S-polarized light rays and their polarization planes change in the coordinate system that is defined by the S- and P-axes that are respectively parallel and perpendicular to the principal axis of the groove. Supposing the angle of incidence is $\theta$ and the refractive index is n, the Fresnel reflectances of energies with respect to the P- and S-waves are calculated by using Fp $(\theta, n)$ and Fs $(\theta, n)$ in the following manner:

$$\Delta\psi = \psi_{OUT} - \psi_{IN} \quad (19)$$

$$= \tan^{-1}\left(\frac{E_P \cdot F_P^2(\theta_1, n)}{E_S \cdot F_S^2(\theta_1, n)}\right) - \psi_{IN}$$

$$= \tan^{-1}\left(\tan(\psi_{IN}) \cdot \frac{F_P^2(\theta_1, n)}{F_S^2(\theta_1, n)}\right) - \psi_{IN}$$

where $\theta1=\theta2$ is supposed to be met for the sake of simplicity.

Since the value $\Psi Imax$ to be determined based on the angle of rotation of the polarization plane is equal to the principal axis angle of the groove, the angle $\Psi IN$ defined between the polarization plane angle $\Psi I$ of the polarized light and the groove can be obtained by the following Equation (20):

$$\Psi_{IN} = \Psi_I - \Psi_{Imax} \quad (20)$$

The refractive index n is a quantity associated with the object, and therefore, is essentially unknown. In this case, n=1.5 to 1.8 may be used as an approximate value. This value is the refractive index of a typical dielectric such as plastic, resin or glass that is present in Nature.

$$\frac{F_P^2(\theta_1, n)}{F_S^2(\theta_1, n)} = \frac{\tan(\psi_{IN} + \Delta\psi)}{\tan(\psi_{IN})} \quad (21)$$

$\theta1$ that satisfies this Equation (21) may be determined in this manner.

Consequently, in the camera coordinate system, the zenith angle of a normal to the T area becomes $$\begin{pmatrix} X \\ Y \\ Z \end{pmatrix} \approx \begin{pmatrix} \sin\theta_1 \cos\psi_{Imin} \\ \sin\theta_1 \sin\psi_{Imin} \\ -1 \end{pmatrix} \quad (22)$$

On the other hand, based on the three-area model supposition, a normal to the D area may be $$\begin{pmatrix} X \\ Y \\ Z \end{pmatrix} \approx \begin{pmatrix} -\sin\theta_1 \cos\psi_{Imin} \\ -\sin\theta_1 \sin\psi_{Imin} \\ -1 \end{pmatrix} \quad (23)$$

Next, the intensities in the respective areas will be considered. The absolute intensity is variable with the illuminance of the polarized light and camera settings that are adopted in an actual experiment. That is why a reference value should be set by measuring the intensity of an intensity image Y being observed. In this example, the maximum intensity MAX_Y of a specular reflection area in an image is used as that reference value. This maximum intensity is obtained when the S area of the three-area model is everything (i.e., accounts for 100%) of a single pixel. The intensity Is of the S area is supposed to be the maximum intensity MAX_Y:

$$I_S = \text{MAX\_Y} \quad (24)$$

The intensity in the S area is a reflected light intensity that is obtained by reflecting the light once. This intensity corresponds to the intensity represented by the Fresnel reflectance curve in FIG. 13 when the angle of incidence falls within the range 1301. That is why supposing the refractive index n is in the range of 1.5 to 1.8 according to this equation, the reflected intensities of P- and S-waves that have been reflected from the T area at an angle of incidence $\theta1$ the first time and at an angle of incidence $\theta2$ the second time can be estimated by the following Equations (25):

$$IP_T = \frac{\text{MAX\_Y}}{F_P(0, n)} \cdot F_P^2(\theta_1, n) \quad (25)$$

$$IS_T = \frac{\text{MAX\_Y}}{F_S(0, n)} \cdot F_S^2(\theta_1, n)$$

The intensity in the D area is obtained based on the minimum intensity MIN_Y of the specular reflection area in the image. This minimum intensity is obtained when the D area of the three-area model is everything (i.e., accounts for 100%) of a single pixel:

$$I_D = \text{MIN\_Y} \quad (26)$$

Figure 20:
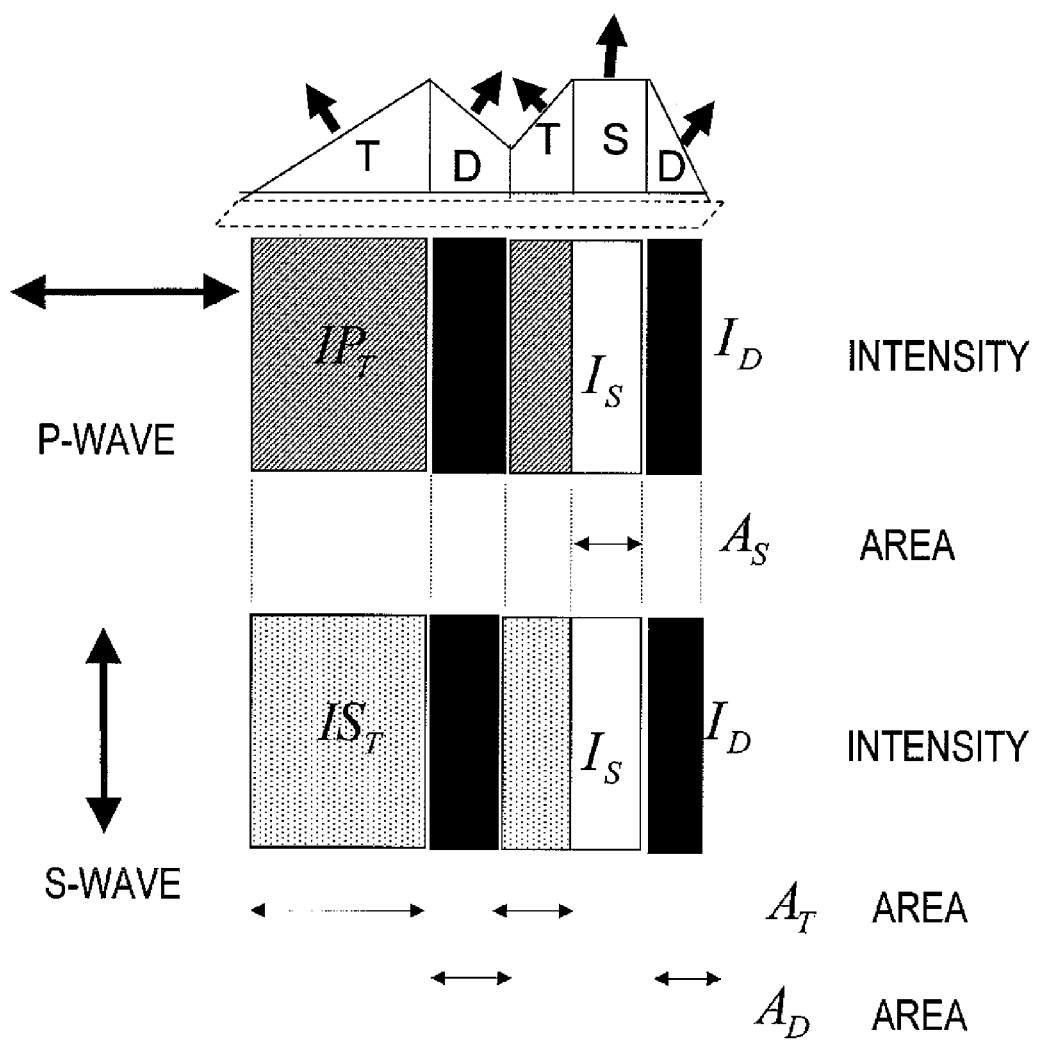
FIG. 20 shows the normals, reflected light intensities and area ratios of respective areas of the three-area model.

FIG. 20 shows the microfacet normals, reflected intensities and area ratios of the respective areas of the three-area model.

First of all, the reflected intensities of the three areas are identified by Is, $IP_T$, $IS_T$ and Id. It should be noted that the reflected light intensity of the T area changes depending on whether the incident light is a P-wave or an S-wave. That is to say, the reflected intensities of the three areas are:

1) S area: Is;
2) T area: $IP_T$ if the incident light is a P-wave and $IS_T$ if the incident light is an S-wave; and
3) D area: Id These intensity values can be estimated based on the measured values as described above. That is why only the area ratios with respect to the unit area of a single pixel are supposed to be unknown. And those unknown quantities are identified herein by As, $A_T$ and $(1-As-A_T)$, respectively:

1) S area: As;
2) T area: AT; and
3) D area: $(1-As-A_T)$

It is clear that the intensity of a single pixel to be observed when the incident polarized light is a P-wave and that of a single pixel to be observed when the incident polarized light is an S-wave correspond to the minimum intensity Ymin and the maximum intensity Ymax, respectively. That is why with respect to the minimum and maximum intensities Ymin and Ymax, the following Equations (27) of weighted averages are satisfied:

$$\begin{cases} A_S \cdot I_S + A_T \cdot IP_T + (1 - A_S - A_T) \cdot I_D = Y_{min} \\ A_S \cdot I_S + A_T \cdot IS_T + (1 - A_S - A_T) \cdot I_D = Y_{max} \end{cases} \quad (27)$$

That is to say, the unknown quantities As, $A_T$ and $A_D$ can be estimated by the following Equations (28):

$$\begin{cases} A_T = \dfrac{Y_{max} - Y_{min}}{IS_T - IP_T} \\ A_S = \dfrac{Y_{min} - I_D}{I_S - I_D} - A_T \cdot \dfrac{IP_T - I_D}{I_S - I_D} \\ A_D = 1 - A_T - A_S \end{cases} \quad (28)$$

In this manner, the normals, intensities and area ratios of the respective regions that are defined when the three-area model is adopted for a single pixel can be estimated. However, if the normals are represented angularly using the azimuths and zenith angles in the camera coordinate system, it is inconvenient to use such an angular representation after that to get the analysis done. That is why each normal is transformed into a gradient space (p, q):

$$N = (N_x \quad N_y \quad N_z) = \left( \dfrac{\partial z}{\partial x} \quad \dfrac{\partial z}{\partial y} \quad -1 \right) = (p \quad q \quad -1) \quad (29)$$

Figure 18:
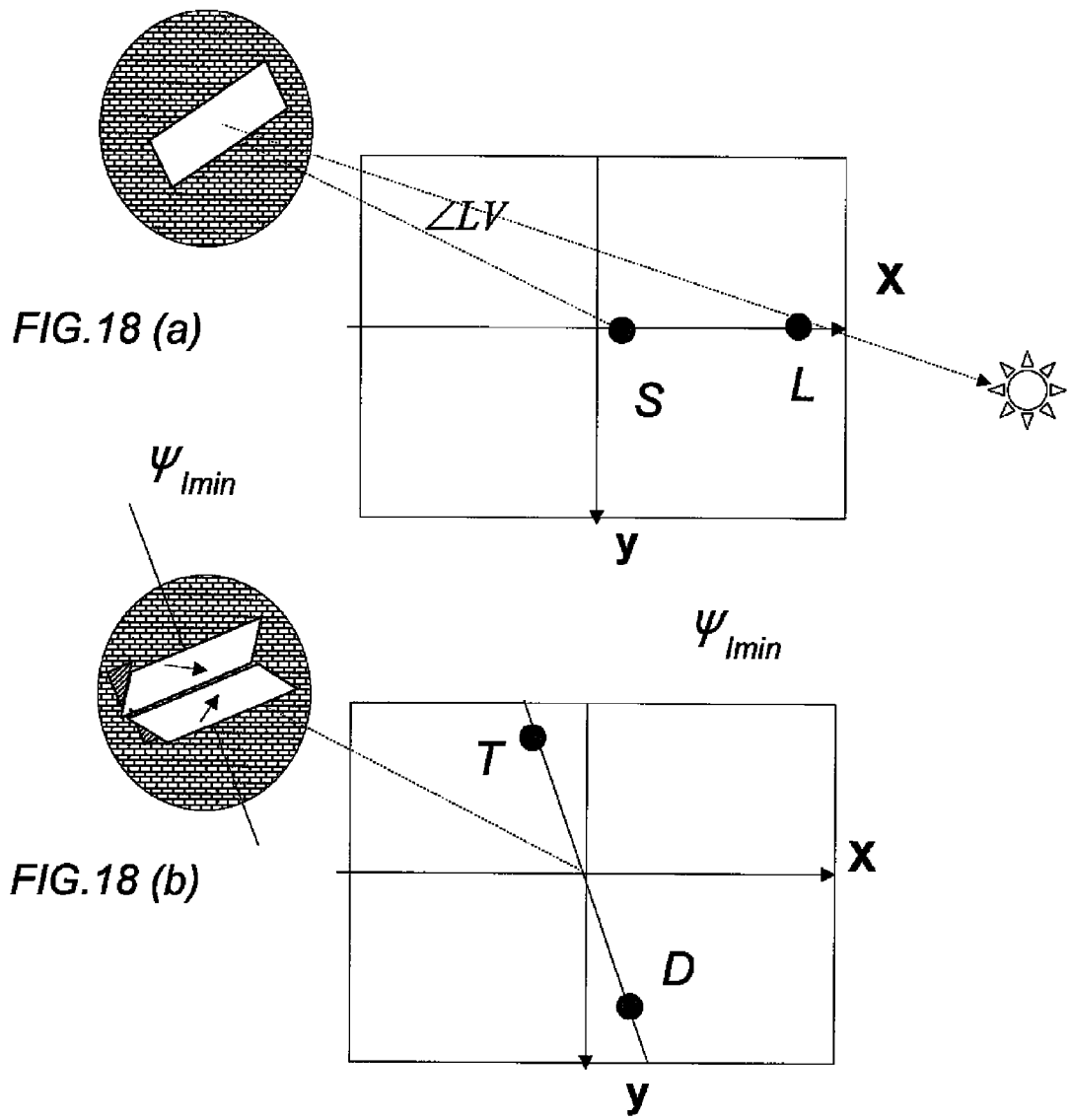
FIGS. 18($a$) and 18($b$) illustrate a relation between normal vectors, a camera coordinate system and a gradient space.

The gradient space (p, q) may be regarded as being substantially equivalent to the camera's projection plane shown in FIG. 18.

Figure 21:
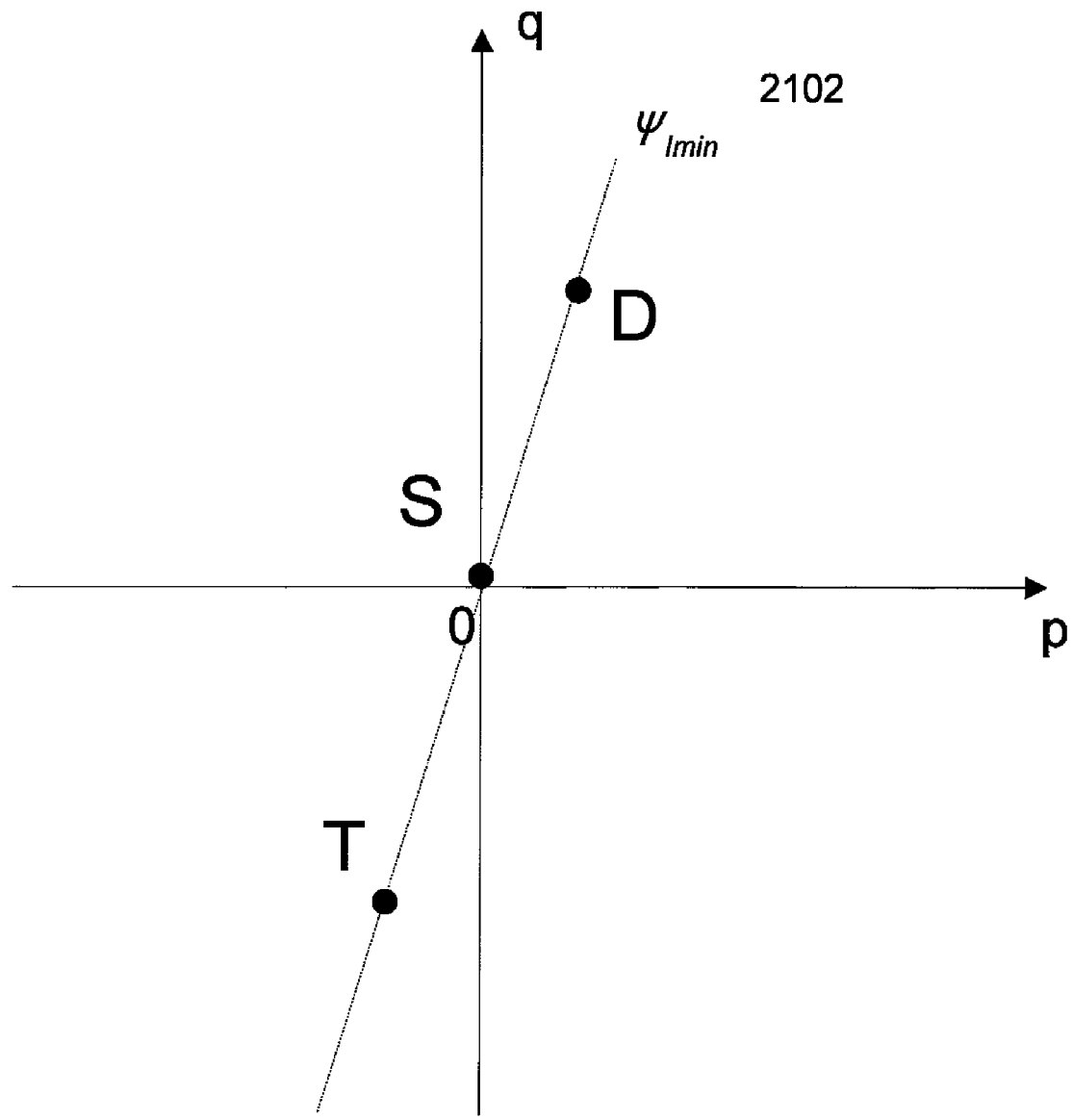
FIG. 21 shows where a normal may be located in the gradient space.
Figure 22:
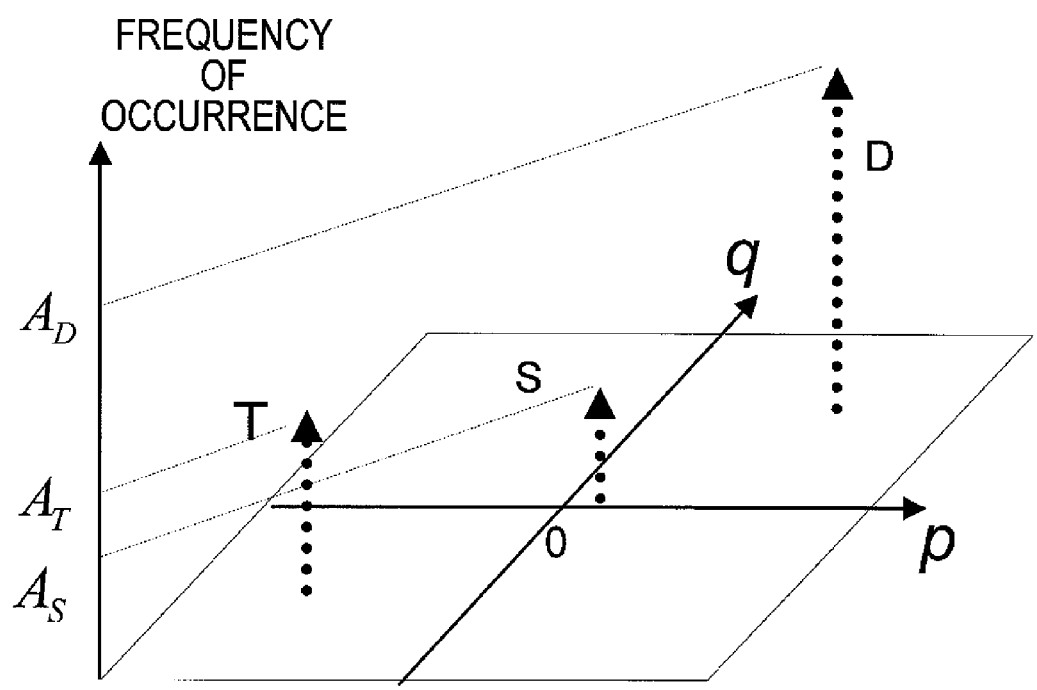
FIG. 22 shows a histogram of normals within a single pixel in the gradient space.
Figure 23:
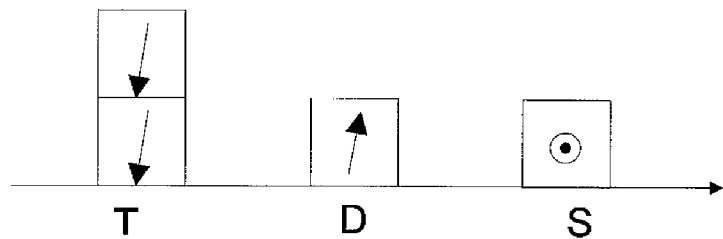
FIGS. 23($a$), 23($b$) and 23($c$) show how normals may be allocated (part 1).
Figure 23:
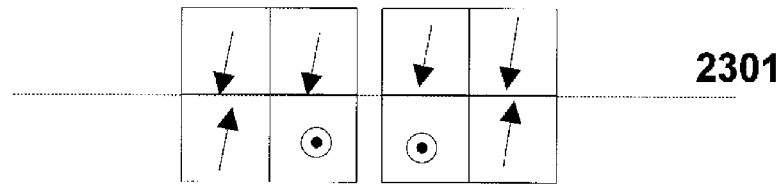
Figure 23:
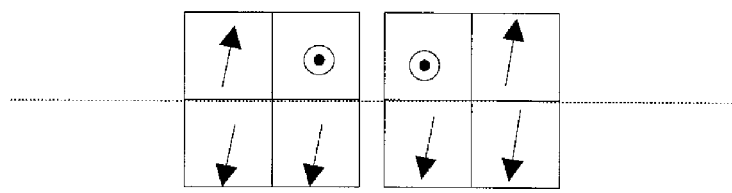

FIG. 21 shows the positions of microfacet normals that have been defined in a two-dimensional gradient space. A normal to the S area is located substantially at the origin. On the other hand, normals to the T and D areas are located on a line 2102 that intersects with the principal axis direction of the groove on the object's surface at right angles. FIG. is a histogram of microfacet normals that have been obtained based on the three-area model. As shown in FIG. 22, these three normals are aligned with a principal azimuth line so as to have respective heights representing their area ratios.

A histogram of normals within a single pixel can be estimated in this manner. Thus, the best arrangement of those normals should now be determined. In the following example, normals are supposed to be defined with a single pixel divided into four (=2×2) subpixels. A flexible zoom to a high resolution can get done by repeatedly making such a 2×2 division a number of times.

First of all, pixels belonging to respective areas that are obtained from the histogram are:

S area: [As×4]=Ns pixels

T area: [$A_T$×4]=$N_T$ pixels

D area: 4-Ns-$N_T$ pixels           (30)

where [ ] is a Gaussian symbol.

FIGS. 23 through 26 show an initial normal arrangement. That is to say, these drawings show how the normals to the three areas described above should be allocated to the four subpixels, which are obtained by dividing a single pixel. As this allocation method depends on the principal azimuth ΨImax of the groove, allocation to four ranges are shown in FIGS. 23 to 26 on a 45-degree basis.

FIG. 23(a) illustrates an exemplary histogram for the three areas. In this example, two pixels are allocated to the T area and one pixel is allocated to each of the D and S areas. The principal azimuth range is defined horizontally, i.e., almost parallel to the X-axis. The normals to the T and D areas are defined perpendicularly to the principal azimuth so as to make pairs as much as possible. In that case, there will be two types of arrangements, one of which is a concave type that forms a valley with respect to the principal azimuth line 2301 as shown in FIG. 23(b) and the other of which is a convex type that forms a ridge with respect to the principal azimuth line 2301 as shown in FIG. 23(c). Each of these two types has two different arrangements. In FIGS. 23(a) to 23(c), the normal to the S area substantially has vertical direction to the sheet.

Figure 24:
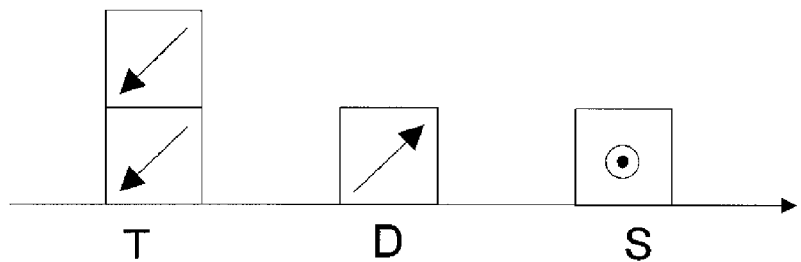
FIGS. 24($a$), 24($b$) and 24($c$) show how normals may be allocated (part 2).
Figure 24:
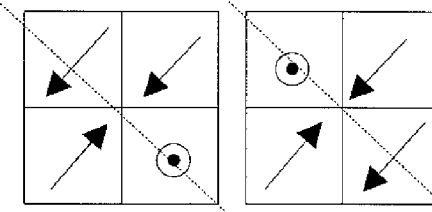
Figure 24:
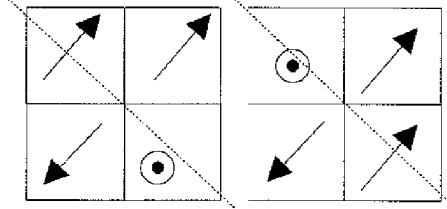
Figure 26:
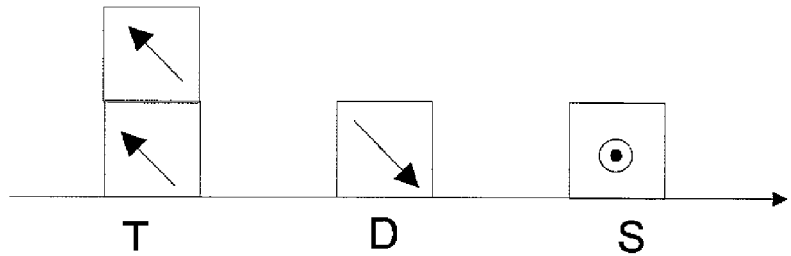
FIGS. 26($a$), 26($b$) and 26($c$) show how normals may be allocated (part 4).
Figure 26:
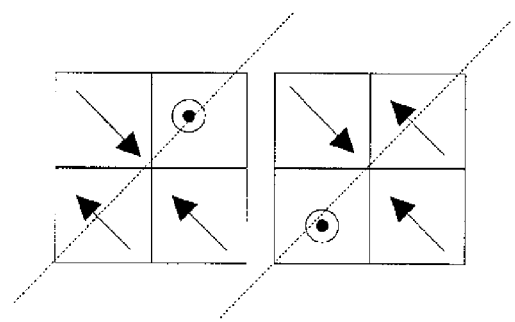
Figure 26:
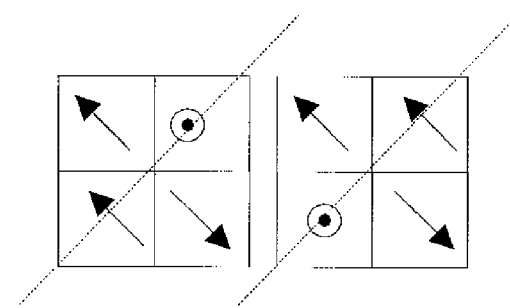

FIGS. 24, 25 and 26 illustrate the same normal histogram with three different principal azimuths. In each of these three situations, there are four possible arrangements in total, in two of which the normals form a valley with respect to the principal azimuth line and in the rest of which the normals form a ridge with respect to the principal azimuth line. It should be noted that the number of combinations of arrangements varies according to the histogram.

Figure 27:
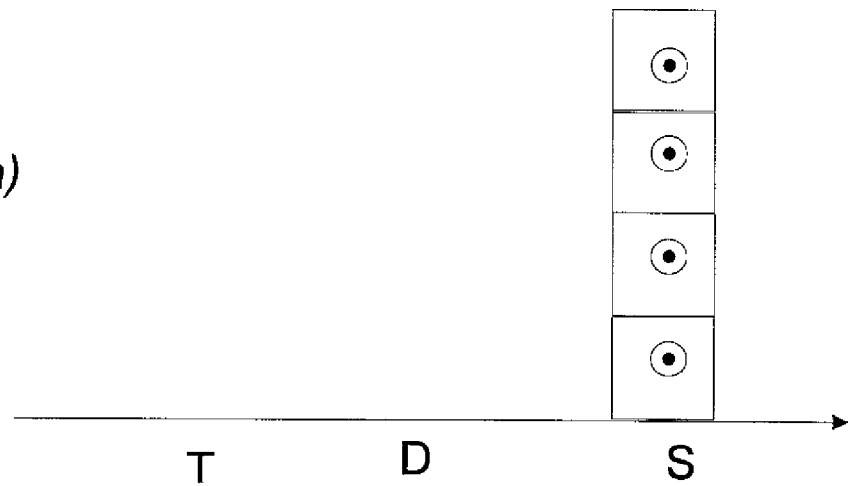
FIGS. 27($a$) and 27($b$) show how normals may be arranged if every area within a single pixel is an S-area.
Figure 27:
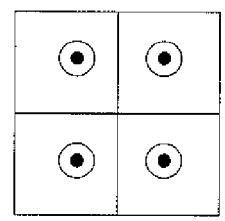

FIGS. 27(a) and 27(b) illustrate a histogram to adopt when every area is an S area. In that case, there is only one possible arrangement as shown in FIG. 27(b).

As described above, by combining the distribution function of one normal (i.e., the histogram of microfacet normals that are obtained on the three-area model) shown in FIG. 22 with the information about the principal azimuth ΨImax shown in FIGS. 17(a) and 17(b), a number of spatial arrangements are available. That is why the best arrangement may be chosen from these four candidates. This arrangement determining method is similar to what is disclosed in Non-Patent Document No. 1. However, since the three-area model and the information about the principal azimuth are used, the number of candidates, which is 4!=24 according to the conventional technique, can be reduced significantly and the optimization can get done much more easily according to the present invention.

Basically, the normals may be optimized by an iterative method in which the energy evaluation function is maximized as disclosed in Non-Patent Document No. 1. Hereinafter, its processing flow will be described briefly.

FIGS. 28(a) and 28(b) illustrate how the arrangement of normals that has been obtained based on the normal histogram is represented as a point in an eight-dimensional arrangement space. This eight-dimensional density distribution function is represented as a Gaussian mixture model (GMM). This probability density distribution function will be referred to herein as a texton GMM model. In an equivalence class generated from the same normal histogram distribution, there are normal arrangements for its representative four pixels and this eight-dimensional coupling vector is called a "3D texton" or simply a "texton". The object of this processing is to obtain this solution texton. The best texton can be selected according to a constraint on the integrability when the surface is calculated based on normals. If the texton for each pixel $S=(x, y)$ is identified by $L(S)$, the integrability can be calculated based on a condition that makes the line integral equal to zero.

Figure 29:
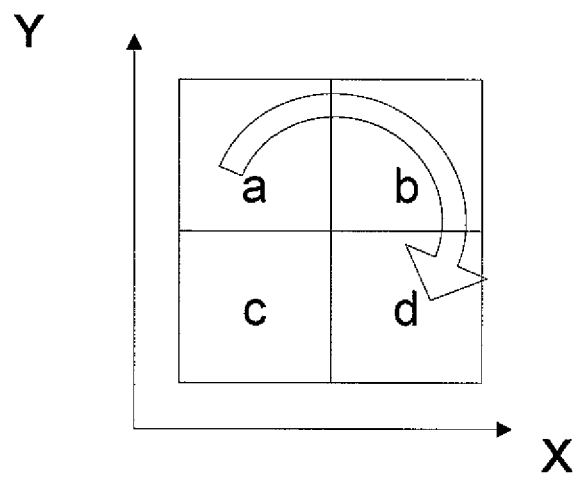
FIGS. 29($a$) and 29($b$) show the directions of line integrals, which set the condition on the integrability of normals.
Figure 29:
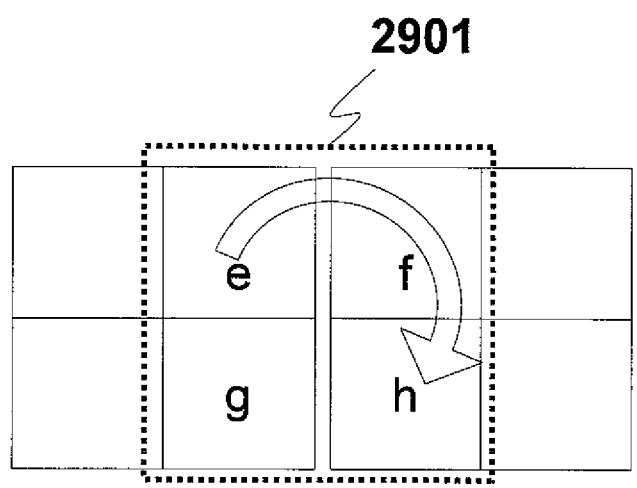

FIG. 29(a) illustrates how to get optimization done using the integrability of a normal. As disclosed in Non-Patent Document No. 1, when a line integral is made on a cell consisting of 2×2 pixels, the condition that makes the line integral equal to zero needs to be set:

$$\text{Intg}_1(s,L(s))=a_x+b_x-b_y-d_y-d_x-c_x+c_y+a_y=0 \quad (31)$$

The normals to the respective pixels can be expressed by gradient space representations as:

$$a=(a_x,a_y,1)\ b=(b_x,b_y,1)\ c=(c_x,c_y,1)\ d=(d_x,d_y,1) \quad (32)$$

Thus, if the energy function of the integrability for each pixel is represented by $$E_1(S,L(S))=\exp(-\|\text{Intg}_1(S,L(S))\|^2) \quad (33)$$

and if this energy function is maximized, the line integral described above can be minimized.

If a pair of adjacent pixels are identified by s and t, the integrability in their overlap pixel region also needs to be considered. FIG. 29(b) represents a condition for that shifted pixel 2901. The condition of the integrated value is:

$$\text{Intg}_2(s,t,L(s),L(t))=e_x+f_x-f_y-h_y-h_x-g_x+g_y+e_y=0 \quad (34)$$

The texton for this overlap pixel region should also be obtained based on the solution texton. However, since this is an arrangement pattern that should not arise from pixels, that pattern is located at a point 2802 that is far away from the pixels in FIG. 28. Nevertheless, since the probability of occurrence of that pattern can be represented by the maximum value of the Gaussian function component of the texton GMM model, that pattern is weighted with that probability. That is to say, the condition imposed on this pair of pixels is to maximize the following Equation (35):

$$E_2(s, t, L(s), L(t)) = \exp(-\|\text{intg}_2(s, t, L(s), L(t))\|^2) \cdot \max_{1 \leq i \leq T} p_{i_j}(efgh) \quad (35)$$

The solution texton is obtained as what maximizes the product of two energy functions over the entire image:

$$\{L_{i_1}, L_{i_2}, L, L_{i_T}\} = \text{argmax} \prod_s E_1\left(s, L(s) \prod_{Neighbor(s,t)} E_2(s, t, L(s), L(t))\right) \quad (36)$$

In Equation (36), s represents every pixel of the image, Neighbor (s, t) represents pairs of pixels in all of the four neighbors, and the solution texton to obtain is in { }.

This optimization process is so complicated that the optimization is usually done by performing the steps of: 1) finding an initial solution by a belief propagation method using the integrability as a constraint; and 2) making the initial correlation converge to the optimum solution by the Markov Chain Monte Carlo (MCMC) method to increase the efficiency as much as possible. The details of this process are just as disclosed in Non-Patent Document No. 1. As a result of this optimization processing, the best spatial arrangement of normals can be determined.

FIGS. 30(a) to 30(c) show, in summary, how the resolution can be increased in a single pixel as a result of the processing described above. Suppose when a single pixel of the original image has its resolution increased by dividing it into four (=2×2) pixels through the processing described above, the arrangement of normals to those four pixels is optimized as shown in FIG. 30(b). In that case, as there is one-to-one correspondence between the normals to the respective S, D and I areas and their intensities according to the three-area model as shown in FIG. 19, the resolution can be increased eventually with the intensity of the single pixel raised to the combined intensity of those 2×2 pixels. Still, the pixel intensity should nonetheless be measured when the object is shot under non-polarized light. Consequently, as shown in FIG. 30(a), the intensity of the original image is the average intensity Ymax shown in FIG. 9, and when the resolution is increased, the intensities of the respective areas are:

1) S area: Is,
2) T area: $(IP_T+IS_T)/2$, and
3) D area: Id as shown in FIG. 30(c).

Figure 31:
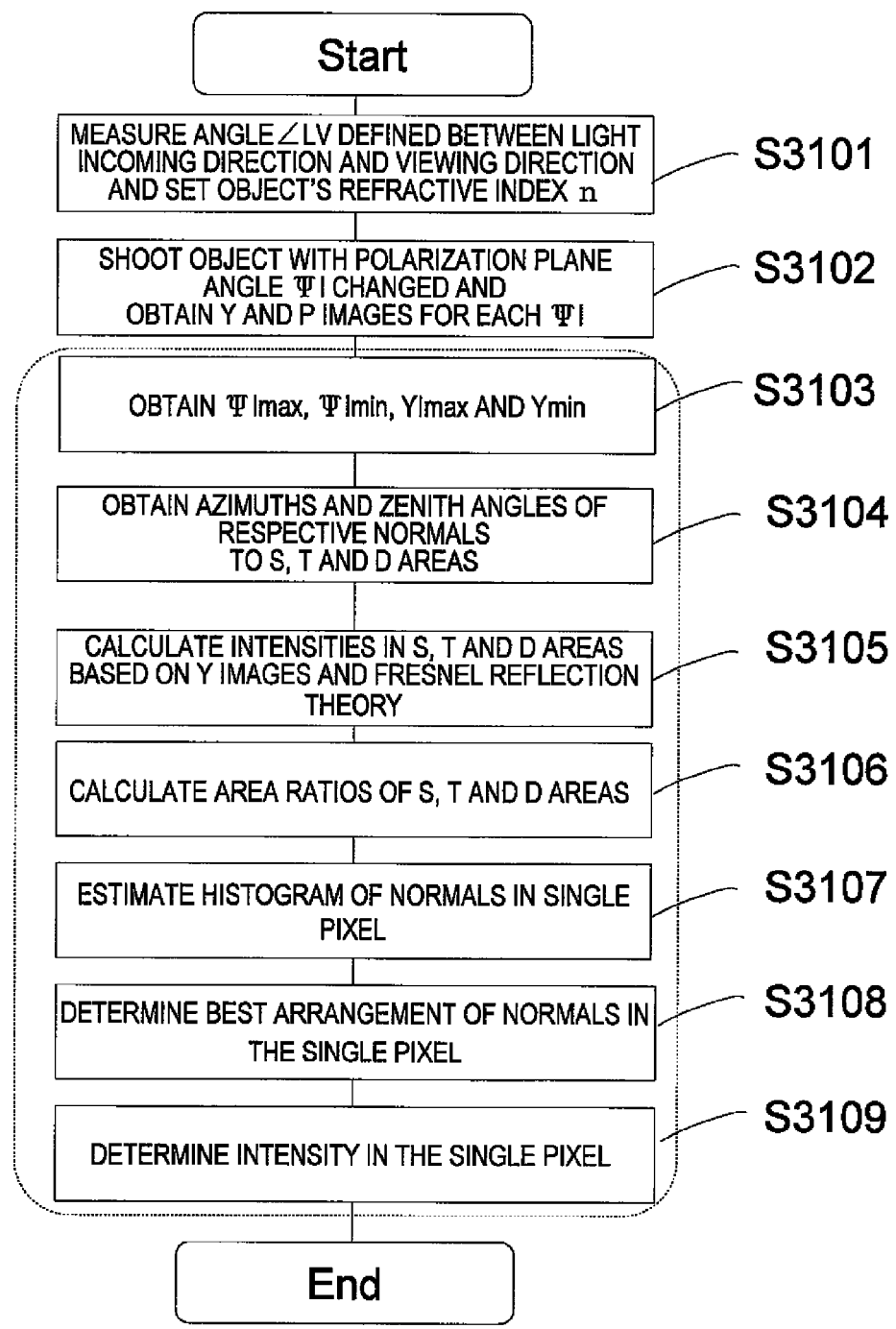
FIG. 31 is a flowchart showing the procedure of processing according to the first preferred embodiment.

FIG. 31 is a flowchart showing the procedure of the entire processing of the present invention in which the object is shot and subjected to image processing, a histogram representing the distribution of normals within a single pixel and the arrangement of normals are estimated, and then the arrangement of intensities within a single pixel is estimated. In FIG. 31, the series of processing steps surrounded with the dotted rectangle are the processing steps to get done by the resolution increasing processing section, in which installed is a program that has been defined to make a known piece of hardware perform that series of processing steps in the dotted rectangle shown in FIG. 31.

First of all, in Step S3101, the angle ∠LV defined between the polarized light incoming direction and the camera's viewing direction is measured as a parameter of the experimental environment. This angle is already known to a flash attached to the camera. In addition, in this processing step, the refractive index n that forms the basis of the Fresnel reflectance of the object is also set to be 1.8, for example.

Next, in Step S3102, the object is irradiated with polarized light with the polarization plane rotated and with its angle ψI changed, thereby shooting the object with the polarized light. And Y and P images are also obtained with respect to each angle ψI.

Subsequently, in Step S3103, function fitting represented by Equation (14) is carried out on each pixel of the Y image, of which the intensity is varying. In this processing step, the method that has already been described using Equations (1) through (12) may be used as it is. By performing this processing step, the phase angles ψImax and ψImin that maximize and minimize the intensity, and the maximum and minimum intensities YImax and Ymin are obtained.

Thereafter, in Step S3104, the azimuths and zenith angles of respective normals to the S, T and D areas of the three-area model are obtained. The two degrees of freedom of these angles represent the normals. And these angles may be determined by Equations (17) through (21). The theoretic Fresnel reflection curve shown in FIG. 13 for use in this processing step is drawn on the supposition that the refractive index n is 1.8.

Then, in Step S3105, the intensities in the S, T and D areas of the three-area model are calculated by Equations (22) to (24).

Next, in Step S3106, the area ratios of the S, T and D areas of the three-area model are calculated by Equation (26).

Thereafter, in Step S3107, the angular representations of the normals are transformed into gradient space (p, q) representations in the camera's coordinate system, and then the histogram of normals in a single pixel as shown in FIGS. 21 and 22 is obtained.

Subsequently, in Step S3108, the best arrangement of normals within a single pixel is determined based on the histogram distributions of the normals as shown in FIGS. 23 through 28.

Figure 30:
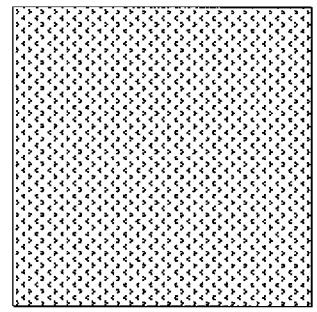
FIGS. 30($a$), 30($b$) and 30($c$) illustrate what effects will be achieved on the normals and intensity of a single pixel if the resolution is increased.
Figure 30:
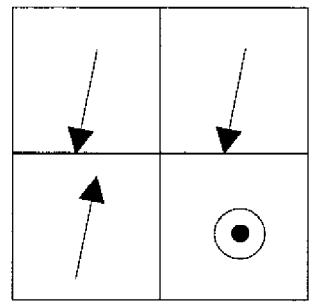
Figure 30:
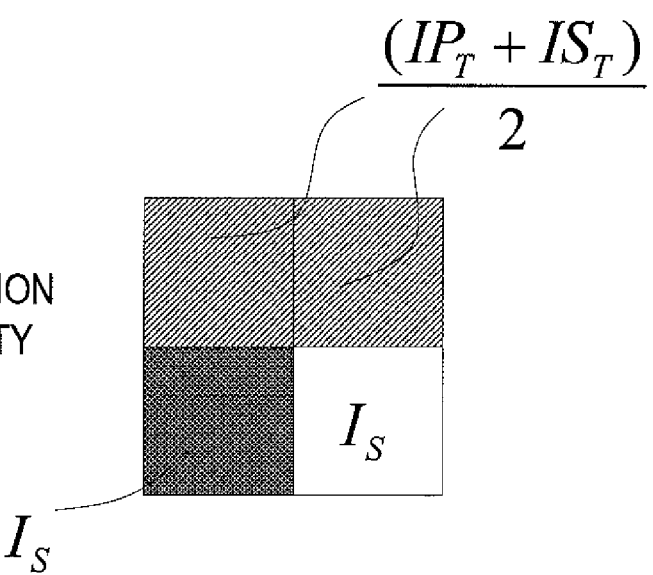

Finally, in Step S3109, the intensity is determined based on the best arrangement of the normals within the single pixel as shown in FIG. 30.

(Embodiment 2)

According to the first preferred embodiment of the present invention described above, the resolution is increased using polarized light and a polarization camera. However, the polarization camera has a specially designed structure with patterned polarizers, and therefore, is expensive. On top of that, the polarizer of the camera decreases not only the quantity of the incoming light that can be used but also the sensitivity as well, thus possibly debasing the eventual image quality. To overcome such a problem, according to this second preferred embodiment of the present invention, polarized light, of which the polarization plane rotates, is also used as in the first preferred embodiment described above but a normal intensity measuring camera is used to capture an image, thereby realizing the flexible zooming.

Figure 32:
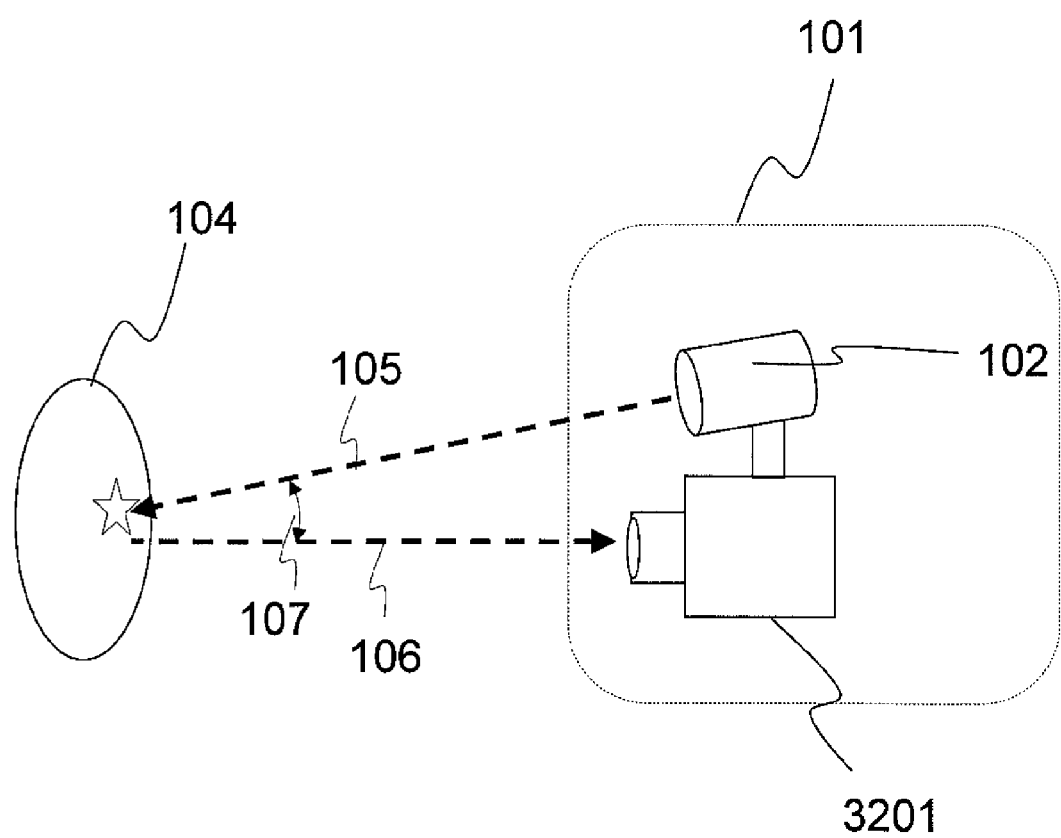
FIG. 32 illustrates a second preferred embodiment of the present invention.

FIG. 32 illustrates this second preferred embodiment of the present invention. The only difference between the arrangement of this preferred embodiment and the one shown in FIG. 1 is that the camera 3201 for use in this preferred embodiment is a normal intensity measuring camera, not the polarization camera for use in the first preferred embodiment.

Figure 33:
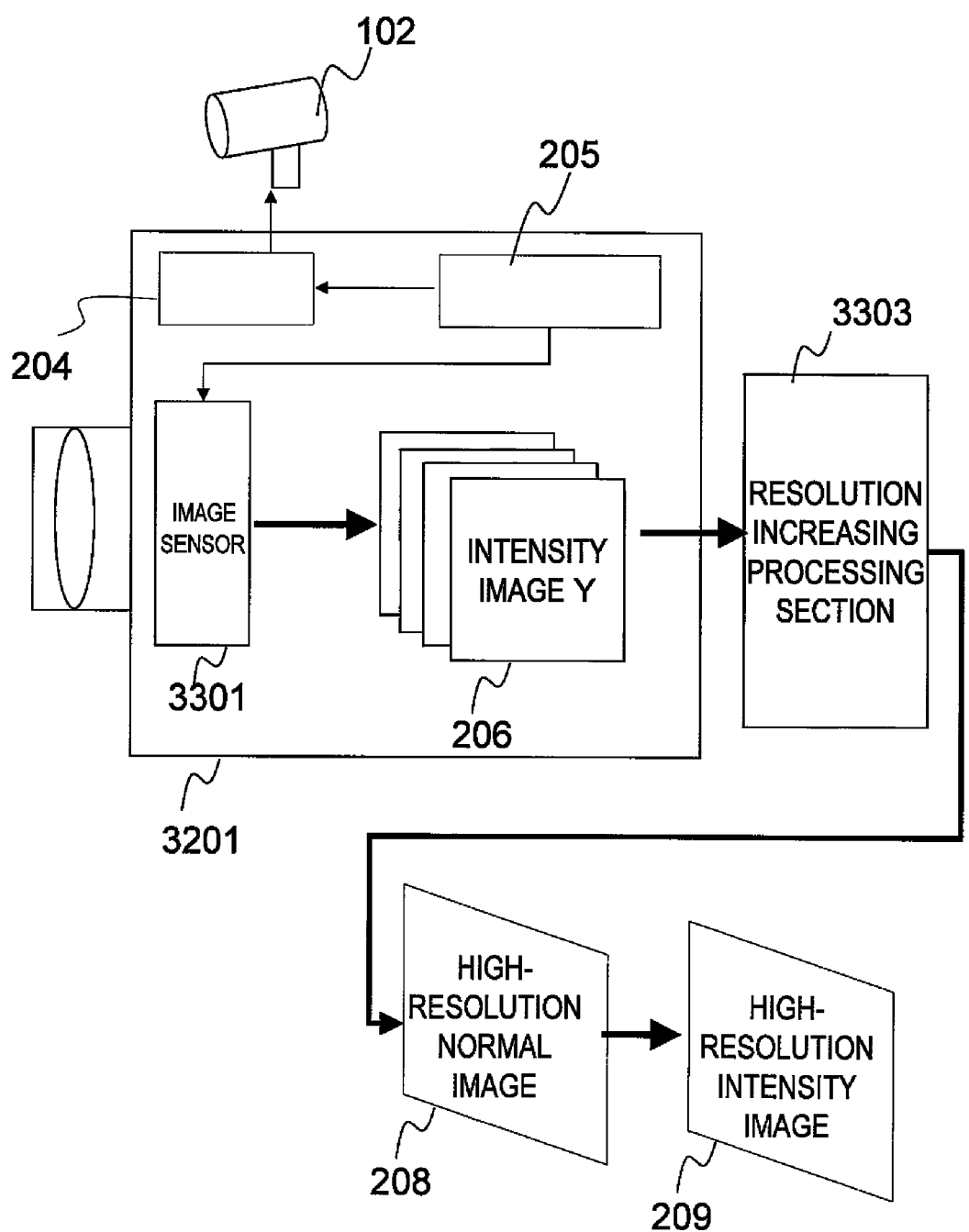
FIG. 33 illustrates a configuration for an image processor according to the second preferred embodiment of the present invention.

FIG. 33 illustrates the configuration of this camera 3201, which includes an intensity image sensor 3301, the polarization plane control section 204 and the image capturing control section 205. Every time the polarization plane control section 204 changes the polarization plane of the polarized light, an image is captured. As a result, a number of intensity images Y (206) that are associated with multiple different polarization states are obtained. Then, a resolution increasing processing section 3303 generates a high-resolution normal image 208 and a high-resolution intensity image 209.

Figure 34:
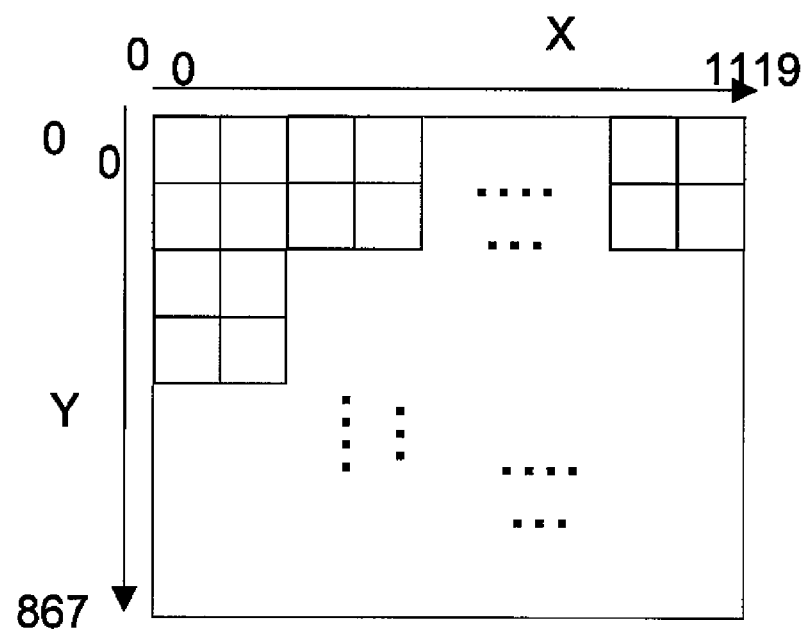
FIGS. 34($a$) and 34($b$) illustrate how photosensitive cells may be arranged in an image sensor for a camera according to the second preferred embodiment.
Figure 34:
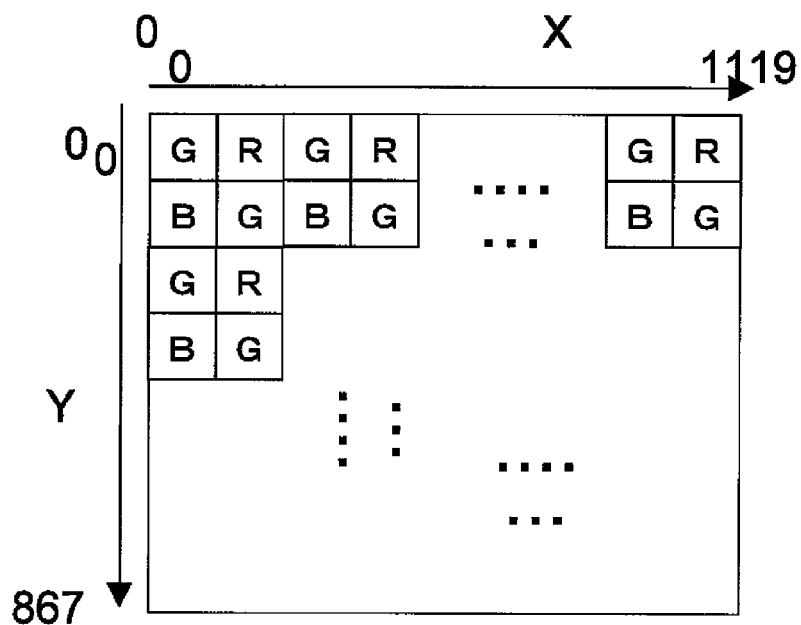

FIG. 34 illustrates the intensity image sensor 3301, which does not have any patterned polarizer shown in FIG. 5. That is why if the original resolution of the image sensor is 1,120× 868 pixels, a Y image of the same resolution (i.e., 1,120×868 pixels) is obtained. Although a monochrome image sensor is shown as the intensity image sensor in FIG. 34(a), a color image sensor with a known Bayer mosaic may also be used as shown in FIG. 34(b). In any case, however, the output image of the camera 3201 is only the intensity image Y, and therefore, no P images providing polarization information can be obtained. That is why the angle of incidence $\theta 1$ at the groove slope of the three-area model, which is calculated by Equation (21), cannot be obtained in this preferred embodiment. Therefore, supposing $$\alpha = \beta \quad (37)$$

is satisfied, the angle $\alpha$ of the normal to the T area and the zenith angle $\theta 1$ of the normal are determined based on only the geometric relation represented by the following Equations (38) (which are obtained by modifying Equations (15)):

$$\begin{cases} \alpha = \beta = 45° - \frac{1}{4} \angle LV \\ \theta_1 = \theta_2 = 45° + \frac{1}{4} \angle LV \end{cases} \quad (38)$$

Then, the following Equation (39) is satisfied:

$$\begin{pmatrix} X \\ Y \\ Z \end{pmatrix} \approx \begin{pmatrix} \sin\alpha\cos\psi_{Imin} \\ \sin\alpha\sin\psi_{Imin} \\ -1 \end{pmatrix} \quad (39)$$

Based on the supposition of the three-area model, a normal to the D area can be defined by the following Equation (40):

$$\begin{pmatrix} X \\ Y \\ Z \end{pmatrix} \approx \begin{pmatrix} -\sin\alpha\cos\psi_{Imin} \\ -\sin\alpha\sin\psi_{Imin} \\ -1 \end{pmatrix} \quad (40)$$

Figure 35:
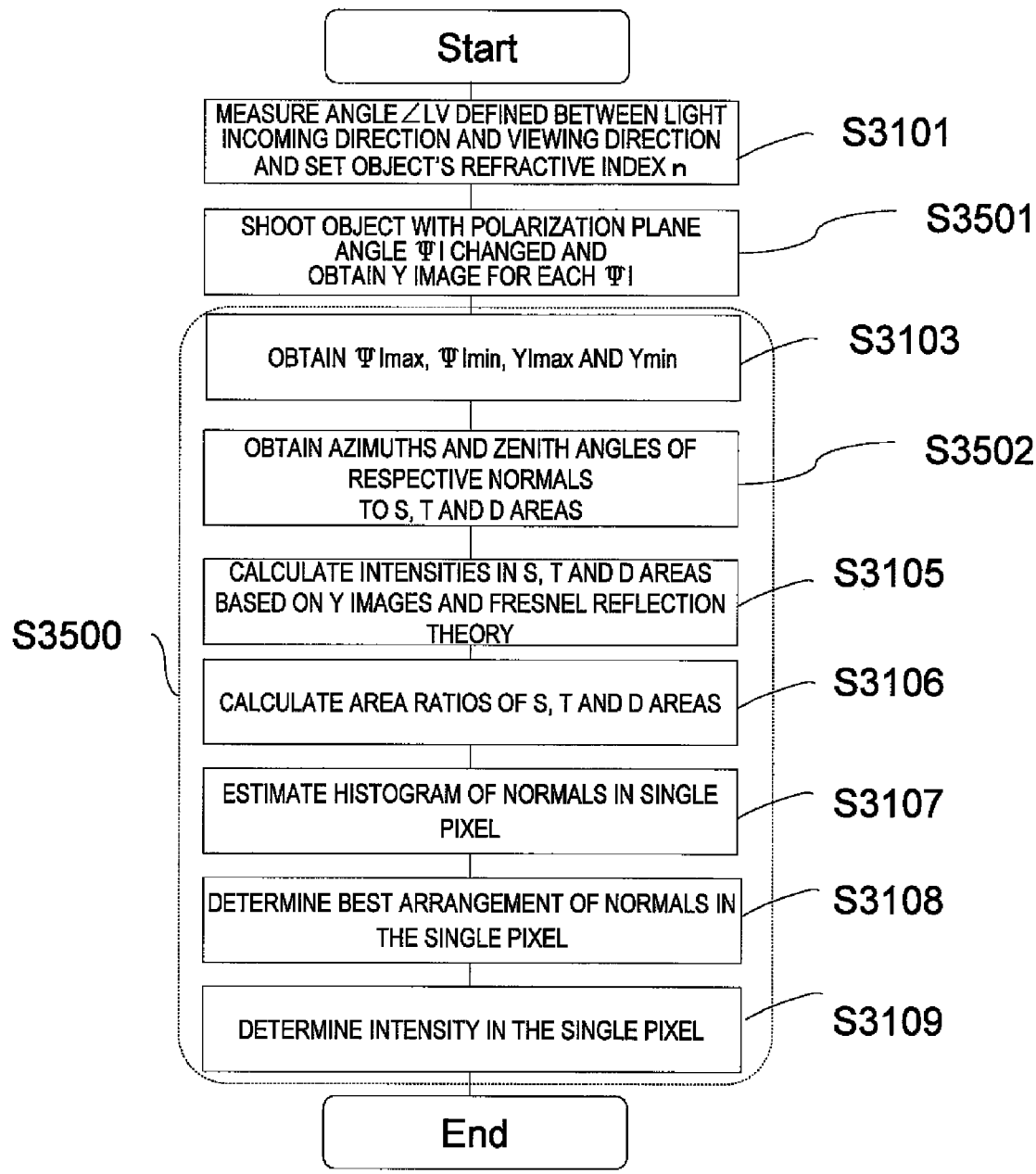
FIG. 35 is a flowchart showing the procedure of processing according to the second preferred embodiment.

FIG. 35 is a flowchart showing the procedure of the processing of this second preferred embodiment of the present invention.

The flowchart shown in FIG. 35 is different from the one shown in FIG. 31 only in the processing step S3501, in which the object is shot with the polarization plane angle ΨI changed, thereby obtaining a Y image with respect to each ΨI, and in the processing step 3502, in which the azimuths and zenith angles of normals to the S, T and D areas are obtained. It should be noted that the series of processing steps surrounded with the dotted rectangle also needs to get done by the resolution increasing processing section.

It should be noted that this second preferred embodiment is also applicable to a situation where the image to be processed is a color intensity image. In that case, a color camera may be used as the intensity camera or the polarized light may be turned into a colored one. However, as both of these techniques are already known in the art, the description thereof will be omitted herein.

This second preferred embodiment of the present invention is also usable in a medical application in which a multi-band color intensity image is used. In that case, a multi-band color camera is used as the intensity camera. Such a technique is known to everybody in the art, and will not be described in detail herein.

Furthermore, this second preferred embodiment is also applicable to a surveillance camera that captures an infrared image using an infrared light source instead of the polarized light source. But this is just a known technique that does not deserve a detailed description here.

(Embodiment 3)

Hereinafter, an image processor that can shoot both a moving picture and a still picture while changing its modes of operation will be described as a third preferred embodiment of the present invention. The basic configuration of this third preferred embodiment may be either the first or second preferred embodiment of the present invention described above. In the following description, the second preferred embodiment is supposed to be used as the basic configuration.

Generally speaking, when a moving picture is shot or reproduced, a person's sensitivity to the resolution somewhat decreases, and therefore, cannot sense the effect of the increased resolution so easily. On the other hand, when a still picture is shot or reproduced, the effect of the increased resolution is easily sensible. Particularly, in the field of medical endoscope camera, the doctor usually shoots and monitors a moving picture in inspecting his or her patient but often takes a still picture of the patient's diseased part in making a diagnosis.

Thus, when shooting a moving picture, the image processor of this preferred embodiment is supposed to shoot the moving picture by a normal technique using a non-polarized light source and perform the conventional moving picture resolution increasing processing. On the other hand, when shooting a still picture in accordance with a command, the image processor shoots a still picture by irradiating the object using a polarized light source with the flexible zoom function.

Before the conventional moving picture resolution increasing processing is described, first of all, it will be described what processing is performed by the image processor in shooting a still picture.

Figure 36:
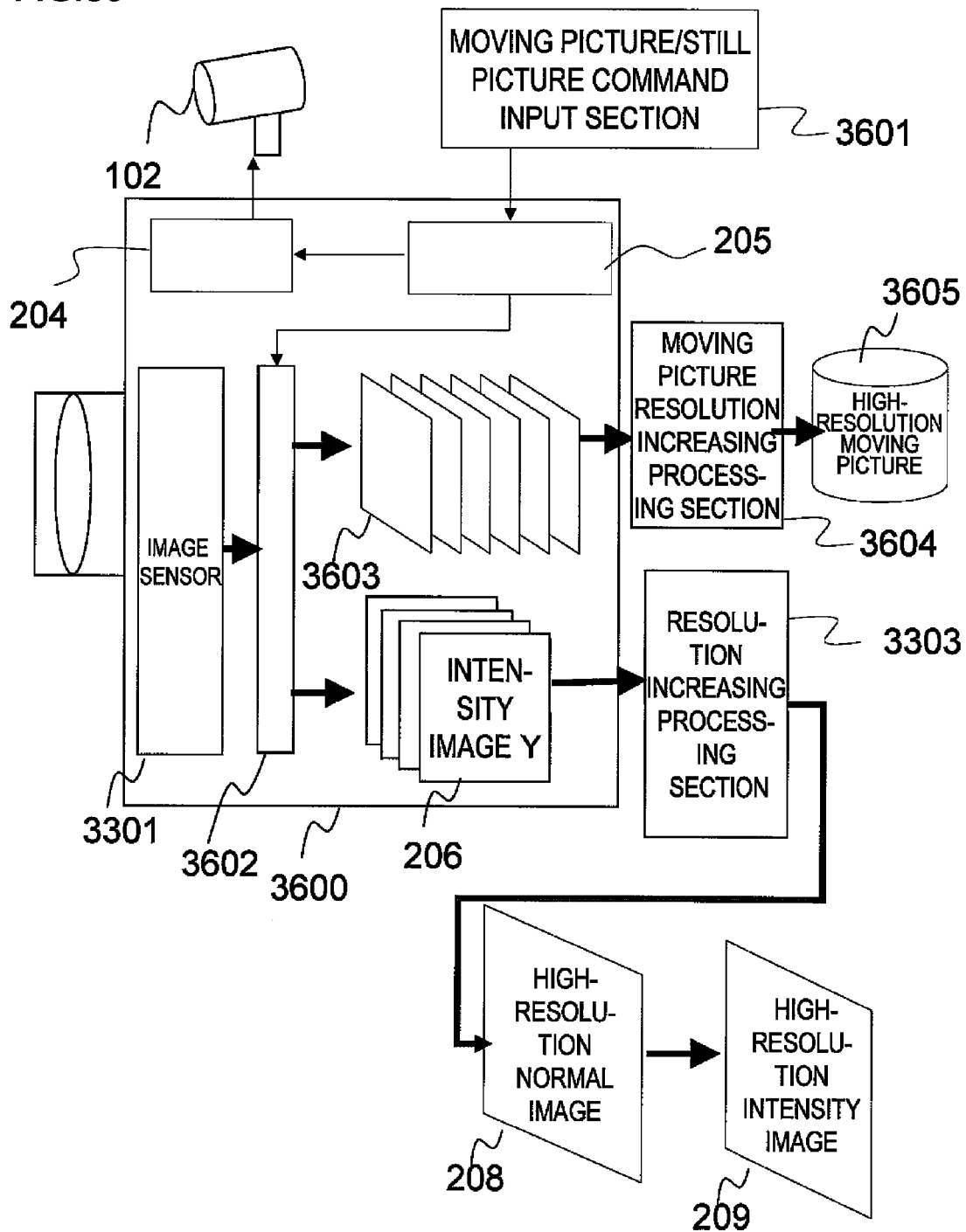
FIG. 36 illustrates a third preferred embodiment of the present invention.

FIG. 36 illustrates a configuration for a movie camera 3500 as a third preferred embodiment of the present invention. In this preferred embodiment, the camera has a moving picture/still picture command input section 3601. When a moving picture is going to be shot, the object is irradiated with non-polarized light through the polarization plane control section 204 and the image capturing control section 205. In the meantime, an image signal is continuously supplied from an image sensor 3301 to a group of intensity moving pictures memory buffer 3603 by way of a moving picture/still picture selecting section 3602. The image signal that has been read out from the group of intensity moving pictures memory buffer 3603 is processed by a conventional "motion-based" moving picture resolution increasing processing section 3604 and stored there as high-resolution moving pictures 3605.

On the other hand, when a still picture is going to be shot, the object is irradiated with polarized light through the polarization plane control section 204 and the image capturing control section 205. In the meantime, an image signal is supplied as an intensity image from the image sensor 3301 to the memory by way of the moving picture/still picture selecting section 3602. And the resolution increasing processing that has already been described for the second preferred embodiment is carried out by the resolution increasing processing section 3303.

Figure 37:
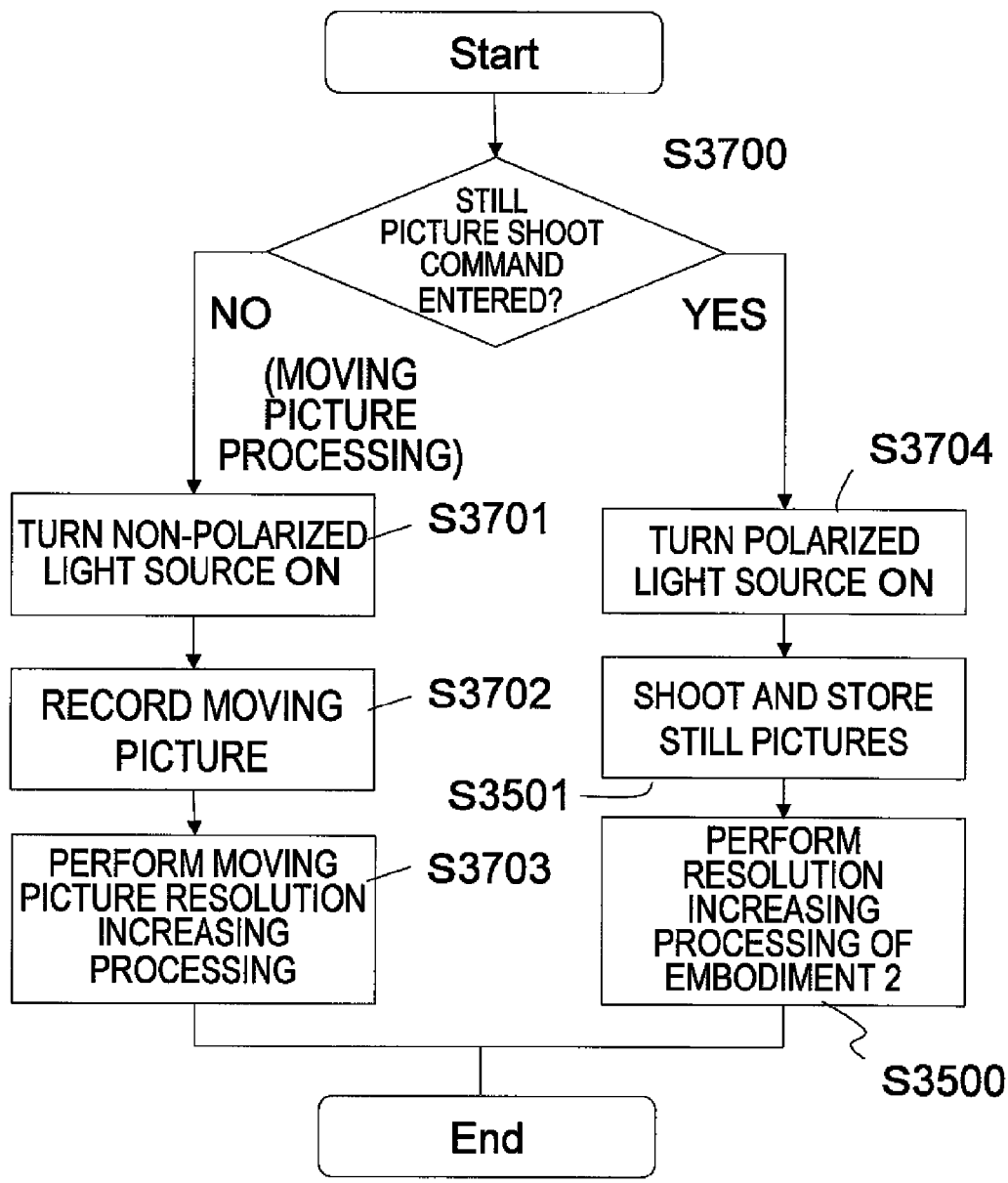
FIG. 37 is a flowchart showing the procedure of processing according to the third preferred embodiment.

FIG. 37 is a flowchart showing the control method of this preferred embodiment.

First, in Step S3700, the image processor determines whether or not a still picture shoot command has been entered. If the answer to the query of this processing step S3700 is NO, a moving picture will be shot. Specifically, in that case, the non-polarized light source is turned ON in Step S3701, a moving picture is recorded in Step S3702, and then the conventional moving picture resolution increasing processing is performed in Step S3703. The conventional techniques disclosed in Patent Document No. 3, for example, may be used to perform this moving picture resolution increasing processing.

This moving picture resolution increasing technique is a normal technique that uses a motion between multiple frames of a moving picture. The following processing steps are carried out.

Specifically, first, interpolation is carried out to generate a first high-resolution estimated image. Next, alignment is made to generate an aligned image. Then, the definition of the high-resolution estimated image is decreased and the lower definition image is subtracted from the aligned image, thereby generating a residual image. Subsequently, the missing parts of the residual image are interpolated with the residual values of surrounding pixels with no missing parts. Thereafter, a reverse projected image is generated from the residual image using a point spread inverse function. And a smoothed image and the reverse projected image are combined together to generate an emphasis coefficient. Next, the emphasis coefficient of the high resolution estimated image is updated, thereby generating a new high resolution estimated image. In this manner, the residual values of the missing pixels are interpolated with the residual values of surrounding pixels with no missing parts.

On the other hand, if the answer to the query of the processing step S3700 is YES (i.e., if a still picture shoot command has been entered), then a still picture will be shot. In that case, the polarized light source is turned ON in Step S3704. Next, a still picture is shot in Step S3501 with the polarization planes of the polarized light source changed. And then the resolution increasing processing step that has already been described for the second preferred embodiment is carried out in Step S3500.

By performing these processing steps, the resolution increasing processing can get done on both a moving picture and a still picture and a high-resolution normal image can be obtained in the still picture, too.

(Embodiment 4)

According to a fourth specific preferred embodiment of the present invention, the polarized light source 102 of the first and second preferred embodiments described above is replaced with a light source 3800 that can rotate the polarization plane faster. In this manner, according to this preferred embodiment, a technique for processing a still picture is applied as it is to shooting a moving picture, thereby achieving a high resolution. But other than the polarized light source 102, the image processor of this preferred embodiment has the same configuration as the one shown in FIGS. 1 and 2 or the one shown in FIGS. 32 and 33.

Figure 38:
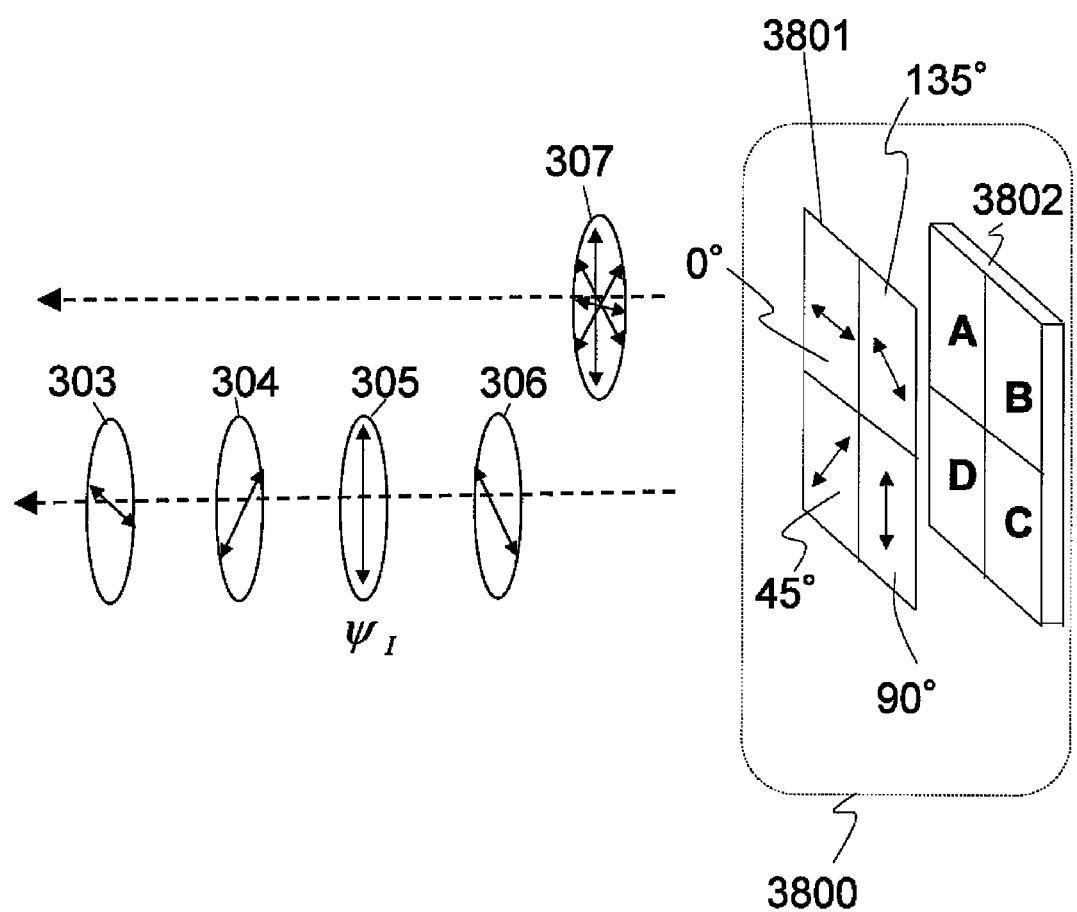
FIG. 38 illustrates an arrangement for a polarized light source according to a fourth preferred embodiment of the present invention.

FIG. 38 illustrates an arrangement for a polarized light source for rotating the polarization plane faster 45 degrees each time. This polarized light source includes a patterned polarizer filter 3801 and an LED surface-emitting light source 3802.

As the patterned polarizer filter 3801, not only a film polarizer but also a photonic crystal, a form-birefringent micro retarder or a wire grid may be used, for example. The LED surface-emitting light source 3802 is divided into four light-emitting regions A, B, C and D that can be lit independently of each other with respect to the four patterned polarizers, of which the polarization planes are defined in the filter 3801 so that each pair of adjacent polarization planes have polarization angles that are different from each other by 45 degrees. Specifically, these four divided light-emitting regions A, B, C and D of the LED surface-emitting light source 3802, which are associated with the four patterned polarizers with polarization angles of 0, 45, 90 and 135 degrees, respectively, are lit one after another. For example, while the divided light-emitting region A is lit, the other divided light-emitting regions B, C and D are not lit. In this case, the outgoing light of that divided light-emitting region A is not polarized but incident on the patterned polarizer that has a polarization angle of 0 degrees in the patterned polarizer filter 3801. And only the light that is polarized parallel to the polarization transmission axis of that patterned polarizer can be transmitted through the patterned polarizer filter 3801. By sequentially lighting these divided light-emitting regions A, B, C and D in this manner, the polarization plane of the outgoing light rotates as indicated by the reference numerals 303 to 306 in FIG. 38. Each of these divided light-emitting regions A, B, C and D has at least one LED.

In the arrangement shown in FIG. 38, the patterned polarizer filter 3801 is supposed to have such a quadruple structure for the sake of simplicity. However, each of those four patterned polarizers with mutually different polarization plane directions and its associated light-emitting region may be further divided more finely.

Optionally, if all of those divided light-emitting regions are lit, then the light source 3800 can also function as a non-polarized light source 307. With such an arrangement adopted, the time it takes to rotate the polarization plane can be shortened to around 10 μs, which is the lighting response speed of an LED, and the rotation of the polarization plane can get done within a frame change interval. As a result, it will take a negligibly short time to change the polarization planes while shooting a moving picture.

Figure 39:
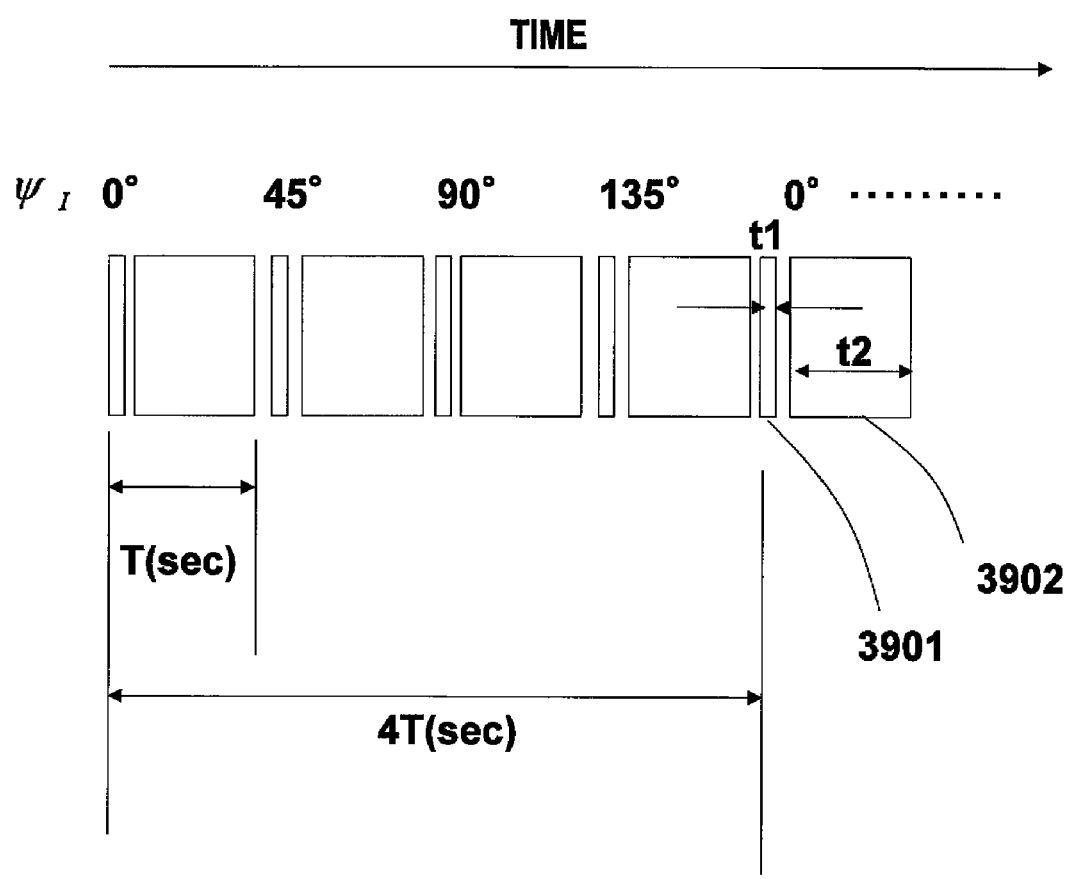
FIG. 39 shows how the light changes on the time axis according to the fourth preferred embodiment.

FIG. 39 is a timing diagram showing how to shoot a moving picture using this polarized light source. In FIG. 39, the time t1 (3901) indicates the amount of time it takes to change the polarization planes and the time t2 (3902) indicates the amount of time it takes to get capturing and exposure done on one frame. In this case, it takes t1+t2=T seconds to capture a single polarization image. That is why to increase the resolution, a set of four polarization images need to be captured in 4T seconds using polarized light rays with mutually different polarization plane angles. And to increase the resolution of the moving picture, the object should not move within this period of 4T seconds. That is why in shooting a moving picture of a normal object, $$4T\,(\text{sec}) < 1/30\,(\text{sec}) \qquad (41)$$

should be satisfied. That is to say, shooting needs to be done quickly enough to satisfy:

$$T\,(\text{sec}) < 1/120\,(\text{sec}) \qquad (42)$$

That quick shooting can also be done by increasing not only the rate of operation of the image sensor but also the illuminance of the light of this preferred embodiment and shortening the exposure time. Consequently, even in a moving picture, the resolution can be increased flexibly, too.

(Embodiment 5)

According to a fifth preferred embodiment of the present invention, flexible zooming is realized by using a polarized light source that rotates the polarization plane as in the second preferred embodiment described above and yet using a normal color intensity camera to capture an image.

Figure 40:
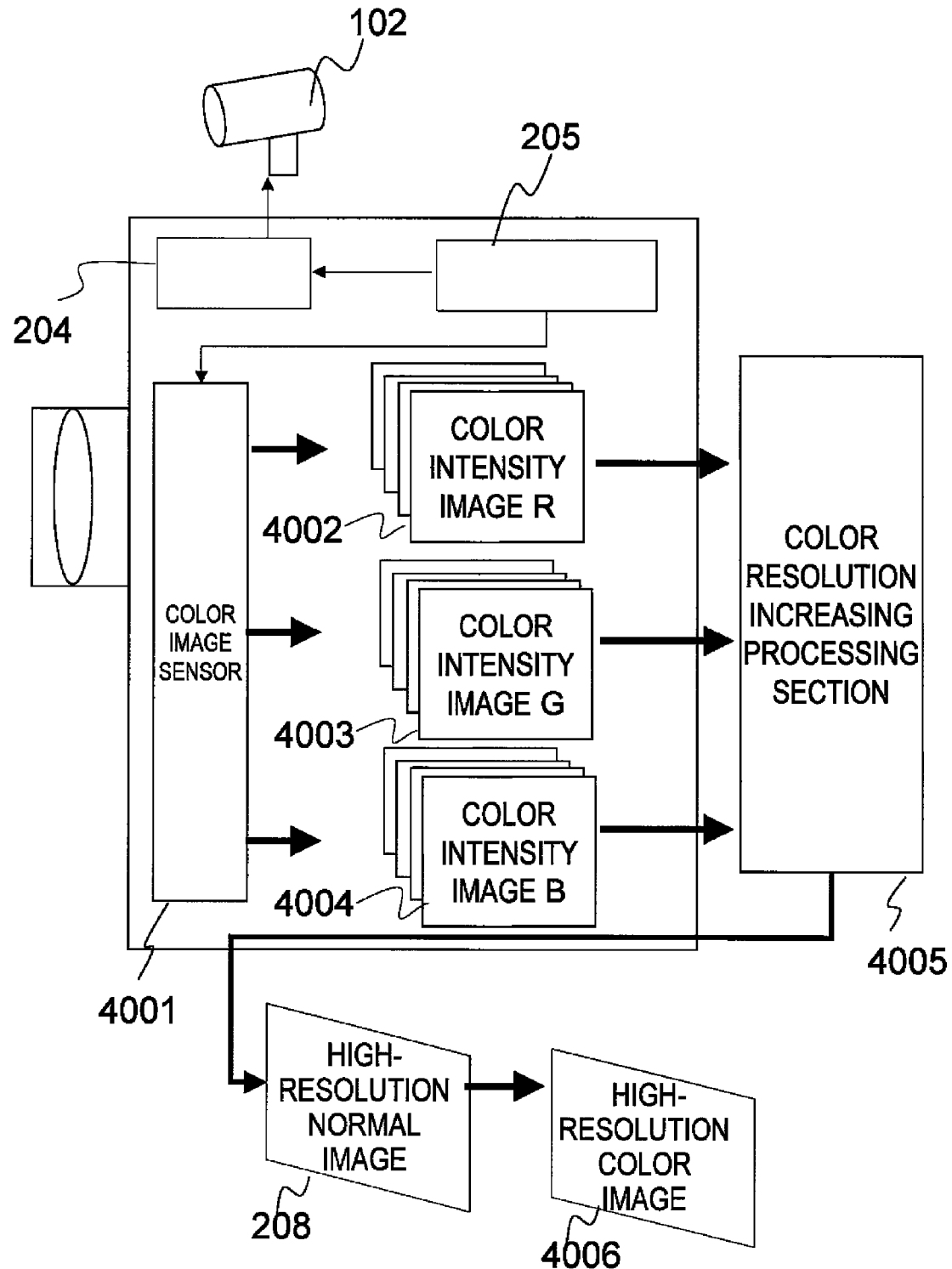
FIG. 40 illustrates a fifth preferred embodiment of the present invention.

FIG. 40 illustrates a fifth preferred embodiment of the present invention. In FIG. 40, the camera 3201 is an ordinary color camera, which is a major difference from the second preferred embodiment shown in FIG. 33. Using a color image sensor 4001, the color camera captures R, G and B images 4002, 4003 and 4004 on a wavelength basis (i.e., with respect to the R, G and B wavelength ranges, respectively).

By capturing a color image every time the polarization plane control section 204 changes the polarization planes of the polarized light, multiple color intensity images 4002, 4003 and 4004 are obtained with respect to each polarization state. Then, the color resolution increasing processing section 4005 processes those color intensity images, thereby generating a high-resolution normal image 208 and a high-resolution color image 4006. The major effect achieved by this preferred embodiment is not simply representing the image of the second preferred embodiment described above in colors but accurately filtering out various unnecessary interreflection components and leaving only physically indispensable interreflection components by using the color information.

In the example that has already been described with reference to FIG. 14, microfacets are supposed to form a groove 1401 and the incoming light is supposed to be reflected from the groove's slope the second time around. In that case, if the properties of the reflections the first and second times are roughly classified into specular reflection and diffuse reflection, there should arise one of the following four situations:

1) diffuse reflection the $1^{st}$ time around and specular reflection the $2^{nd}$ time around;
2) diffuse reflection both of the $1^{st}$ and $2^{nd}$ times around;
3) specular reflection the $1^{st}$ time around and diffuse reflection the $2^{nd}$ time around; and
4) specular reflection both of the $1^{st}$ and $2^{nd}$ times around.

In the second preferred embodiment described above, the analysis is made on the supposition that if the object has a dark color, the situation 4) where specular reflection is produced both of the first and second times around prevails. In general, however, preprocessing for separating the interreflection components in the situations 1) to 3) from the intensity measured needs to be done. Since monochrome image processing is supposed to be performed according to the second preferred embodiment, it is difficult to make this separation accurately.

According to this preferred embodiment, this problem is overcome using RGB color components. Hereinafter, the physical property of each interreflection will be described.

The point is that the color of the light and the property of polarized light change through the reflection phenomenon. In the following description, it should be noted that (i) since diffusing light is ejection of incoming light that has once penetrated a medium, white illuminating light will take on the medium's color and that (ii) polarized light that has just been emitted depends on the angle of emittance, which is in the range of 45 to 50 degrees according to this preferred embodiment, and therefore, has so low an angle as to be regarded as almost non-polarized.

FIG. 41 illustrates how the incoming light is reflected twice in the situation 1). Specifically, in such a situation, when reflected the first time, the incoming light turns into non-polarized diffusing light and takes on the object medium's own color. Thus, when reflected the second time, the diffuse reflected light comes to have not only colored reflection components but also partially polarized components as specular reflected light. In FIG. 41, those partially polarized components are indicated by the ellipses 4101 and 4102. It should be noted that those ellipses do not represent the shapes of the partially polarized light exactly but just schematically. In this case, if the polarization direction of the incoming light is changed, then the quantity of the light that refracts and penetrates into the medium will change and the quantity of the light reflected the second time will change eventually, too. As a result, the sizes of the ellipses 4101 and 4102 will also change and the intensity will vary.

FIG. 42 illustrates how the incoming light is reflected twice in the situation 2). Specifically, in such a situation, when reflected the first time, the incoming light gets colored and diffuses. And when reflected the second time, that diffusing light goes back as colored diffusing light again. In this case, if the polarization direction of the incoming light is changed, then the quantity of the light that refracts and penetrates into the medium will change and the quantity of the incoming light to be reflected the second time will change, too. As a result, the quantity of the light reflected the second time will change eventually but the reflected light is non-polarized.

FIG. 43 illustrates how the incoming light is reflected twice in the situation 3). When reflected the first time, the incoming light is specular reflected and gets polarized while remaining white light. And when reflected the second time, the specular reflected white light is reflected as non-polarized diffusing light. In this case, if the polarization direction of the incoming light is changed, the quantity of the light reflected the first time changes. Consequently, the quantity of the light reflected the second time changes, too.

Thus, the properties of the eventually observed light that has been reflected twice can be summarized as in the following Table 1:

TABLE 1

| | Type of reflection | Color | Polarized? | Variation in intensity with light source |
|---|---|---|---|---|
| 1) | Diffuse reflected $1^{st}$ time and specular reflected $2^{nd}$ time | Color (object color) | Partially polarized | Maximized in FIG. 41(a) and minimized in FIG. 41(b) |
| 2) | Diffuse reflected both $1^{st}$ and $2^{nd}$ times around | Color (object color) | Non-polarized | Maximized in FIG. 42(a) and minimized in FIG. 42(b) |
| 3) | Specular reflected $1^{st}$ time and diffuse reflected $2^{nd}$ time | Color (object color) | Non-polarized | Minimized in FIG. 43(a) and maximized in FIG. 43(b) |
| 4) | Specular reflected both $1^{st}$ and $2^{nd}$ times around | White (light source color) | Polarized | Minimized in FIG. 14(a) and maximized in FIG. 14(b) |

Only the light that has been specular reflected both of the first and second times around as in the situation 4) and that is used most of the time in this preferred embodiment remains white light, but the reflected light in each of the other situations 1), 2) and 3) is colored light that has taken on the object's color. If the polarization direction of the incoming light is changed, both of these intensity components vary individually. That is why those components could not be separated from each other only with a monochrome intensity.

Thus, shooting is carried out using a color camera with the polarization plane of the polarized light changed sequentially, thereby approximating a function representing variations in color intensities R, G and B as a cosine function with a period of 180 degrees. Supposing the angle of the polarization plane of the light is identified by $\psi I$, the following Equation (43) is satisfied:

$$I(\psi_I) = A_I \cos(2(\psi_I - \phi_I)) \quad (43)$$

where each of the intensity I and the amplitude A is a vector consisting of three components (R, G, B). In general, the phase $\phi I$ of this intensity variation is the same in any of the three colors.

If the minimum value obtained is supposed to represent the object's color $$I_D = I_{min} \quad (44)$$

and if the light source's color is supposed to be known as $$I_L \quad (45)$$

then the following vector equation is satisfied:

$$I = \alpha \cdot I_L + \beta \cdot I_D \quad (46)$$

Figure 44:
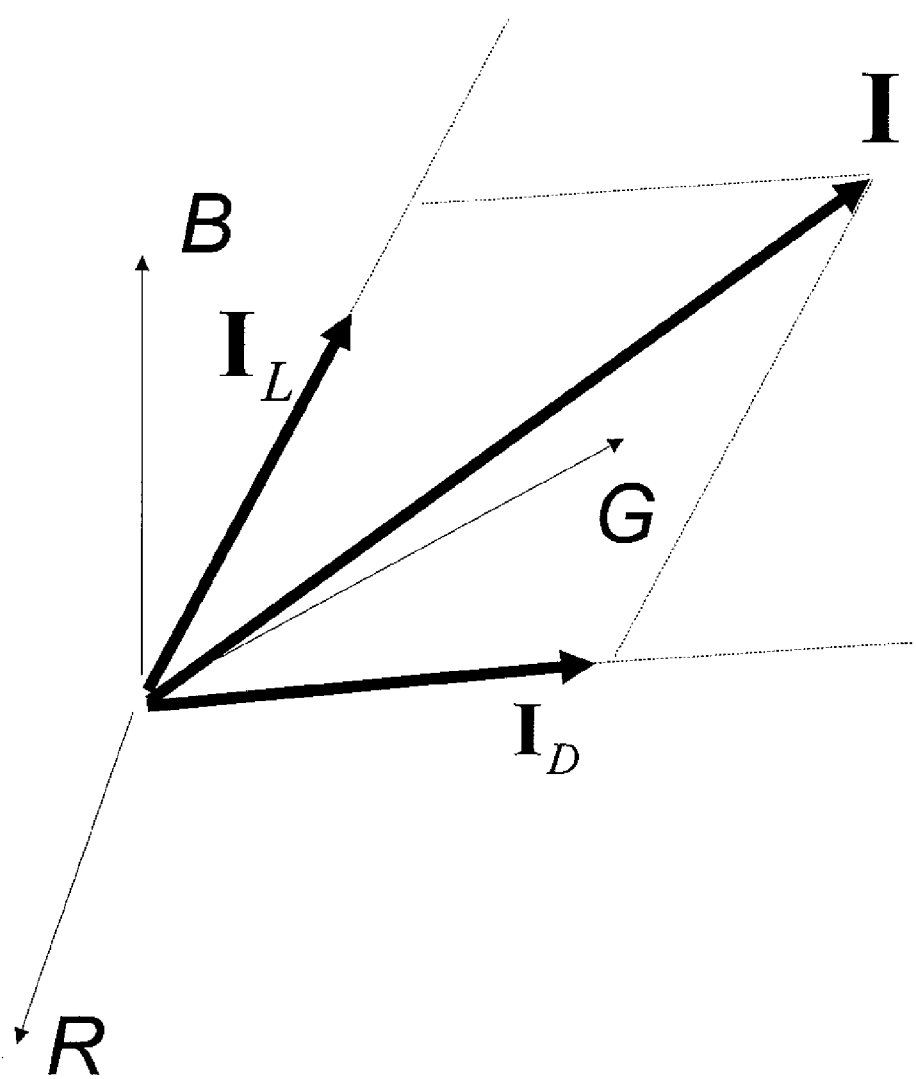
FIG. 44 shows, using vectors, how to separate the intensity into respective color reflection components according to the fifth preferred embodiment.

FIG. 44 illustrates conceptually this vector relation in an RGB color space.

This equation has the three components of RGB with respect to two unknown quantities, and therefore, can be solved by the minimum square method. The varying intensity can be separated into respective components using the weight coefficient thus obtained. Consequently, the reflection component in the situation 4) shown in Table 1 becomes:

$$I_{4)} = \alpha \cdot I_L \quad (47)$$

Figure 45:
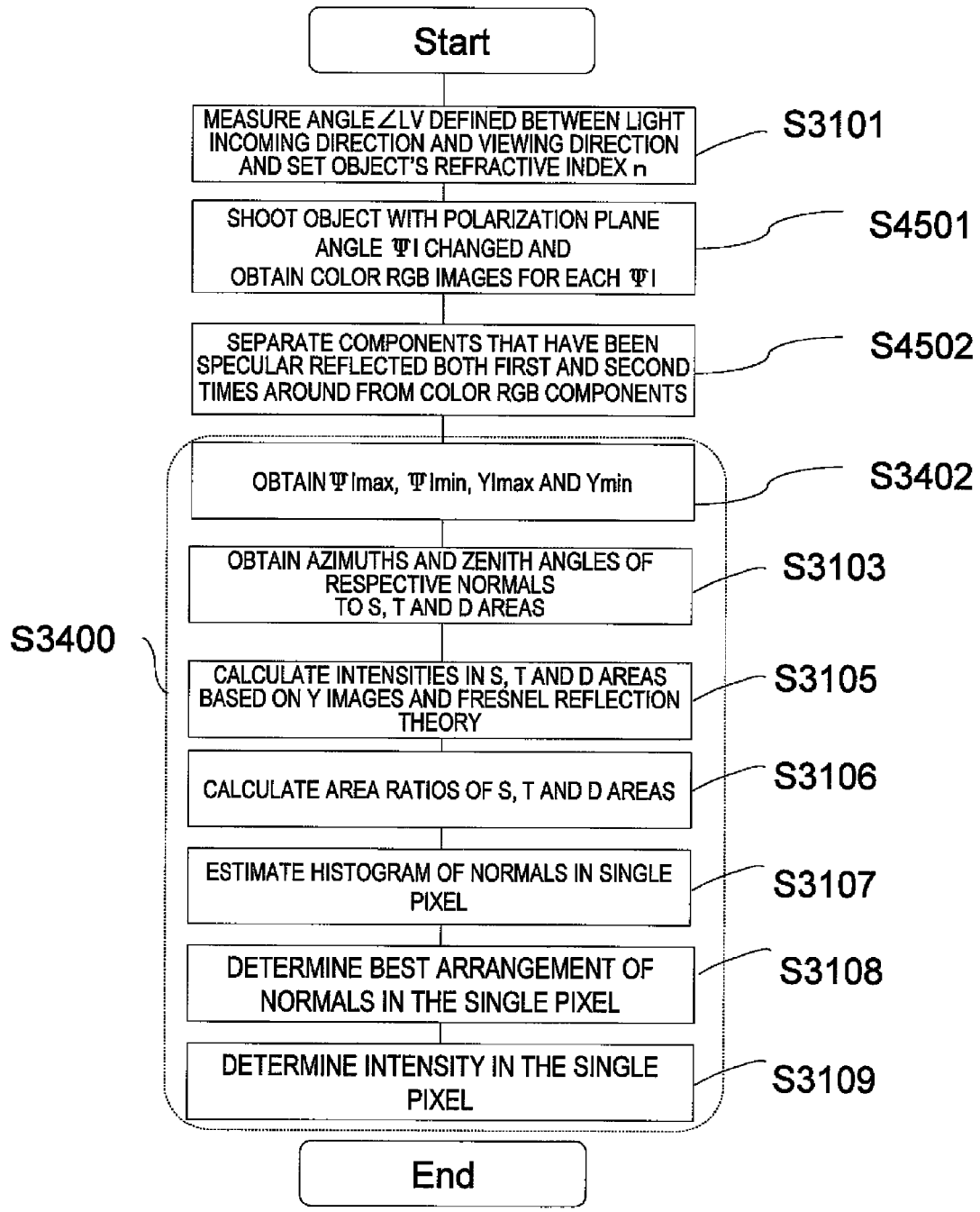
FIG. 45 is a flowchart showing the procedure of processing according to the fifth preferred embodiment.

FIG. 45 is a flowchart showing the procedure in which these processing steps are performed. This flowchart is different from the one shown in FIG. 34, which has already been described for the second preferred embodiment, only in that color RGB images are captured in Step S4501 and that the components that have been specular reflected both of the first and second times around in the situation 4) shown in Table 1 are separated from the color RGB components in Step S4502. Since the intensity components separated are in the color white of the light, only their intensities can be handled and the rest of the flowchart is the same as the one shown in FIG. 34. The high-resolution image obtained in this case consists of only specular reflected components. That is why if that image is synthesized again by Equation (46), a high-resolution color image can be obtained eventually.

In the first through fifth preferred embodiments of the present invention described above, the polarization plane of the polarized light is supposed to be rotated 45 degrees each time. However, this is only an example and any other arbitrary angle may be used instead.

The present invention is applicable extensively to consumer digital cameras, movie cameras, medical imaging devices, medical endoscope cameras, surveillance cameras, robot visions, surface scanners and so on.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image processor comprising:
a polarized light source for irradiating the surface of an object with polarized light that is linearly polarized light, of which the polarization plane changes sequentially;
a camera that has an image capturing plane, on which a number of photosensitive cells, each having a size corresponding to one pixel, are arranged, and that captures an intensity image of the object's surface based on the light that has been reflected from the object's surface; and
a resolution increasing processing section for estimating normals to subpixel regions, each of which is smaller than a single pixel, at the object's surface by detecting how much the intensity of the intensity image has varied as the polarization plane changes, and for increasing the resolution of the intensity image using the normals estimated, wherein the resolution increasing processing section estimates a normal histogram within a single pixel of the intensity image by using an interreflection phenomenon of light to be produced on the object's surface, and when the camera captures the intensity image of the object's surface, the polarization plane of the linearly polarized light changes with the arrangement of the polarized light source and the camera fixed.

2. The image processor of claim 1, wherein an angle of 10 degrees or less is formed between the respective optical axes of the polarized light source and the camera.

3. The image processor of claim 1, wherein the camera is a polarization camera with a polarization filter for transmitting linearly polarized light that is polarized in a particular direction.

4. The image processor of claim 3, wherein the polarization filter includes a number of patterned polarizers that are arranged to face the photosensitive cells.

5. The image processor of claim 1, wherein the camera is used to capture either a monochrome intensity image or a color intensity image.

6. The image processor of claim 1, wherein when shooting a still picture, the polarized light source irradiates the object with polarized light while changing the polarization planes, and wherein when shooting a moving picture, the polarized light source irradiates the object with non-polarized light, of which the polarization planes are random, thereby increasing the resolutions of the still picture and the moving picture.

7. The image processor of claim 1, wherein the polarized light source includes:
a number of divided light sources, which are able to emit light independently of each other; and
a number of patterned polarizers, which are arranged to face those divided light sources, and
wherein the direction of the polarization plane of the linearly polarized light is defined by the direction of the polarization transmission axis of a patterned polarizer, through which light that has been emitted from some of the divided light sources is transmitted.

8. The image processor of claim 1, wherein the resolution increasing processing section uses the magnitude of intensity variation, which has been caused by the change of the polarization plane, on a color component basis, thereby separating a component that has been specular reflected both of first and second times around and a component that has been diffuse reflected at least once from components that have been inter-reflected from the object's surface.

9. The image processor of claim 1, wherein the resolution increasing processing section divides each pixel of the intensity image into multiple regions, and estimates the intensity, normal and area ratio of each said region, according to the reflection state at the object's surface, thereby determining a normal histogram within that pixel.

10. The image processor of claim 9, wherein the multiple regions form at least one groove that runs in one direction within each said pixel.

11. The image processor of claim 1, wherein the resolution increasing processing section estimates a normal histogram within a single pixel of the intensity image by using an interreflection phenomenon of light to be produced on the object's surface by irradiating the object's surface with the polarized light that has come from substantially vertical direction to the object.

12. The image processor of claim 1, wherein the resolution increasing processing section determines the arrangement of the subpixel regions within the single pixel based on the normal histogram estimated within the single pixel, thereby generating a high-resolution normal image.

13. The image processor of claim 9, wherein the multiple regions include:
an S region that reflects the polarized light only once, thereby making the reflected light reach the camera;
a T region that inter-reflects the polarized light twice, thereby making the reflected light reach the camera; and
a D region that does not make the reflected light reach the camera.

14. An image processing method comprising the steps of:
irradiating the surface of an object with polarized light that is linearly polarized light, of which the polarization plane changes sequentially, using a polarized light source;
capturing an intensity image of the object's surface based on the light that has been reflected from the object's surface using a camera; and
estimating normals to subpixel regions, each of which is smaller than a single pixel, at the object's surface by detecting how much the intensity of the intensity image has varied as the polarization plane changes, and increasing the resolution of the intensity image using the normals estimated,
wherein the step of estimating normals to subpixel regions comprises estimating a normal histogram within a single pixel of the intensity image by using an interreflection phenomenon of light to be produced on the object's surface, and
when the camera captures the intensity image of the object's surface, the polarization plane of the linearly polarized light changes with the arrangement of the polarized light source and the camera fixed.

15. A program, stored on a non-transitory computer-readable medium, to be executed by an apparatus that comprises:
a polarized light source for irradiating the surface of an object with polarized light that is linearly polarized light, of which the polarization plane changes sequentially; and
a camera that has an image capturing plane, on which a number of photosensitive cells, each having a size corresponding to one pixel, are arranged, and that captures an intensity image of the object's surface based on the light that has been reflected from the object's surface, and
wherein the program is defined to make the apparatus perform the steps of:
irradiating the object's surface with the polarized light that is linearly polarized light, of which the polarization plane changes sequentially;
capturing the intensity image of the object's surface based on the light that has been reflected from the object's surface, and
estimating normals to subpixel regions, each of which is smaller than a single pixel, at the object's surface by detecting how much the intensity of the intensity image has varied as the polarization plane changes, and increasing the resolution of the intensity image using the normals estimated,
wherein the step of estimating normals to subpixel regions comprises estimating a normal histogram within a single pixel of the intensity image by using an interreflection phenomenon of light to be produced on the object's surface.

* * * * *